United States Patent
Chu et al.

(10) Patent No.: US 11,546,021 B2
(45) Date of Patent: *Jan. 3, 2023

(54) COORDINATED MULTI-USER TRANSMISSIONS WITH MULTIPLE ACCESS POINTS

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,847

(22) Filed: Sep. 30, 2021

(65) Prior Publication Data

US 2022/0021418 A1 Jan. 20, 2022

Related U.S. Application Data

(63) Continuation of application No. 16/827,483, filed on Mar. 23, 2020, now Pat. No. 1,114,631.

(Continued)

(51) Int. Cl.
*H04B 7/02* (2018.01)
*H04B 7/024* (2017.01)
(Continued)

(52) U.S. Cl.
CPC ........... *H04B 7/024* (2013.01); *H04B 7/0452* (2013.01); *H04W 72/0453* (2013.01); *H04W 84/12* (2013.01)

(58) Field of Classification Search
CPC ... H04B 7/24; H04B 7/0452; H04W 72/0453; H04W 84/12
See application file for complete search history.

(56) References Cited

U.S. PATENT DOCUMENTS 6,590,884 B1   7/2003  Panasik
7,599,332 B2  10/2009  Zeist et al.
(Continued)

FOREIGN PATENT DOCUMENTS

EP    2198664 A2   6/2010
EP    2999252 A1   3/2016
(Continued)

OTHER PUBLICATIONS

Chen, "Home Network Basis: Transmission Environments and Wired/Wireless Protocols," Prentice Hall, pp. 1-26 (Jul. 2006).
(Continued)

*Primary Examiner* — Dac V Ha

(57) ABSTRACT

A first access point (AP), which is associated with one or more first client stations, receives an announcement frame from a second AP that is associated with one or more second client stations. The announcement frame announces a coordinated multi-user (MU) transmission involving at least the first AP and the second AP, includes an indicator of a frequency resource unit (RU) allocated to the first AP for the coordinated MU transmission. The first AP participates in the coordinated MU transmission using the frequency RU indicated by the announcement frame while the second AP also participates in the coordinated MU transmission.

24 Claims, 18 Drawing Sheets

Related U.S. Application Data

(60) Provisional application No. 62/934,452, filed on Nov. 12, 2019, provisional application No. 62/837,106, filed on Apr. 22, 2019, provisional application No. 62/821,936, filed on Mar. 21, 2019.

(51) Int. Cl.
*H04B 7/0452* (2017.01)
*H04W 72/04* (2009.01)
*H04W 84/12* (2009.01)

(56) References Cited

U.S. PATENT DOCUMENTS

| | | | |
|---|---|---|---|
| 7,742,390 | B2 | 6/2010 | Mujtaba |
| 8,270,909 | B2 | 9/2012 | Zhang et al. |
| 8,526,351 | B2 | 9/2013 | Fischer et al. |
| 8,619,907 | B2 | 12/2013 | Mujtaba et al. |
| 9,166,660 | B2 | 10/2015 | Chu et al. |
| 9,450,743 | B1 | 9/2016 | Chu et al. |
| 10,129,881 | B2 | 11/2018 | Yang et al. |
| 10,257,806 | B2 | 4/2019 | Chu et al. |
| 10,320,459 | B2 | 6/2019 | Zhang et al. |
| 10,349,413 | B2 | 7/2019 | Zhang et al. |
| 2005/0058151 | A1 | 3/2005 | Yeh |
| 2005/0070266 | A1 | 3/2005 | Senarath et al. |
| 2006/0067426 | A1 | 3/2006 | Maltsev et al. |
| 2007/0049218 | A1 | 3/2007 | Gorokhov et al. |
| 2007/0232235 | A1 | 10/2007 | Li et al. |
| 2008/0240208 | A1 | 10/2008 | Lou et al. |
| 2008/0261658 | A1 | 10/2008 | Jin et al. |
| 2009/0069054 | A1 | 3/2009 | Zangi et al. |
| 2009/0080579 | A1 | 3/2009 | Fuji |
| 2009/0196163 | A1 | 8/2009 | Du |
| 2010/0091675 | A1 | 4/2010 | Sawai |
| 2010/0103045 | A1 | 4/2010 | Liu et al. |
| 2010/0272218 | A1 | 10/2010 | Yeh |
| 2010/0279619 | A1 | 11/2010 | Yeh |
| 2011/0002219 | A1 | 1/2011 | Kim et al. |
| 2011/0141980 | A1 | 6/2011 | Wang et al. |
| 2011/0223867 | A1 | 9/2011 | Chae et al. |
| 2011/0249659 | A1 | 10/2011 | Fontaine et al. |
| 2011/0261708 | A1 | 10/2011 | Grandhi |
| 2011/0268217 | A1 | 11/2011 | Gormley et al. |
| 2011/0294514 | A1 | 12/2011 | Kulkarni |
| 2011/0305156 | A1 | 12/2011 | Liu et al. |
| 2012/0026956 | A1 | 2/2012 | Benjebbour et al. |
| 2012/0034874 | A1 | 2/2012 | Yiu et al. |
| 2012/0039196 | A1 | 2/2012 | Zhang |
| 2012/0071116 | A1 | 3/2012 | Gong et al. |
| 2012/0087265 | A1 | 4/2012 | Tamaki et al. |
| 2012/0149414 | A1 | 6/2012 | Krishnaswamy et al. |
| 2012/0202431 | A1 | 8/2012 | Hawryluck |
| 2013/0035128 | A1 | 2/2013 | Chan et al. |
| 2013/0100952 | A1 | 4/2013 | Hart et al. |
| 2013/0229996 | A1 | 9/2013 | Wang et al. |
| 2014/0241240 | A1 | 8/2014 | Kloper et al. |
| 2014/0302884 | A1 | 10/2014 | Zhao et al. |
| 2014/0307821 | A1 | 10/2014 | Zhang et al. |
| 2015/0131517 | A1 | 5/2015 | Chu et al. |
| 2015/0163043 | A1 | 6/2015 | Lee et al. |
| 2015/0163769 | A1 | 6/2015 | Lee et al. |
| 2016/0029373 | A1 | 1/2016 | Seok |
| 2016/0212748 | A1 | 7/2016 | Yang et al. |
| 2016/0323879 | A1 | 11/2016 | Ghosh et al. |
| 2017/0149547 | A1 | 5/2017 | Kim et al. |
| 2017/0181136 | A1 | 6/2017 | Bharadwaj et al. |
| 2017/0188390 | A1 | 6/2017 | Adachi et al. |
| 2017/0202026 | A1 | 7/2017 | Ahn et al. |
| 2017/0279864 | A1 | 9/2017 | Chun et al. |
| 2017/0325178 | A1 | 11/2017 | Verma et al. |
| 2017/0366329 | A1 | 12/2017 | Cao et al. |
| 2018/0020476 | A1 | 1/2018 | Aijaz et al. |
| 2018/0115403 | A1 | 4/2018 | Sakai et al. |
| 2019/0123863 | A1 | 4/2019 | Zhang et al. |
| 2019/0150163 | A1* | 5/2019 | Itagaki .................. H04L 5/0048 370/329 |
| 2019/0182714 | A1 | 6/2019 | Chu et al. |
| 2019/0182863 | A1 | 6/2019 | Chu et al. |
| 2019/0349930 | A1 | 11/2019 | Chu et al. |
| 2020/0304173 | A1 | 9/2020 | Chu et al. |
| 2021/0007113 | A1* | 1/2021 | Zhou .................. H04W 72/121 |
| 2021/0051721 | A1* | 2/2021 | Baron ................. H04W 72/121 |

FOREIGN PATENT DOCUMENTS

| | | |
|---|---|---|
| GB | 2501898 A | 11/2013 |
| KR | 2015 0065155 A | 6/2015 |
| WO | WO-2006/000955 A1 | 1/2006 |
| WO | WO-2012/026779 A2 | 3/2012 |
| WO | WO-2013/168105 A1 | 11/2013 |
| WO | WO-2013/179270 A1 | 12/2013 |
| WO | WO-2015/099803 A1 | 7/2015 |
| WO | WO-2017/026937 A1 | 2/2017 |
| WO | WO-2017/111567 A2 | 6/2017 |

OTHER PUBLICATIONS

Fischer et al., "IEEE P802.11—Wireless LANs—Disallowed Subchannels," doc. No. IEEE 802.11-18/0496r3, *The Institute of Electrical and Electronics Engineers*, pp. 1-11 (May 2018).

Hiertz et al., "The IEEE 802.11 Universe," IEEE Communications Magazine, pp. 62-70, (Jan. 2010).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

International Search Report and Written Opinion in International Patent Application No. PCT/US2020/024307, dated Jun. 22, 2020 (14 pages).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Kwon et al., "SIG Field Design Principle for 11ax," Newracon, doc. IEEE 802.11-15/0344r2, Mar. 2015, 18 pages.

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

(56) References Cited

OTHER PUBLICATIONS

Seok et al., "HEW PPDU Format for Supporting MIMO-OFDMA," IEEE 802.11-14/1210r0, Sep. 14, 2014 (16 pages).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.
Zhang et al., "EHT Technology Candidate Discussions," doc: IEEE 802.11-18/1161r0, *The Institute of Electrical and Electronics Engineers, Inc.*, pp. 1-10 Jul. 8, 2018.

* cited by examiner

COORDINATED MULTI-USER TRANSMISSIONS WITH MULTIPLE ACCESS POINTS

CROSS REFERENCES TO RELATED APPLICATIONS

This application is a continuation of U.S. patent application Ser. No. 16/827,483 (now U.S. Pat. No. 11,146,311), entitled "Coordinated Multi-User Transmissions with Multiple Access Points," filed on Mar. 23, 2020, which claims the benefit of U.S. Provisional Patent Application No. 62/821,936, entitled "Access Point (AP) Coordinated Orthogonal Frequency Multiple Access (OFDMA)," filed on Mar. 21, 2019, U.S. Provisional Patent Application No. 62/837,106, entitled "Access Point (AP) Coordinated Orthogonal Frequency Multiple Access (OFDMA)," filed on Apr. 22, 2019, U.S. Provisional Patent Application No. 62/934,452, entitled "Access Point (AP) Coordinated Orthogonal Frequency Multiple Access (OFDMA)," filed on Nov. 12, 2019. All of the applications referenced above are hereby incorporated herein by reference in their entireties.

FIELD OF TECHNOLOGY

The present disclosure relates generally to wireless communication systems, and more particularly to coordination of multiple access points in multiple wireless local area networks.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form 320 MHz aggregate communication channels (or perhaps even wider aggregate communication channels).

As the density of IEEE 802.11 WLANs increases over time, it tends to become more difficult for an access point (AP) to find several 20 MHz sub-channels that are idle and that can be aggregated together to form a larger aggregate channel. One way to increase the likelihood of WLANs being able to take advantage of wider frequency bandwidths is to allow APs of neighboring networks to coordinate the use of sub-channels amongst the WLANs.

SUMMARY

In an embodiment, a method for wireless communication by a first access point (AP) associated with one or more first client stations includes: generating, at the first AP, an announcement frame that announces a coordinated multi-user (MU) transmission involving multiple APs including the first AP and one or more second APs, each of the second APs associated with a respective one or more second client stations, wherein the announcement frame is generated to indicate respective one or more frequency resource units (RUs) allocated to the one or more second APs for the coordinated MU transmission; transmitting, by the first AP, the announcement frame to the one or more second APs to initiate the coordinated MU transmission; and participating, by the first AP, in the coordinated MU transmission while the one or more second APs also participate in the coordinated MU transmission.

In another embodiment, a first AP associated with one or more first client stations comprises: a wireless network interface device comprising one or more integrated circuit (IC) devices. The one or more IC devices are configured to: generate an announcement frame that announces a coordinated MU transmission involving multiple APs including the first AP and one or more second APs, each of the second APs associated with a respective one or more second client stations, wherein the announcement frame is generated to indicate respective one or more frequency RUs allocated to the one or more second APs for the coordinated MU transmission; control the wireless network interface device to transmit the announcement frame to the one or more second APs to initiate the coordinated MU transmission; and control the wireless network interface device to participate in the coordinated MU transmission while the one or more second APs also participate in the coordinated MU transmission.

In yet another embodiment, a method for wireless communication by a first AP associated with one or more first client stations includes: receiving, at the first AP, an announcement frame from a second AP associated with one or more second client stations, the announcement frame announcing a coordinated MU transmission involving at least the first AP and the second AP, wherein the announcement frame includes an indicator of a frequency RU allocated to the first AP for the coordinated MU transmission; and participating, by the first AP, in the coordinated MU transmission using the frequency RU indicated by the announcement frame while the second AP also participates in the coordinated MU transmission.

In still another embodiment, a first AP associated with one or more first client stations, the first AP comprising: a wireless network interface device comprising one or more IC devices. The one or more IC devices are configured to: receive an announcement frame from a second AP associated with one or more second client stations, the announcement frame announcing a coordinated MU transmission involving at least the first AP and the second AP, wherein the announcement frame includes an indicator of a frequency RU allocated to the first AP for the coordinated MU transmission; and control the wireless network interface device to participate in the coordinated MU transmission using the frequency RU indicated by the announcement frame while the second AP also participates in the coordinated MU transmission.

DETAILED DESCRIPTION

In various embodiments described below, access points (APs) of neighboring wireless local area network (WLANs) coordinate the use of wireless sub-channels. For example, one AP may act as a "master AP" and one or more other APs may act as "slave APs," and the master AP may coordinate synchronized transmissions in respective WLANs, the synchronized transmissions using respective frequency segments. Such synchronized transmissions are sometimes referred to as coordinated orthogonal frequency division multiple access (C-OFDMA).

As part of coordinating a C-OFDMA transmission, the master AP generates and transmits a C-OFDMA announcement (C-OFDMA-A) frame to one or more slave APs, according to some embodiments. The C-OFDMA-A frame advertises a start of a coordinated uplink or downlink OFDMA transmission involving multiple WLANs, according to an embodiment. The C-OFDMA-A frame includes information regarding the coordinated OFDMA transmission such as one of, or any suitable combination of two or more of, i) a respective frequency bandwidth to be used in a respective WLAN, ii) a respective frequency resource unit (RU) to be used in a respective WLAN, iii) a duration (in time) of the coordinated OFDMA transmission, iv) a respective length (in bits, octets, words, etc.) of a respective OFDMA transmission in a respective WLAN, etc., according to various embodiments.

For a C-OFDMA downlink (DL) transmission, the C-OFDMA-A frame transmitted by the master AP prompts one or more slave APs to transmit respective DL OFDMA transmissions as part of the C-OFDMA transmission, according to some embodiments. For a C-OFDMA uplink (UL) transmission, the C-OFDMA-A frame transmitted by the master AP prompts one or more slave APs to transmit respective trigger frames, which in turn prompt respective sets of client stations to transmit respective UL OFDMA transmissions as part of the C-OFDMA transmission, according to some embodiments.

Figure 1A:
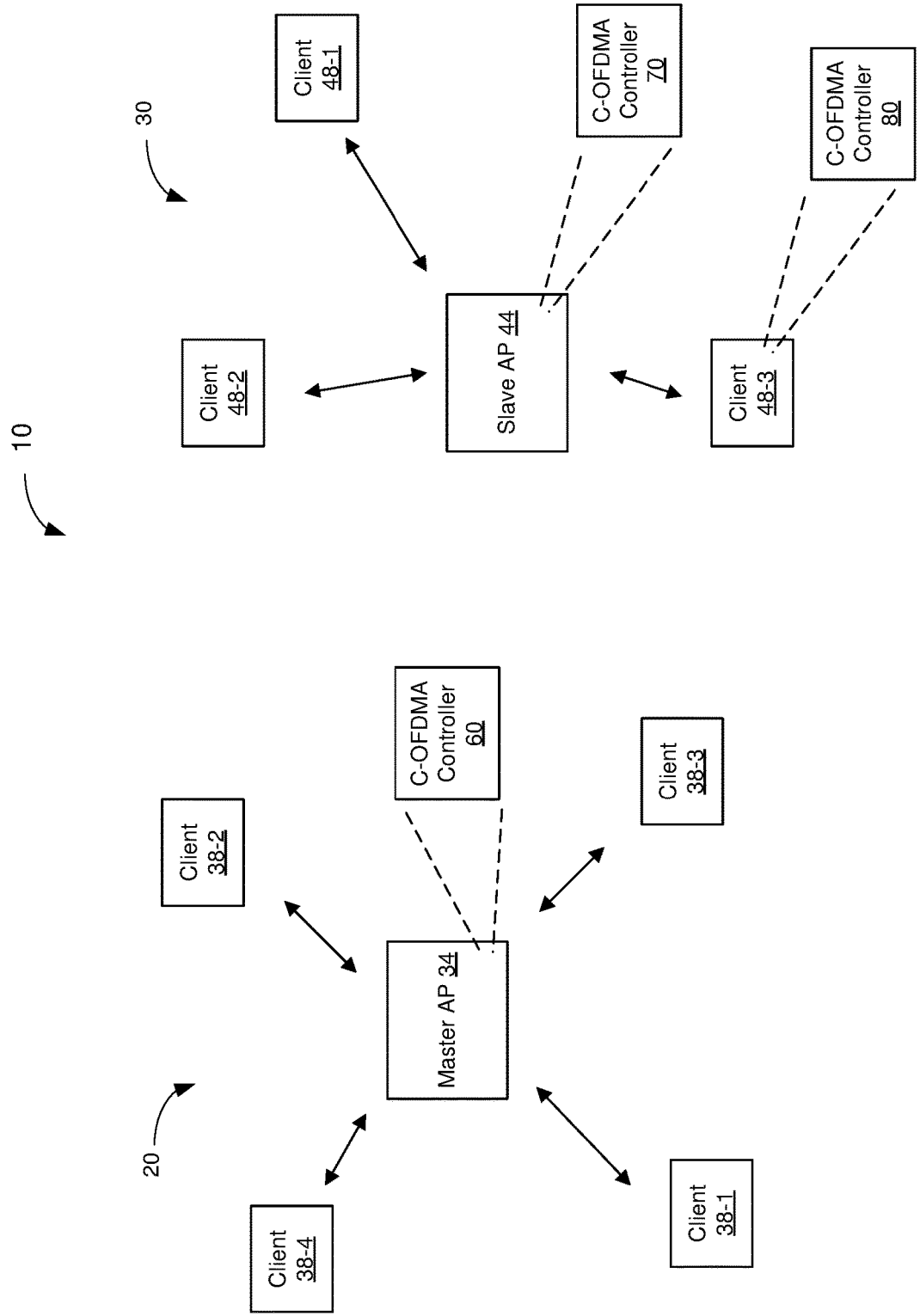
FIG. 1A is a block diagram of an example communication system that includes multiple access points (APs) that participate in coordinated multi-user (MU) transmissions, according to an embodiment.

FIG. 1A is a diagram of an example communication system 10 that includes multiple WLANs, including a WLAN 20 and a WLAN 30. Although two WLANs are illustrated in FIG. 1A, the communication system 10 includes other suitable numbers of WLANs such as three, four, five, etc., in various embodiments.

The WLAN 20 comprises an AP 34 and a plurality of client stations 38. The AP 34 acts as a master AP that coordinates synchronized transmissions in respective WLANs, as will be described in more detail below. For example, the master AP 34 transmits instructions, information, etc., regarding a C-OFDMA transmission to one or more slave APs, according to some embodiments.

The WLAN 30 comprises an AP 44 and a plurality of client stations 48. The AP 44 acts as a slave AP that participates in a C-OFDMA transmission coordinated by the master AP 34. For example, the slave AP 44 receives instructions, information, etc., from the master AP 34 regarding a C-OFDMA transmission, and the slave AP 44 participates in the C-OFDMA transmission according to the instructions, information, etc., received from the master AP 34, in some embodiments.

The master AP 34 comprises a C-OFDMA controller 60 that determines parameters for a C-OFDMA transmission, generates data units for setting up a C-OFDMA transmission, controls the timing of transmissions by the master AP 34 during a C-OFDMA transmission, etc. according to various embodiments. The C-OFDMA controller 60 is described in more detail below.

The slave AP 44 comprises a C-OFDMA controller 70 that receives parameters for a C-OFDMA transmission from the master AP, generates data units for the C-OFDMA transmission, controls the timing of transmissions by the slave AP 44 during a C-OFDMA transmission, etc., according to various embodiments. The C-OFDMA controller 70 is described in more detail below.

In some embodiments, one or more client stations 38, 48 include a C-OFDMA controller 80 that receives frames transmitted by the master AP 34 and/or the slave AP 44 as part of setting up a C-OFDMA transmission (or by another AP (not shown) as part of setting up another C-OFDMA transmission in another set of WLANs (not shown)), and uses information in such frames for purposes such as determining whether a communication medium is idle, according to various embodiments. The C-OFDMA controller 80 is described in more detail below.

Figure 1B:
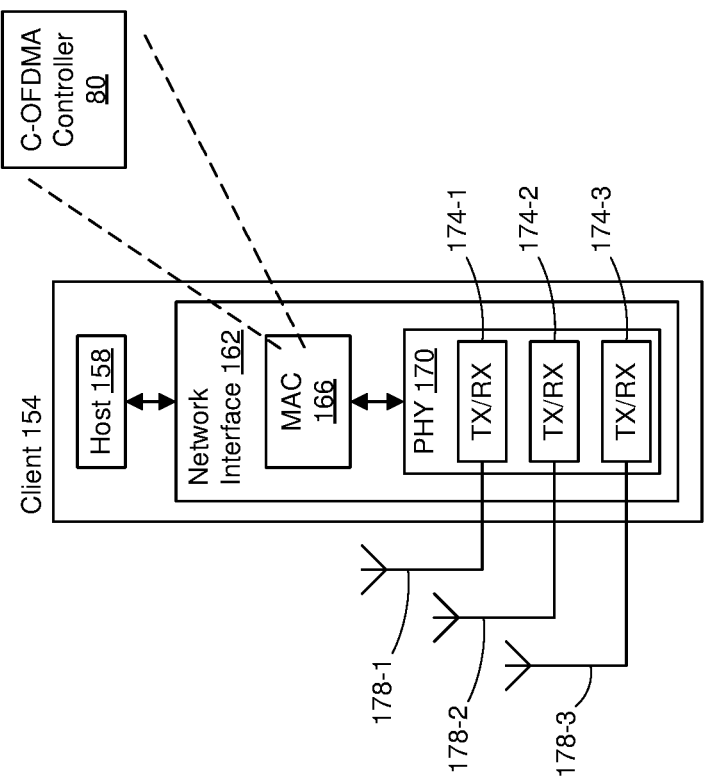
FIG. 1B is a block diagram of an example AP in the communication system of FIG. 1A, according to an embodiment.

FIG. 1B is a block diagram of an example AP 114 that may be used as the master AP 34 and/or the slave AP 44, in various embodiments. In some embodiments, the AP 114 is configured to operate as a master AP at some times, and a slave AP at other times. A master AP generally allocates frequency resource units (RUs) and/or spatial streams, etc., to slave APs for a C-OFDMA transmission, and initiates the C-OFDMA transmission. On the other hand, a slave AP generally participates in the C-OFDMA transmission in response to a prompt from a master AP and uses an RU and/or one or more spatial streams for the C-OFDMA transmission that were allocated to the slave AP by the master AP.

The AP 114 comprises a host processor 118 coupled to a wireless network interface device 122. The wireless network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the wireless network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130, according to some embodiments. The PHY processor 130 is configured to receive MAC layer data units from the MAC processor 126 and encapsulate the MAC layer data units to generate PHY data units such as PHY protocol data units (PPDUs) for transmission via the antennas 138, according to some embodiments. Similarly, the PHY processor 130 is configured to receive PHY data units that were received via the antennas 138, and extract MAC layer data units encapsulated within the PHY data units, according to some embodiments. The PHY processor 130 provides the extracted MAC layer data units to the MAC processor 126, which processes the MAC layer data units, according to some embodiments.

PHY data units are sometimes referred to herein as "packets", and MAC layer data units are sometimes referred to herein as "frames".

In connection with generating one or more RF signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes the C-OFDMA controller 60 and/or the C-OFDMA controller 70 of FIG. 1A. In some embodiments, the C-OFDMA controller 60 is configured to generate C-OFDMA-A frames and to prompt the PHY processor 130 to transmit the C-OFDMA-A frames, as will be described in more detail below. In some embodiments, the C-OFDMA controller 70 is configured to receive a C-OFDMA-A frame from another AP and to process the C-OFDMA frame, as will be described in more detail below.

Figure 1C:
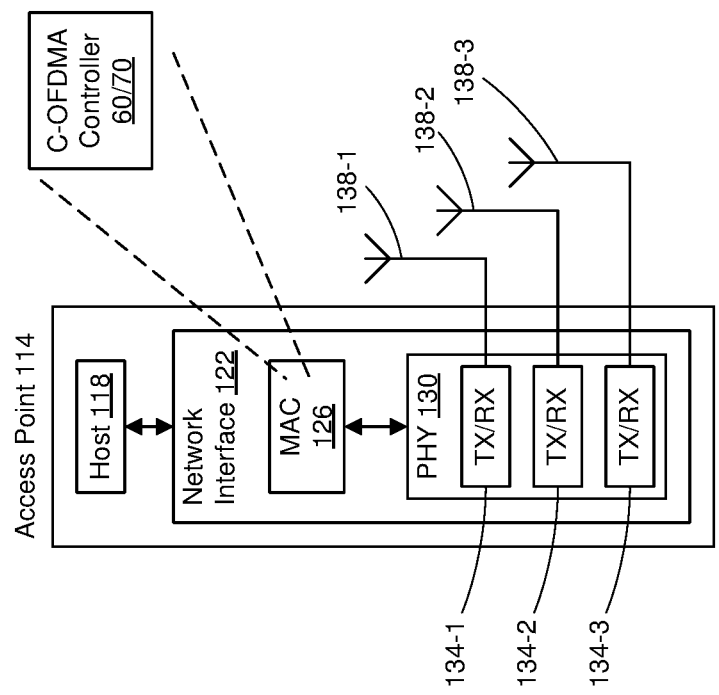
FIG. 1C is a block diagram of an example client station in the communication system of FIG. 1A, according to an embodiment.

FIG. 1C is a block diagram of an example client station 154 that may be used as one or more of the client stations 38/48 of FIG. 1A, in various embodiments. In other embodiments, one or more of the client stations 38/48 have a suitable structure different than the client station 154. For example, one or more of the client stations 38/48 are legacy client stations that do not include the C-OFDMA controller 80 of FIG. 1A.

The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170, according to some embodiments. The PHY processor 170 is configured to receive MAC layer data units from the MAC processor 166 and encapsulate the MAC layer data units to generate PHY data units such as PPDUs for transmission via the antennas 178, according to some embodiments. Similarly, the PHY processor 170 is configured to receive PHY data units that were received via the antennas 178, and extract MAC layer data units encapsulated within the PHY data units, according to some embodiments. The PHY processor 170 provides the extracted MAC layer data units to the MAC processor 166, which processes the MAC layer data units, according to some embodiments.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1 for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor (not shown) configured to execute machine readable instructions stored in a memory device (not shown) such as a RAM, a ROM, a flash memory, etc. In an embodiment, the MAC processor 166 includes a hardware state machine (not shown).

The MAC processor 166 includes the C-OFDMA controller 80 of FIG. 1A. In some embodiments, the C-OFDMA controller 80 is configured to receives frames transmitted as part of setting up a C-OFDMA transmission, and to use information in such frames for purposes such as determining whether a communication medium is idle, according to various embodiments.

Figure 2:
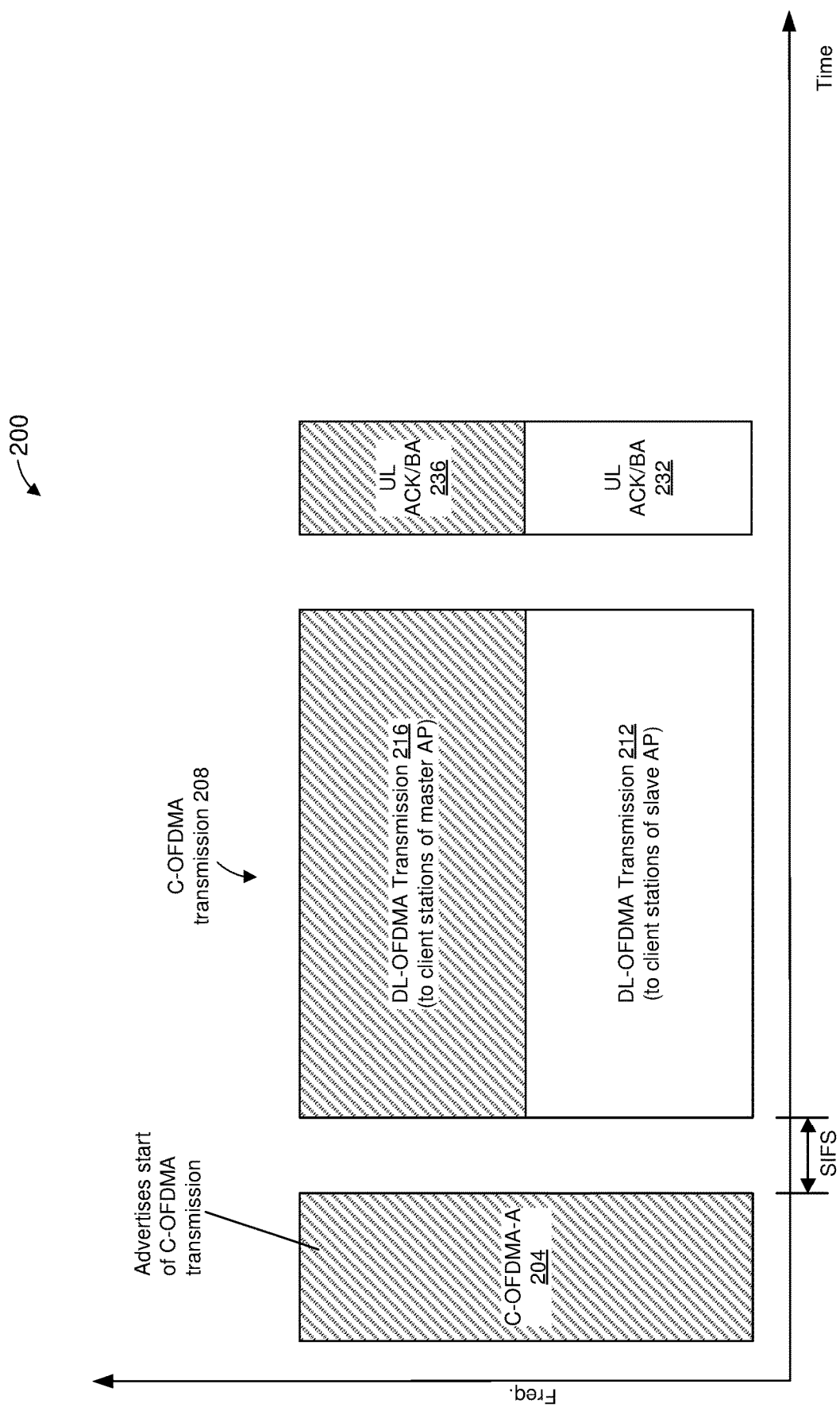
FIG. 2 is a diagram of an example coordinated MU downlink (DL) transmission implemented by the communication system of FIG. 1A, according to an embodiment.

FIG. 2 is a diagram of an example C-OFDMA DL packet exchange 200 in a communication system such as the communication system 10 of FIG. 1A, or another suitable communication system, according to an embodiment. FIG. 2 is described with reference to FIGS. 1A-C for explanatory purposes. In some embodiments, however, the C-OFDMA DL packet exchange 200 is implemented in other suitable communication systems and/or with suitable communication devices different than the example communication devices of FIGS. 1B-C.

A master AP (e.g., the master AP 34) generates and transmits a C-OFDMA-A frame 204 to one or more slave APs (e.g., the slave AP 44). The C-OFDMA-A frame advertises a start of a DL C-OFDMA transmission involving multiple WLANs, according to an embodiment. The C-OFDMA-A frame 204 includes information regarding the DL C-OFDMA transmission such as one of, or any suitable combination of two or more of, i) indicators of one or more WLANs that are to participate in the DL C-OFDMA transmission, ii) a respective frequency bandwidth to be used in a respective WLAN for the DL C-OFDMA transmission, iii)

a respective frequency RU to be used in a respective WLAN for the DL C-OFDMA transmission, iv) a duration (in time) of the DL C-OFDMA transmission, v) a respective length (in bits, octets, words, etc.) of a respective OFDMA transmission (which is part of the DL C-OFDMA transmission) in a respective WLAN, etc., according to various embodiments.

The C-OFDMA-A frame 204 is configured to prompt one or more slave APs 44 to transmit respective DL OFDMA transmissions as part of the DL C-OFDMA transmission, according to some embodiments.

In an embodiment, the C-OFDMA-A frame 204 is a MAC layer data unit transmitted within a PHY data unit (e.g., a packet) not shown in FIG. 2. In an embodiment, the network interface device 122 generates (e.g., the MAC processor 126 generates, the C-OFDMA controller 60 generates, etc.) the C-OFDMA-A frame 204. In an embodiment, the network interface device 122 generates and transmits (e.g., the PHY processor 130 generates and transmits) a packet that includes the C-OFDMA-A frame. In an embodiment, the C-OFDMA controller 60 generates the C-OFDMA-A frame 204, provides the C-OFDMA-A frame 204 to the PHY processor 130, and controls the PHY processor 130 to transmit the C-OFDMA-A frame 204 within a packet.

A defined time period after an end of transmission of the C-OFDMA-A frame 204 (or after an end of transmission of the packet that includes the C-OFDMA-A frame 204), the master AP and one or more slave APs transmit as part of a DL C-OFDMA transmission 208. In an embodiment, the defined time period is a short interframe space (SIFS) as defined by the IEEE 802.11 Standard. In other embodiments, the defined time period is a suitable time period different than SIFS.

Responsive to receiving the C-OFDMA-A frame 204 and as part of the DL C-OFDMA transmission, one or more slave APs generate and transmit respective downlink orthogonal frequency division multiple access (DL OFDMA) transmissions 212 in respective frequency RUs to respective one or more sets of client stations of the one or more slave APs. Although a DL-OFDMA transmission 212 from one slave AP is illustrated in FIG. 2 to simplify the diagram, multiple slave APs transmit multiple DL OFDMA transmissions 212 in respective frequency RUs in some scenarios.

As an illustrative embodiment, in response to receiving the C-OFDMA-A frame 204, the slave AP 44 determines (e.g., the network interface 122 determines, the MAC processor 126 determines, the C-OFDMA controller 70 determines, etc.) whether the slave AP 44 is to participate in the DL C-OFDMA transmission 208 by analyzing information in the C-OFDMA-A frame 204, such as one or more indicators of one or more WLANs (e.g., one or more basic service set (BSS) identifiers) that are to participate in the DL C-OFDMA transmission 208. In response to determining that the slave AP 44 is to participate in the C-OFDMA transmission 208, the slave AP 44 determines (e.g., the network interface 122 determines, the MAC processor 126 determines, the C-OFDMA controller 70 determines, etc.) a frequency segment that the slave AP 44 is to use for the DL C-OFDMA transmission 208 by analyzing information in the C-OFDMA-A frame 204, such as an indicator of the frequency segment to be used by the slave AP 44, a frequency RU to be used by the slave AP 44, etc.

Also in response to determining that the slave AP 44 is to participate in the C-OFDMA transmission 208, the slave AP 44 generates the DL-OFDMA transmission 212. In an embodiment, the slave AP 44 generates the DL-OFDMA transmission 212 according to parameters in the C-OFDMA-A frame 204 such as one of, or two or more of, an indicator of a duration (in time) of the DL C-OFDMA transmission 208, an indicator of a length (in bits, octets, words, etc.) of the DL OFDMA transmission 212 by the slave AP 44, etc., according to various embodiments. The AP 44 generates (e.g., the network interface 122 generates, the MAC processor 126 generates, etc.) a plurality of MAC data units for the DL OFDMA transmission 212 and provides the plurality of MAC data units to the PHY processor 130, the plurality of MAC data units for client stations 48 in a WLAN managed by the slave AP 44. The AP 44 also generates and transmits (e.g., the network interface 122 generates and transmits, the PHY processor 130 generates and transmits, etc.) the DL OFDMA transmission 212 to include the plurality of MAC data units. Thus, the DL OFDMA transmission 212 includes a plurality of MPDUs for client stations 48 in the WLAN managed by the slave AP 44. In some embodiments, the DL OFDMA transmission 212 includes a multi-user multiple input, multiple output (MU-MIMO) transmissions to multiple client stations 48 via a plurality of spatial streams. In some embodiments, DL OFDMA transmission 212 is replaced by an MU-MIMO transmission to multiple client stations 48 via a plurality of spatial streams.

In an embodiment, the slave AP 44 controls (e.g., the network interface 122 controls, the MAC processor 126 controls, the C-OFDMA controller 70 controls, etc.) timing of the DL OFDMA transmission 212 so that the DL OFDMA transmission 212 begins substantially simultaneously (i.e., within 5% of) with a beginning of a DL OFDMA transmission 216 by the master AP 34, according to an embodiment. For example, the slave AP 44 controls (e.g., the network interface 122 controls, the MAC processor 126 controls, the C-OFDMA controller 70 controls, etc.) timing of the DL OFDMA transmission 212 so that the DL OFDMA transmission 212 begins a defined time period after an end of reception of the C-OFDMA-A frame 204 (or after an end of reception of the packet that includes the C-OFDMA-A frame 204). In an embodiment, the defined time period is SIFS as defined by the IEEE 802.11 Standard. In other embodiments, the defined time period is a suitable time period different than SIFS.

Simultaneous with the DL OFDMA transmission(s) 212 by the slave AP(s) 44, the master AP 34 transmits the DL OFDMA transmission 216 in a frequency segment different than the frequency segment(s) used by the slave AP(s) 44 for the DL OFDMA transmission(s) 212. The DL OFDMA transmission 216 is to a plurality of client stations 38 in a WLAN managed by the master AP 34. The AP 34 generates (e.g., the network interface 122 generates, the MAC processor 126 generates, etc.) a plurality of MAC data units for the DL OFDMA transmission 216 and provides the plurality of MAC data units to the PHY processor 130, the plurality of MAC data units for the plurality of client stations 38 in the WLAN managed by the master AP 34. The AP 34 also generates and transmits (e.g., the network interface 122 generates and transmits, the PHY processor 130 generates and transmits, etc.) the DL OFDMA transmission 216 to include the plurality of MAC data units. Thus, the DL OFDMA transmission 216 includes a plurality of MPDUs for client stations 38 in the WLAN managed by the master AP 34. In some embodiments, the DL OFDMA transmission 216 includes a multi-user multiple input, multiple output (MU-MIMO) transmissions to multiple client stations 38 via a plurality of spatial streams. In some embodiments, DL OFDMA transmission 216 is replaced by an MU-MIMO transmission to multiple client stations 38 via a plurality of spatial streams.

In an embodiment, the master AP 34 controls (e.g., the network interface 122 controls, the MAC processor 126 controls, the C-OFDMA controller 60 controls, etc.) timing of the DL OFDMA transmission 216 so that the DL OFDMA transmission 216 begins substantially simultaneously (i.e., within 5% of) with a beginning of the DL OFDMA transmission(s) 212 by the slave AP(s) 44, according to an embodiment. For example, the slave AP 44 controls (e.g., the network interface 122 controls, the MAC processor 126 controls, the C-OFDMA controller 60 controls, etc.) timing of the DL OFDMA transmission 216 so that the DL OFDMA transmission 216 begins a defined time period after an end of transmission of the C-OFDMA-A frame 204 (or after an end of transmission of the packet that includes the C-OFDMA-A frame 204). In an embodiment, the defined time period is SIFS as defined by the IEEE 802.11 Standard. In other embodiments, the defined time period is a suitable time period different than SIFS.

In response to receiving the DL OFDMA transmission 212, client stations 48 in the WLAN managed by the slave AP 44, the client stations 48 transmit acknowledgment (ACK) information and/or block acknowledgment (BA) information in an UL transmission 232. In an embodiment, the UL transmission 232 is transmitted in the same frequency segment in which the DL OFDMA transmission 212 was transmitted.

The slave AP 44 receives (e.g., the network interface 122 receives, the MAC processor 126 receives, the PHY processor 130 receives, etc.) the UL transmission 232. In an embodiment, slave AP 44 receives the UL transmission 232 via the same frequency segment in which the DL OFDMA transmission 212 was transmitted.

In response to receiving the DL OFDMA transmission 216, client stations 38 in the WLAN managed by the master AP 34, the client stations 38 transmit ACK information and/or BA information in an UL transmission 236. In an embodiment, the UL transmission 236 is transmitted in the same frequency segment in which the DL OFDMA transmission 216 was transmitted.

The master AP 34 receives (e.g., the network interface 122 receives, the MAC processor 126 receives, the PHY processor 130 receives, etc.) the UL transmission 236. In an embodiment, master AP 34 receives the UL transmission 236 via the same frequency segment in which the DL OFDMA transmission 216 was transmitted.

The UL transmission 236 and the UL transmission(s) 232 by the slave AP(s) 44 are transmitted simultaneously, in an embodiment.

In an embodiment, a duration of the UL transmission 232 is specified in the C-OFDMA-A frame 204. For example, the C-OFDMA-A frame 204 includes an indication of the duration of the UL transmission 232, according to an embodiment.

In an embodiment, the slave AP 44 includes (e.g., network interface 122 includes, the MAC processor 126 includes, the C-OFDMA controller 70 includes, etc.) the indicator of the duration of the UL transmission 232 in the DL OFDMA transmission 212, and the client station 48 uses (e.g., the network interface 122 uses, the MAC processor 126 uses, the C-OFDMA controller 80 uses, etc.) the indicator of the duration of the UL transmission 232 to generate the UL transmission 232 to have the indicated duration. In another embodiment, the client station 48 receives the C-OFDMA-A frame 204 and uses (e.g., the network interface 122 uses, the MAC processor 126 uses, the C-OFDMA controller 80 uses, etc.) the indicator of the duration of the UL transmission 232 in the C-OFDMA-A frame 204 to generate the UL transmission 232 to have the indicated duration.

Figure 3:
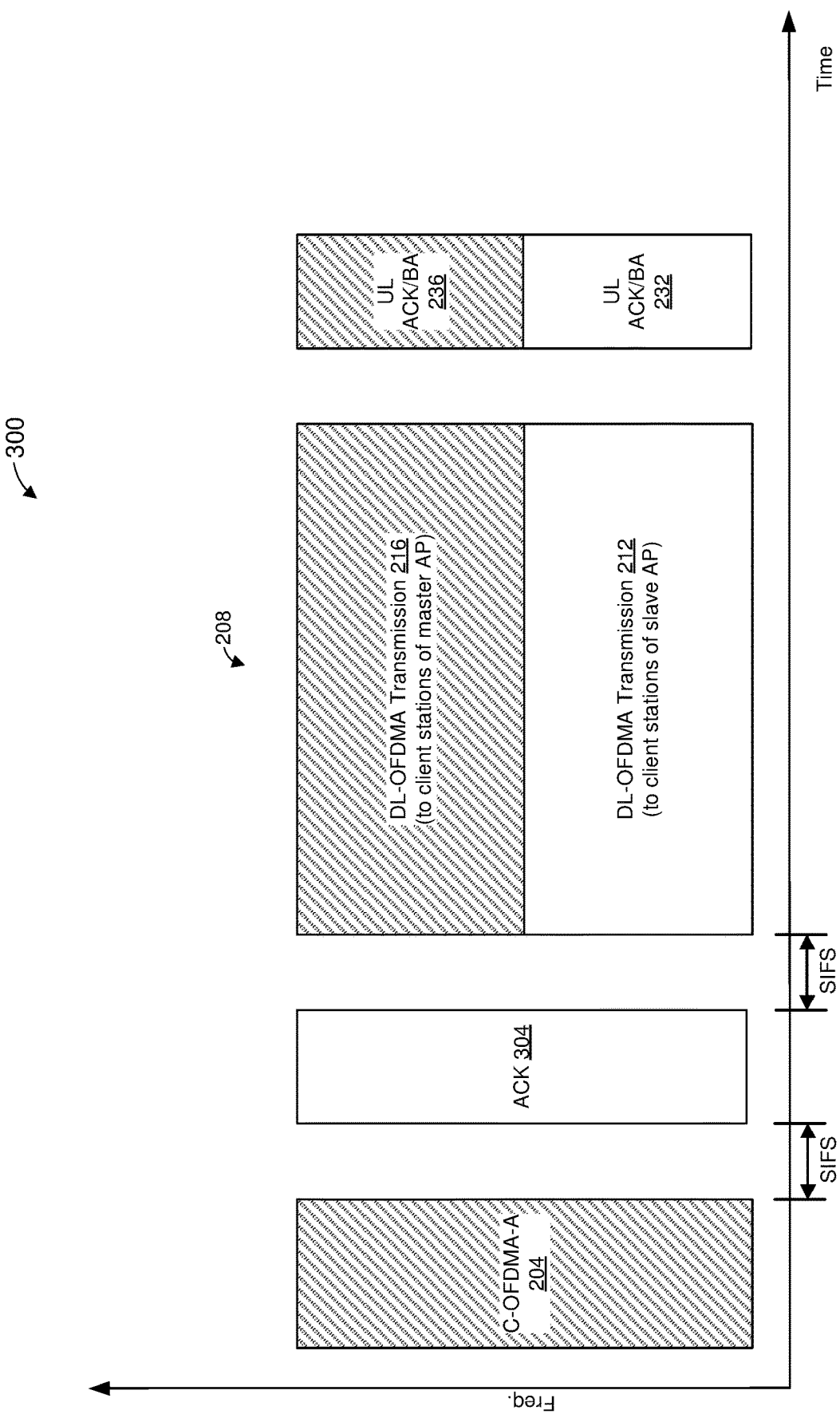
FIG. 3 is a diagram of another example coordinated MU DL transmission implemented by the communication system of FIG. 1A, according to another embodiment.

FIG. 3 is a diagram of another example C-OFDMA DL packet exchange 300 in a communication system such as the communication system 10 of FIG. 1A, or another suitable communication system, according to another embodiment. FIG. 3 is described with reference to FIGS. 1A-C for explanatory purposes. In some embodiments, however, the C-OFDMA DL packet exchange 300 is implemented in other suitable communication systems and/or with suitable communication devices different than the example communication devices of FIGS. 1B-C.

In the packet exchange 300, the slave AP 44 generates and transmits an ACK 304 that acknowledges the C-OFDMA-A frame 204 in response to receiving the C-OFDMA-A frame 204. In an embodiment, the slave AP 44 generates and transmits a packet that includes the ACK 304, the packet spanning a same frequency bandwidth that the C-OFDMA-A frame 204 spans. When the C-OFDMA-A frame 204 is addressed to multiple slave APs 44, the multiple slave APs 44 transmit respective ACKs 304 via different spatial streams using UL MU-MIMO, the respective transmissions spanning the same frequency bandwidth that the C-OFDMA-A frame 204 spans, according to an embodiment. For example, in an embodiment, the C-OFDMA-A frame 204 indicates respective spatial streams that the multiple slave APs 44 are to use to transmit the ACKs 304.

In another embodiment, when the C-OFDMA-A frame 204 is addressed to multiple slave APs 44, the multiple slave APs 44 transmit respective ACKs 304 at different times, the respective transmissions spanning the same frequency bandwidth that the C-OFDMA-A frame 204 spans. For example, in an embodiment, the C-OFDMA-A frame 204 indicates an order in which the multiple slave APs 44 are to transmit the ACKs 304.

In an embodiment, the slave AP 44 controls (e.g., the network interface 122 controls, the MAC processor 126 controls, the C-OFDMA controller 70 controls, etc.) timing of the transmission of the ACK 304 so that transmission of the ACK 304 (or a packet that includes the ACK 304) begins a defined time period after an end of reception of the C-OFDMA-A frame 204 (or after an end of reception of the packet that includes the C-OFDMA-A frame 204). In an embodiment, the defined time period is SIFS as defined by the IEEE 802.11 Standard. In other embodiments, the defined time period is a suitable time period different than SIFS.

In an embodiment, the slave AP 44 controls (e.g., the network interface 122 controls, the MAC processor 126 controls, the C-OFDMA controller 70 controls, etc.) timing of the transmission of the DL OFDMA transmission 212 so that transmission begins a defined time period after an end of transmission of the ACK 304 (or after an end of transmission of the packet that includes the ACK 304). In an embodiment, the defined time period is SIFS as defined by the IEEE 802.11 Standard. In other embodiments, the defined time period is a suitable time period different than SIFS. When multiple slave APs 44 transmit multiple ACKs 304 at different times, the slave AP 44 controls (e.g., the network interface 122 controls, the MAC processor 126 controls, the C-OFDMA controller 70 controls, etc.) timing of the transmission of the DL OFDMA transmission 212 so that transmission begins a defined time period after an end of transmission of the last occurring ACK 304 (or after an end of transmission of the packet that includes the last occurring ACK 304).

In an embodiment, the master AP 34 controls (e.g., the network interface 122 controls, the MAC processor 126 controls, the C-OFDMA controller 60 controls, etc.) timing of the transmission of the DL OFDMA transmission 216 so that transmission begins a defined time period after an end of transmission of the ACK 304 (or after an end of transmission of the packet that includes the ACK 304). When multiple slave APs 44 transmit multiple ACKs 304 at different times, the master AP 34 controls (e.g., the network interface 122 controls, the MAC processor 126 controls, the C-OFDMA controller 60 controls, etc.) timing of the transmission of the DL OFDMA transmission 216 so that transmission begins a defined time period after an end of transmission of the last occurring ACK 304 (or after an end of transmission of the packet that includes the last occurring ACK 304).

Figure 4:
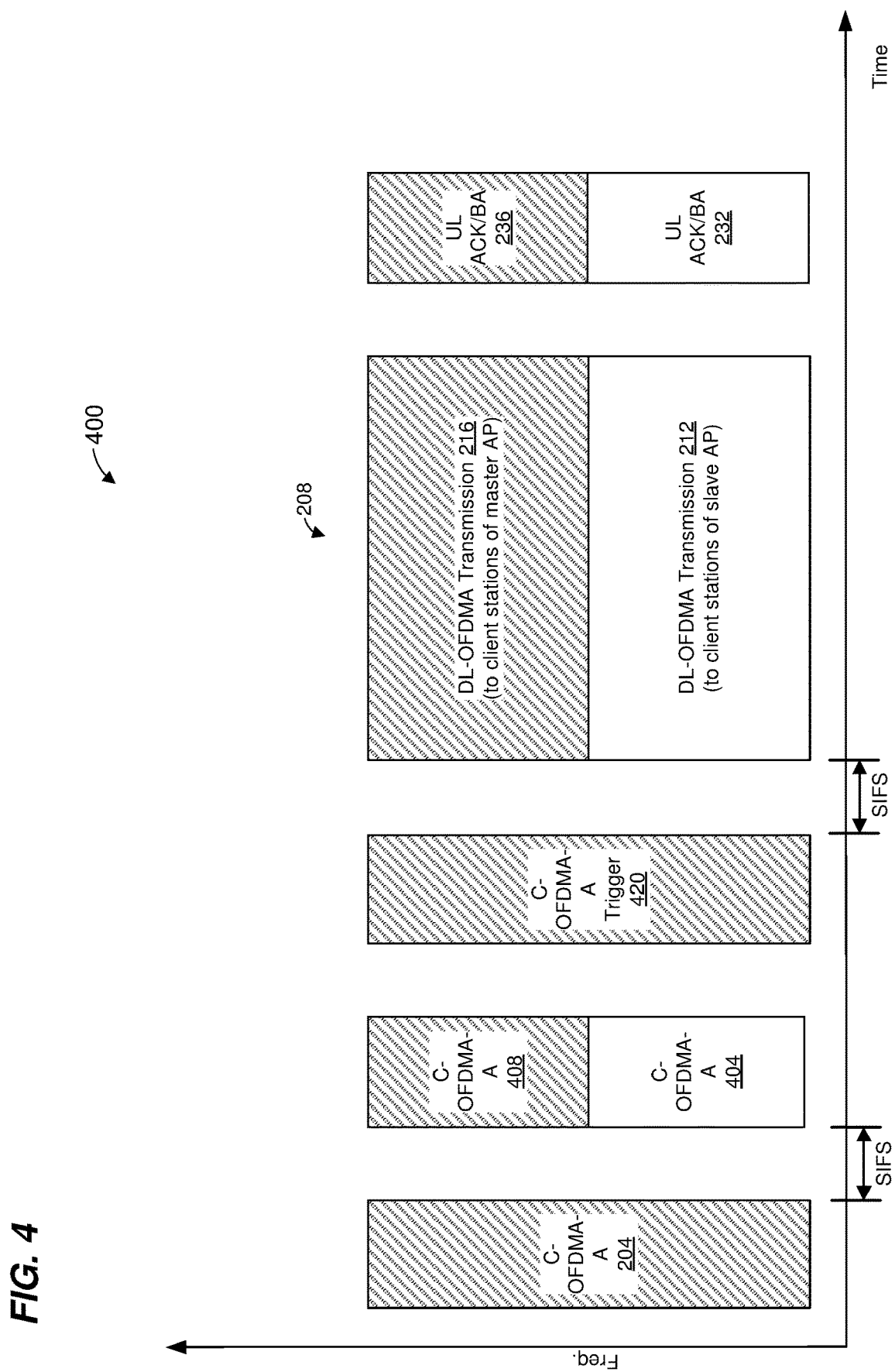
FIG. 4 is a diagram of another example coordinated MU DL transmission implemented by the communication system of FIG. 1A, according to another embodiment.

FIG. 4 is a diagram of yet another example C-OFDMA DL packet exchange 400 in a communication system such as the communication system 10 of FIG. 1A, or another suitable communication system, according to yet another embodiment. In some embodiments, the C-OFDMA DL packet exchange 400 is useful in situations involving a channel switch in one or more WLANs participating in the C-OFDMA transmission.

FIG. 4 is described with reference to FIGS. 1A-C for explanatory purposes. In some embodiments, however, the C-OFDMA DL packet exchange 400 is implemented in other suitable communication systems and/or with suitable communication devices different than the example communication devices of FIGS. 1B-C.

In the packet exchange 400, the slave AP 44 generates and transmits a C-OFDMA-A frame 404 in response to receiving the C-OFDMA-A frame 204. In an embodiment, the C-OFDMA-A frame 404 is a copy of the C-OFDMA-A frame 204. The slave AP 44 generates and transmits a packet that includes the OFDMA-A frame 404, the packet spanning a frequency segment indicated in the C-OFDMA-A frame 204 (e.g., the frequency segment that the slave AP 44 is to use for the C-OFDMA transmission 208. When the C-OFDMA-A frame 204 is addressed to multiple slave APs 44, the multiple slave APs 44 transmit respective C-OFDMA-A frames 404 in respective frequency segments, the respective C-OFDMA-A frames 404 being copies of the C-OFDMA-A frame 204, according to an embodiment. For example, in an embodiment, the C-OFDMA-A frame 204 indicates respective frequency segments that the multiple slave APs 44 are to use for the C-OFDMA transmission 208.

Additionally, the master AP 34 generates a C-OFDMA-A frame 408, and transmits the C-OFDMA-A frame 408 (e.g., within a packet) simultaneously with transmission of the C-OFDMA-A frame 404. In an embodiment, the C-OFDMA-A frame 408 is a copy of the C-OFDMA-A frame 204.

In an embodiment, generating a packet that includes the C-OFDMA-A frame 204 includes scrambling (e.g., by a scrambler circuit of the PHY processor 130) the C-OFDMA-A frame 204 according to a scrambling algorithm and using a first scrambling seed (e.g., an initial value to seed the scrambling algorithm implemented by the scrambler circuit); and generating a packet that includes the C-OFDMA-A frame 404/408 includes scrambling (e.g., by a scrambler circuit of the PHY processor 130) the C-OFDMA-A frame 404/408 according to the scrambling algorithm and using a second scrambling seed (e.g., an initial value to seed the scrambling algorithm implemented by the scrambler circuit). In an embodiment, the first scrambling seed is the same as the second scrambling seed. In another embodiment, the first scrambling seed is different than the second scrambling seed. In an embodiment, generating a packet that includes the C-OFDMA-A frame 404/408 includes using one of, or any suitable combination of two or more of: i) a same modulation and coding scheme (MCS) used for the packet that included the C-OFDMA-A frame 204, ii) a same data rate used for the packet that included the C-OFDMA-A frame 204, iii) a same number of spatial streams used for the packet that included the C-OFDMA-A frame 204, iv) a same PPDU format used for the packet that included the C-OFDMA-A frame 204, etc.

In an embodiment, the slave AP 44 controls (e.g., the network interface 122 controls, the MAC processor 126 controls, the C-OFDMA controller 70 controls, etc.) timing of the transmission of the C-OFDMA-A frame 404 so that transmission of the C-OFDMA-A frame 404 (or a packet that includes the C-OFDMA-A frame 404) begins a defined time period after an end of reception of the C-OFDMA-A frame 204 (or after an end of reception of the packet that includes the C-OFDMA-A frame 204). In an embodiment, the defined time period is SIFS as defined by the IEEE 802.11 Standard. In other embodiments, the defined time period is a suitable time period different than SIFS.

In an embodiment, the master AP 34 controls (e.g., the network interface 122 controls, the MAC processor 126 controls, the C-OFDMA controller 60 controls, etc.) timing of the transmission of the C-OFDMA-A frame 408 so that transmission of the C-OFDMA-A frame 408 (or a packet that includes the C-OFDMA-A frame 408) begins a defined time period after an end of transmission of the C-OFDMA-A frame 204 (or after an end of transmission of the packet that includes the C-OFDMA-A frame 204). In an embodiment, the defined time period is SIFS as defined by the IEEE 802.11 Standard. In other embodiments, the defined time period is a suitable time period different than SIFS.

After transmission of the C-OFDMA-A frame 404 and the C-OFDMA-A frame 408, the master AP transmits a C-OFDMA trigger frame 420 to prompt the slave AP(s) 44 to transmit as part of the C-OFDMA transmission 208. In an embodiment, the C-OFDMA trigger frame 420 includes some or all of the same information included in the C-OFDMA-A frame 204, such as one of, or any suitable combination of two or more of: i) indicators of one or more WLANs that are to participate in the DL C-OFDMA transmission, ii) a respective frequency bandwidth to be used in a respective WLAN for the DL C-OFDMA transmission, iii) a respective frequency RU to be used in a respective WLAN for the DL C-OFDMA transmission, iv) a duration (in time) of the DL C-OFDMA transmission, v) a respective length (in bits, octets, words, etc.) of a respective OFDMA transmission (which is part of the DL C-OFDMA transmission) in a respective WLAN, etc., according to various embodiments.

The C-OFDMA trigger frame 420 is configured to prompt one or more slave APs 44 to transmit respective DL OFDMA transmissions as part of the DL C-OFDMA transmission 208, according to some embodiments.

In an embodiment, the C-OFDMA trigger frame 420 is a MAC layer data unit transmitted within a PHY data unit (e.g., a packet) not shown in FIG. 2. In an embodiment, the network interface device 122 generates (e.g., the MAC processor 126 generates, the C-OFDMA controller 60 generates, etc.) the C-OFDMA trigger frame 420. In an embodiment, the network interface device 122 generates and transmits (e.g., the PHY processor 130 generates and transmits)

a packet that includes the C-OFDMA trigger frame 420. In an embodiment, the C-OFDMA controller 60 generates the C-OFDMA trigger frame 420, provides the C-OFDMA trigger frame 420 to the PHY processor 130, and controls the PHY processor 130 to transmit the C-OFDMA trigger frame 420 within a packet.

A defined time period after an end of transmission of the C-OFDMA trigger frame 420 (or after an end of transmission of the packet that includes the C-OFDMA trigger frame 420), the master AP and one or more slave APs transmit as part of the DL C-OFDMA transmission 208. In an embodiment, the defined time period is SIFS as defined by the IEEE 802.11 Standard. In other embodiments, the defined time period is a suitable time period different than SIFS.

Figure 5:
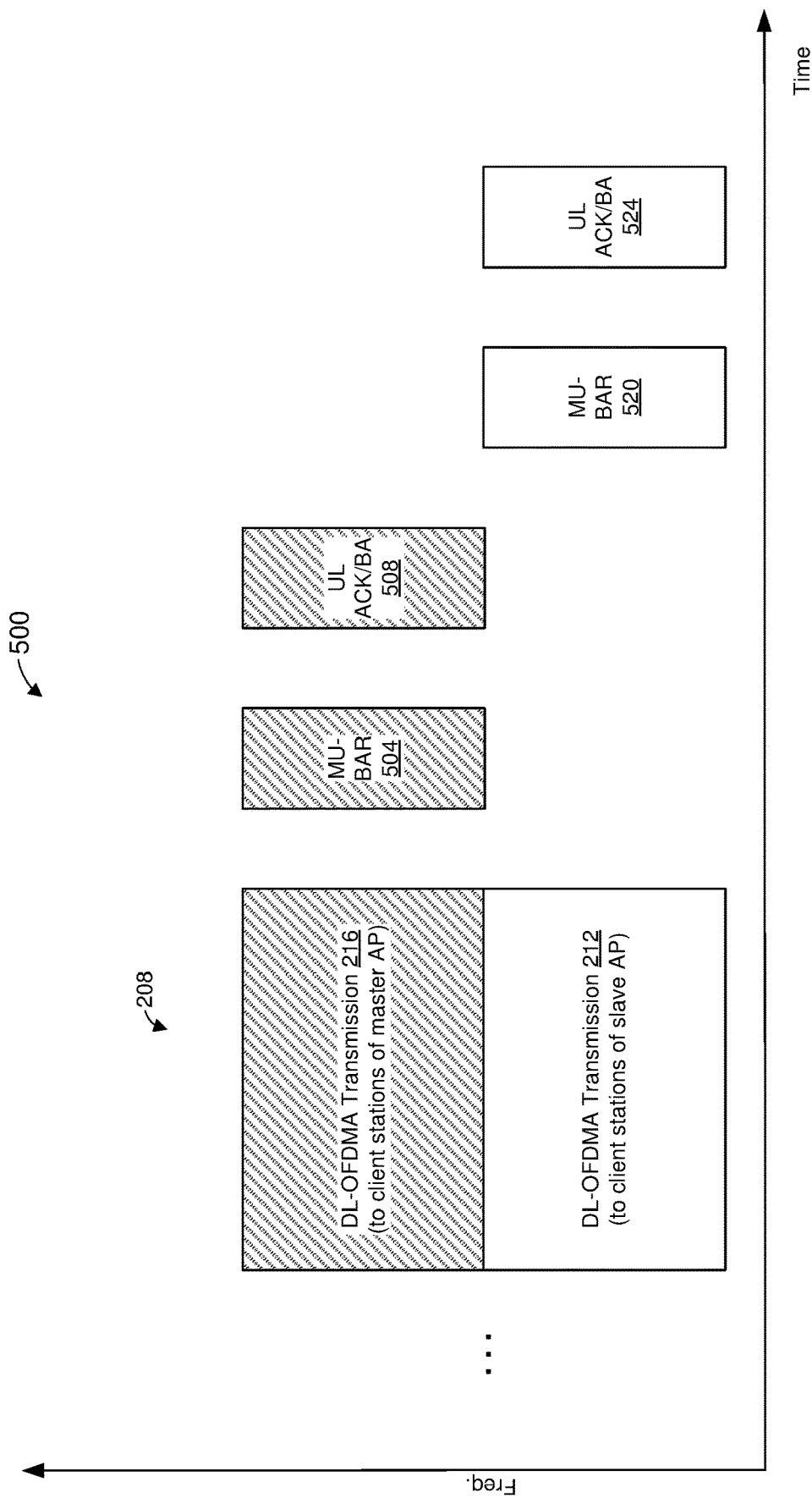
FIG. 5 is a diagram of an example acknowledgment procedure used in a coordinated MU DL transmission such as in FIGS. 2-4, according to an embodiment.

FIG. 5 is a diagram of an example acknowledgment packet exchange 500 for a DL C-OFDMA transmission in a communication system such as the communication system 10 of FIG. 1A, or another suitable communication system, according to an embodiment. FIG. 5 is described with reference to FIGS. 1A-C for explanatory purposes. In some embodiments, however, the acknowledgment packet exchange 500 is implemented in other suitable communication systems and/or with suitable communication devices different than the example communication devices of FIGS. 1B-C.

The acknowledgment packet exchange 500 is used in connection with any of the DL C-OFDMA transmissions of FIGS. 2-4, or with other suitable DL C-OFDMA transmissions, according to various embodiments.

In the acknowledgment packet exchange 500, respective sets of client stations corresponding to respective WLANs transmit respective acknowledgement information at different times. In some embodiments, the C-OFDMA-A frame 204 includes an indication of an order in which slave APs 44 are to prompt respective sets of client stations to transmit respective acknowledgement information. In some embodiments that utilize a C-OFDMA trigger frame 420 (FIG. 4), the C-OFDMA trigger frame 420 additionally or alternatively includes the indication of the order in which slave APs 44 are to prompt respective sets of client stations to transmit respective acknowledgement information.

After the DL C-OFDMA transmission 208, the master AP 34 generates and transmits a multi-user block acknowledgment request (MU-BAR) frame 504. In an embodiment, the MU-BAR frame 504 is included in a packet (not shown). In an embodiment, the network interface device 122 generates (e.g., the MAC processor 126 generates) the MU-BAR frame 504, and the network interface device 122 generates and transmits (e.g., the PHY processor 130 generates and transmits) the packet that includes the MU-BAR frame 504. The MU-BAR frame 504 is configured to prompt client stations 38 of the WLAN managed by the master AP 34 to transmit to the master AP 34 acknowledgment information regarding the DL OFDMA transmission 216 in an UL transmission 508 (e.g., an UL OFDMA transmission, an UL MU-MIMO transmission, etc.). Responsive to the MU-BAR frame 504, client stations 38 of the WLAN managed by the master AP 34 transmit acknowledgment information regarding the DL OFDMA transmission 216 in the UL transmission 508.

In an embodiment, the packet including the MU-BAR frame 504 and the UL transmission 508 are transmitted in a same frequency segment in which the DL OFDMA transmission 216 was transmitted.

After the UL transmission 508, the slave AP 44 generates and transmits an MU-BAR frame 520. In an embodiment, the MU-BAR frame 520 is included in a packet (not shown). In an embodiment, the network interface device 122 generates (e.g., the MAC processor 126 generates) the MU-BAR frame 520, and the network interface device 122 generates and transmits (e.g., the PHY processor 130 generates and transmits) the packet that includes the MU-BAR frame 520. The MU-BAR frame 520 is configured to prompt client stations 48 of the WLAN managed by the slave AP 44 to transmit to the slave AP 44 acknowledgment information regarding the DL OFDMA transmission 212 in an UL transmission 524 (e.g., an UL OFDMA transmission, an UL MU-MIMO transmission, etc.). Responsive to the MU-BAR frame 520, client stations 48 of the WLAN managed by the slave AP 44 transmit acknowledgment information regarding the DL OFDMA transmission 212 in the UL transmission 524.

In an embodiment, the packet including the MU-BAR frame 520 and the UL transmission 524 are transmitted in a same frequency segment in which the DL OFDMA transmission 212 was transmitted.

Figure 6:
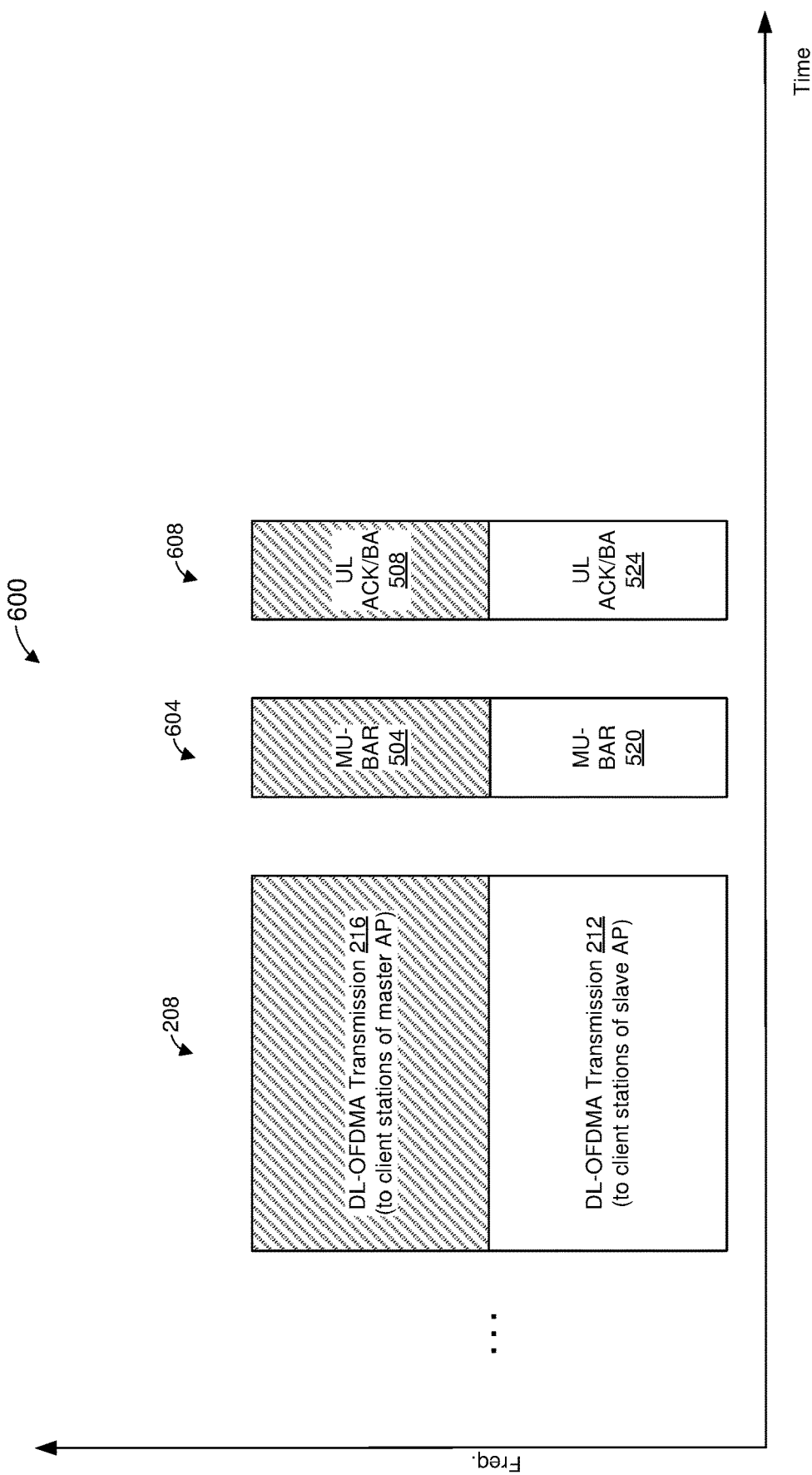
FIG. 6 is a diagram of another example acknowledgment procedure used in a coordinated MU DL transmission such as in FIGS. 2-4, according to another embodiment.

FIG. 6 is a diagram of another example acknowledgment packet exchange 600 for a DL C-OFDMA transmission in a communication system such as the communication system 10 of FIG. 1A, or another suitable communication system, according to another embodiment. FIG. 6 is described with reference to FIGS. 1A-C for explanatory purposes. In some embodiments, however, the acknowledgment packet exchange 600 is implemented in other suitable communication systems and/or with suitable communication devices different than the example communication devices of FIGS. 1B-C.

The acknowledgment packet exchange 600 is used in connection any of the DL C-OFDMA transmissions of FIGS. 2-4, or with other suitable DL C-OFDMA transmissions, according to various embodiments.

In the acknowledgment packet exchange 600, respective sets of client stations corresponding to respective WLANs transmit respective acknowledgement information simultaneously as part of an UL C-OFDMA transmission.

After the DL C-OFDMA transmission 208, the master AP 34 and the slave AP(s) 44 transmit MU-BAR frames as part of a further DL C-OFDMA transmission 604. In an embodiment, the packet including the MU-BAR frame 504 and the UL transmission 508 are transmitted in a same frequency segment in which the DL OFDMA transmission 216 was transmitted; and the packet including the MU-BAR frame 520 and the UL transmission 524 are transmitted in a same frequency segment in which the DL OFDMA transmission 212 was transmitted.

In an embodiment, the master AP 34 controls (e.g., the network interface 122 controls, the MAC processor 126 controls, the C-OFDMA controller 60 controls, etc.) timing of the transmission of the MU-BAR frame 504 so that transmission of the MU-BAR frame 504 (or a packet that includes the MU-BAR frame 504) begins a defined time period after an end of transmission of the DL OFDMA transmission 216. In an embodiment, the defined time period is SIFS as defined by the IEEE 802.11 Standard. In other embodiments, the defined time period is a suitable time period different than SIFS. In an embodiment, the slave AP 44 controls (e.g., the network interface 122 controls, the MAC processor 126 controls, the C-OFDMA controller 70 controls, etc.) timing of the transmission of the MU-BAR frame 520 so that transmission of the MU-BAR frame 520 (or a packet that includes the MU-BAR frame 520) begins a defined time period after an end of transmission of the DL OFDMA transmission 212. In an embodiment, the defined time period is SIFS as defined by the IEEE 802.11 Standard.

In other embodiments, the defined time period is a suitable time period different than SIFS.

Figure 7:
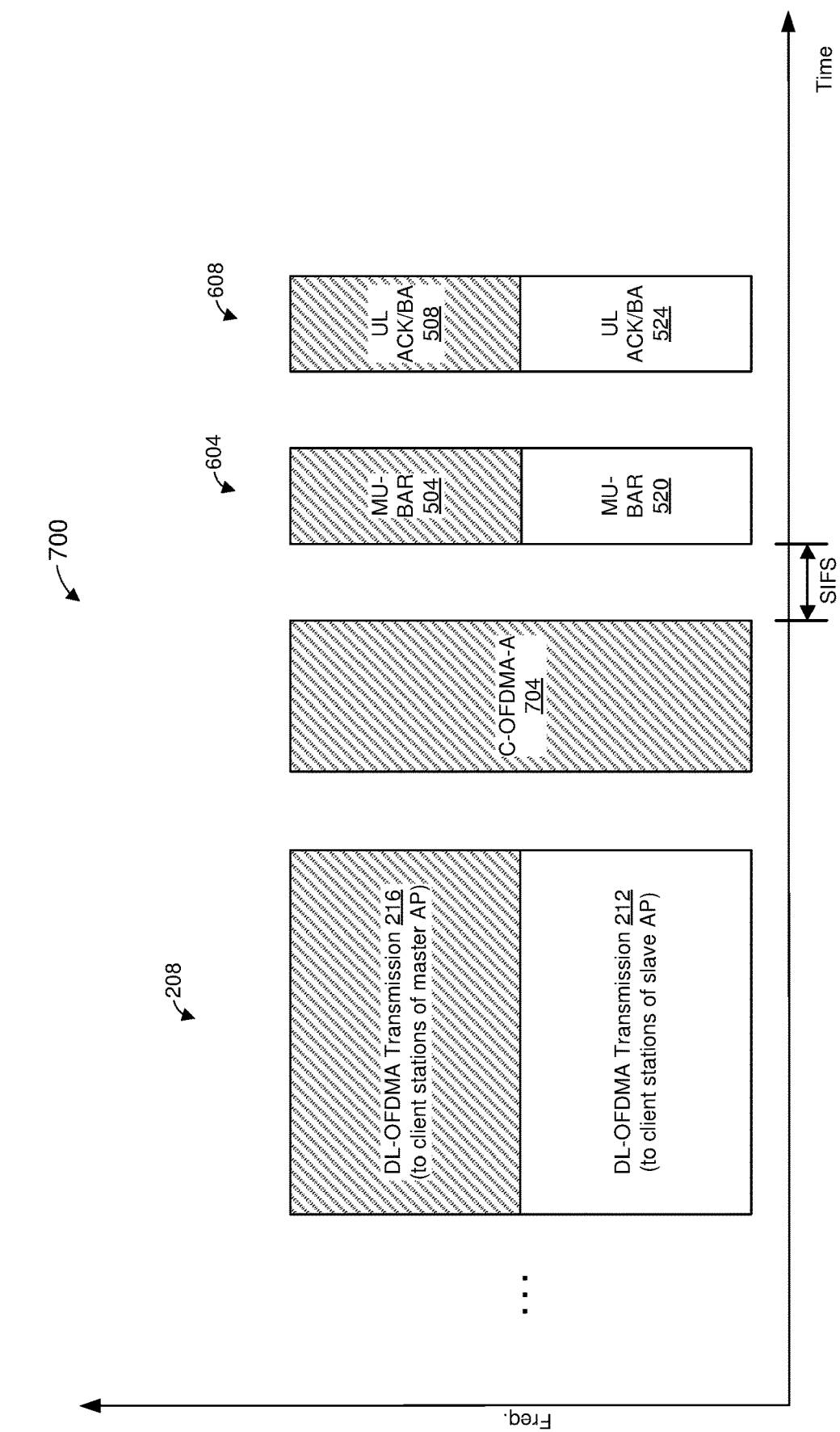
FIG. 7 is a diagram of another example acknowledgment procedure used in a coordinated MU DL transmission such as in FIGS. 2-4, according to another embodiment.

FIG. 7 is a diagram of yet another example acknowledgment packet exchange 700 for a DL C-OFDMA transmission in a communication system such as the communication system 10 of FIG. 1A, or another suitable communication system, according to another embodiment. FIG. 7 is described with reference to FIGS. 1A-C for explanatory purposes. In some embodiments, however, the acknowledgment packet exchange 700 is implemented in other suitable communication systems and/or with suitable communication devices different than the example communication devices of FIGS. 1B-C.

The acknowledgment packet exchange 700 is used in connection any of the DL C-OFDMA transmissions of FIGS. 2-4, or with other suitable DL C-OFDMA transmissions, according to various embodiments.

The acknowledgment packet exchange 700 is similar to the acknowledgment packet exchange 600 of FIG. 6, except that the master AP 34 generates and transmits a further C-OFDMA-A frame 704 in connection with the DL C-OFDMA transmission 604.

Figure 8:
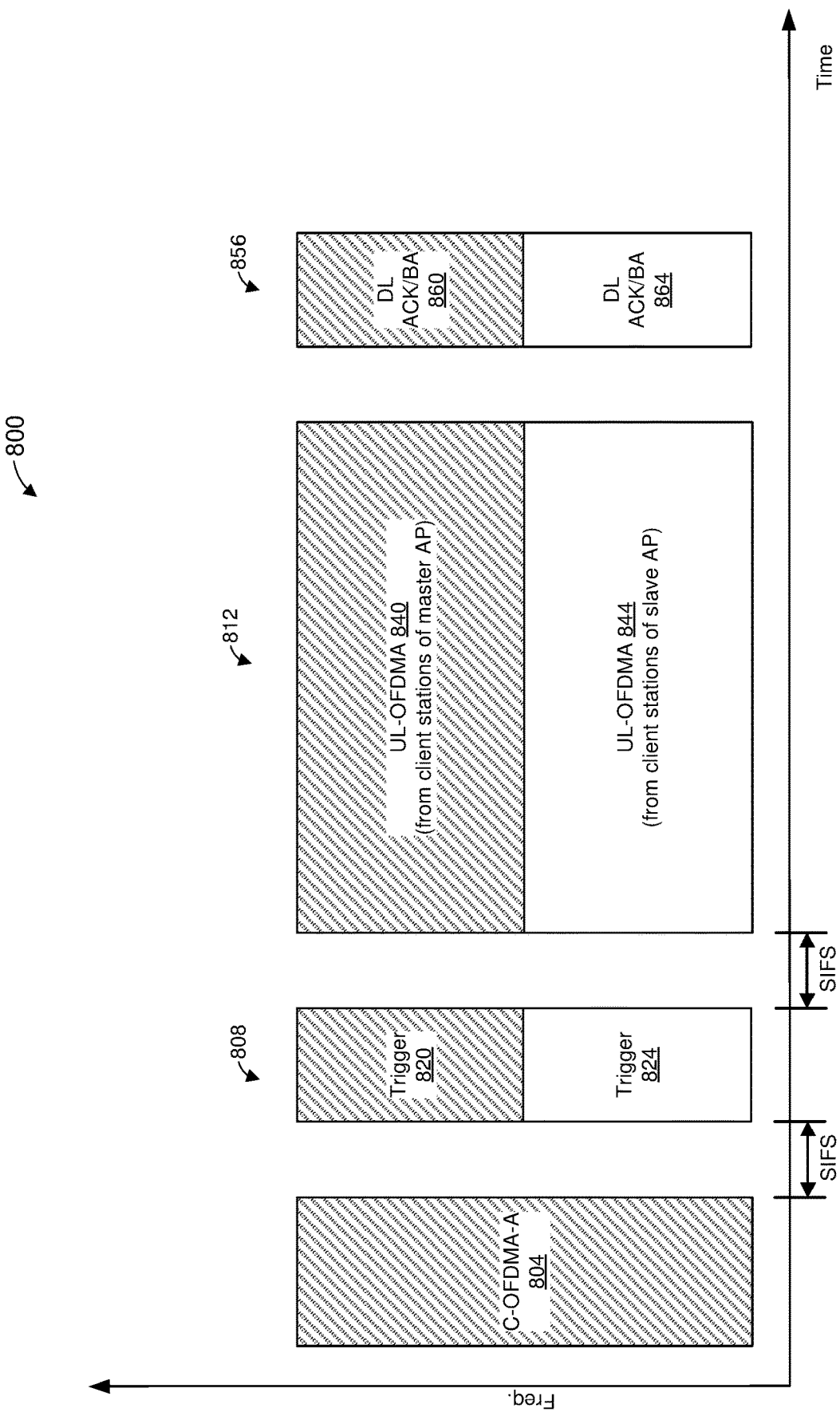
FIG. 8 is a diagram of an example coordinated MU uplink (UL) transmission implemented by the communication system of FIG. 1A, according to an embodiment.

FIG. 8 is a diagram of an example C-OFDMA uplink (UL) packet exchange 800 in a communication system such as the communication system 10 of FIG. 1A, or another suitable communication system, according to an embodiment. FIG. 8 is described with reference to FIGS. 1A-C for explanatory purposes. In some embodiments, however, the C-OFDMA UL packet exchange 800 is implemented in other suitable communication systems and/or with suitable communication devices different than the example communication devices of FIGS. 1B-C.

A master AP (e.g., the master AP 34) generates and transmits a C-OFDMA-A frame 804 to one or more slave APs (e.g., the slave AP 44). The C-OFDMA-A frame advertises a start of a UL C-OFDMA transmission involving multiple WLANs, according to an embodiment. The C-OFDMA-A frame 804 includes information regarding the UL C-OFDMA transmission such as one of, or any suitable combination of two or more of, i) indicators of one or more WLANs that are to participate in the UL C-OFDMA transmission, ii) a respective frequency bandwidth to be used in a respective WLAN for the UL C-OFDMA transmission, iii) a respective frequency RU to be used in a respective WLAN for the UL C-OFDMA transmission, iv) a duration (in time) of the UL C-OFDMA transmission, v) a respective length (in bits, octets, words, etc.) of a respective OFDMA transmission (which is part of the UL C-OFDMA transmission) in a respective WLAN, etc., according to various embodiments.

The C-OFDMA-A frame 804 is configured to prompt one or more slave APs 44 to transmit respective trigger frames to prompt respective sets of client stations to transmit as part of the UL C-OFDMA transmission, according to some embodiments.

In an embodiment, the C-OFDMA-A frame 804 is a MAC layer data unit transmitted within a PHY data unit (e.g., a packet) not shown in FIG. 8. In an embodiment, the network interface device 122 generates (e.g., the MAC processor 126 generates, the C-OFDMA controller 60 generates, etc.) the C-OFDMA-A frame 804. In an embodiment, the network interface device 122 generates and transmits (e.g., the PHY processor 130 generates and transmits) a packet that includes the C-OFDMA-A frame 804. In an embodiment, the C-OFDMA controller 60 generates the C-OFDMA-A frame 804, provides the C-OFDMA-A frame 804 to the PHY processor 130, and controls the PHY processor 130 to transmit the C-OFDMA-A frame 804 within a packet.

A defined time period after an end of transmission of the C-OFDMA-A frame 804 (or after an end of transmission of the packet that includes the C-OFDMA-A frame 204), the master AP and one or more slave APs transmit as part of a DL C-OFDMA transmission 808. In an embodiment, the defined time period is SIFS as defined by the IEEE 802.11 Standard. In other embodiments, the defined time period is a suitable time period different than SIFS.

Responsive to receiving the C-OFDMA-A frame 804 and as part of the DL C-OFDMA transmission 808, one or more slave APs generate and transmit respective trigger frames 820/824 in respective frequency RUs to respective one or more sets of client stations of the one or more slave APs. Although one trigger frame 824 from one slave AP is illustrated in FIG. 8 to simplify the diagram, multiple slave APs transmit multiple trigger frames in respective frequency RUs in some scenarios.

As an illustrative embodiment, in response to receiving the C-OFDMA-A frame 804, the slave AP 44 determines (e.g., the network interface 122 determines, the MAC processor 126 determines, the C-OFDMA controller 70 determines, etc.) whether the slave AP 44 is to participate in the DL C-OFDMA transmission 808 by analyzing information in the C-OFDMA-A frame 804, such as one or more indicators of one or more WLANs (e.g., one or more BSS identifiers) that are to participate in the UL C-OFDMA transmission announced by the C-OFDMA-A frame 804. In response to determining that the slave AP 44 is to participate in the DL C-OFDMA transmission 808, the slave AP 44 determines (e.g., the network interface 122 determines, the MAC processor 126 determines, the C-OFDMA controller 70 determines, etc.) a frequency segment that the slave AP 44 is to use for the DL C-OFDMA transmission 808 by analyzing information in the C-OFDMA-A frame 804, such as an indicator of the frequency segment to be used by the slave AP 44, a frequency RU to be used by the slave AP 44, etc.

Also in response to determining that the slave AP 44 is to participate in the DL C-OFDMA transmission 808, the slave AP 44 generates (e.g., the network interface 122 generates, the MAC processor 126 generates, etc.) the trigger frame 824. In an embodiment, the slave AP 44 generates the trigger frame 824 according to parameters in the such as one of, or two or more of, an indicator of a frequency RU to be used for the UL C-OFDMA transmission, an indicator of a duration (in time) of the UL C-OFDMA transmission, etc., according to various embodiments. For example, the trigger frame 824 is generated to specify respective frequency RUs, within the frequency RU indicated by the C-OFDMA frame 804, that client stations of the slave 44 are to use for the UL C-OFDMA transmission, according to an embodiment. As another example, the trigger frame 824 is generated to specify a duration of the UL C-OFDMA transmission indicated by the C-OFDMA-A frame 804, according to an embodiment.

Also in response to determining that the slave AP 44 is to participate in the DL C-OFDMA transmission 808, the slave AP 44 generates and transmits (e.g., the network interface 122 generates and transmits, the PHY processor 130 generates and transmits, etc.) a packet that includes the trigger frame 824.

In an embodiment, the slave AP 44 controls (e.g., the network interface 122 controls, the MAC processor 126 controls, the C-OFDMA controller 70 controls, etc.) timing of the transmission of the trigger frame 824 (or of transmission of the packet that includes the trigger frame 824) so that transmission of the trigger frame 824 (or of the packet that includes the trigger frame 824) begins substantially simultaneously (i.e., within 5% of) with a beginning of a transmission by the master AP 34 of the trigger frame 820 (or of a packet that includes the trigger frame 820), according to an embodiment. For example, the slave AP 44 controls (e.g., the network interface 122 controls, the MAC processor 126 controls, the C-OFDMA controller 70 controls, etc.) timing of the packet that includes the trigger frame 824 so that the packet begins a defined time period after an end of reception of the C-OFDMA-A frame 804 (or after an end of reception of the packet that includes the C-OFDMA-A frame 804). In an embodiment, the defined time period is SIFS as defined by the IEEE 802.11 Standard. In other embodiments, the defined time period is a suitable time period different than SIFS.

Simultaneous with the transmission of the trigger frame(s) 824 by the slave AP(s) 44, the master AP 34 transmits the trigger frame 820 (or a packet that includes the trigger frame 820) in a frequency segment different than the frequency segment(s) used by the slave AP(s) 44 for the trigger frame(s) 824. In an embodiment, the master AP 34 controls (e.g., the network interface 122 controls, the MAC processor 126 controls, the C-OFDMA controller 60 controls, etc.) timing of the transmission of the trigger frame 820 (or the packet that includes the trigger frame 820) so that transmission of the trigger frame 820 (or the packet that includes the trigger frame 820) begins substantially simultaneously (i.e., within 5% of) with a beginning of the transmission of the trigger packet 824 (or the packet that includes the trigger frame 824) by the slave AP(s) 44, according to an embodiment. For example, the master AP 34 controls (e.g., the network interface 122 controls, the MAC processor 126 controls, the C-OFDMA controller 60 controls, etc.) timing of the trigger frame 820 so that the trigger frame 820 (or the packet that includes the trigger frame 820) begins a defined time period after an end of transmission of the C-OFDMA-A frame 804 (or after an end of transmission of the packet that includes the C-OFDMA-A frame 804). In an embodiment, the defined time period is SIFS as defined by the IEEE 802.11 Standard. In other embodiments, the defined time period is a suitable time period different than SIFS.

The trigger frame 820 from the master AP 34 and the trigger frame(s) 824 from the slave AP(s) 44 prompt an UL C-OFDMA transmission 812 by client stations 34/38 in WLANs managed by the master AP 34 and the slave AP(s) 44. The UL C-OFDMA transmission 812 comprises an UL OFDMA transmission 840 by client stations 38 in the WLAN managed by the master AP 34, and one or more UL OFDMA transmission(s) 844 by client stations 38 in one or more respective WLANs managed by one or more respective slave APs 44.

For instance, responsive to the trigger frame 820, client stations 38 in the WLAN managed by the master AP 34 transmit as part of the UL OFDMA transmission 840. For example, the trigger frame 820 transmitted by the master AP 34 is configured to prompt at least a subset of client station 38 to transmit as part of an UL OFDMA transmission 840. In various embodiments, the trigger frame 820 is generated by the master AP 34 indicate one of, or any suitable combination of two or more of: i) which client stations 38 are to participate in the UL OFDMA transmission 840, ii) respective frequency RUs client stations 38 are to use for the UL OFDMA transmission 840, iii) respective spatial streams client stations 38 are to use for the UL OFDMA transmission 840, iv) a duration of the UL OFDMA transmission 840.

Similarly, responsive to the trigger frame 824, client stations 48 in the WLAN managed by the slave AP 44 transmit as part of the UL OFDMA transmission 844. For example, the trigger frame 824 transmitted by the slave AP 44 is configured to prompt at least a subset of client station 48 to transmit as part of an UL OFDMA transmission 844. In various embodiments, the trigger frame 824 is generated by the slave AP 44 to indicate one of, or any suitable combination of two or more of: i) which client stations 38 are to participate in the UL OFDMA transmission 844, ii) respective frequency RUs client stations 38 are to use for the UL OFDMA transmission 844, iii) respective spatial streams client stations 38 are to use for the UL OFDMA transmission 844, iv) a duration of the UL OFDMA transmission 844.

Client stations 38 participating in the UL OFDMA transmission 840 are configured to transmit, as part of the UL OFDMA transmission 840, simultaneously with transmissions by client stations 48 participating in the UL OFDMA transmission 844, and vice versa, according to an embodiment. For example, client stations 38 participating in the UL OFDMA transmission 840 are configured to begin transmitting, as part of the UL OFDMA transmission 840, a defined time period (e.g., SIFS or another suitable time period) after an end of reception of the trigger frame 820 (or an end of reception of a packet that includes the trigger frame 820), according to an embodiment. Similarly, client stations 48 participating in the UL OFDMA transmission 844 are configured to begin transmitting, as part of the UL OFDMA transmission 844, a defined time period (e.g., SIFS or another suitable time period) after an end of reception of the trigger frame 824 (or an end of reception of a packet that includes the trigger frame 824), according to an embodiment.

Figure 9:
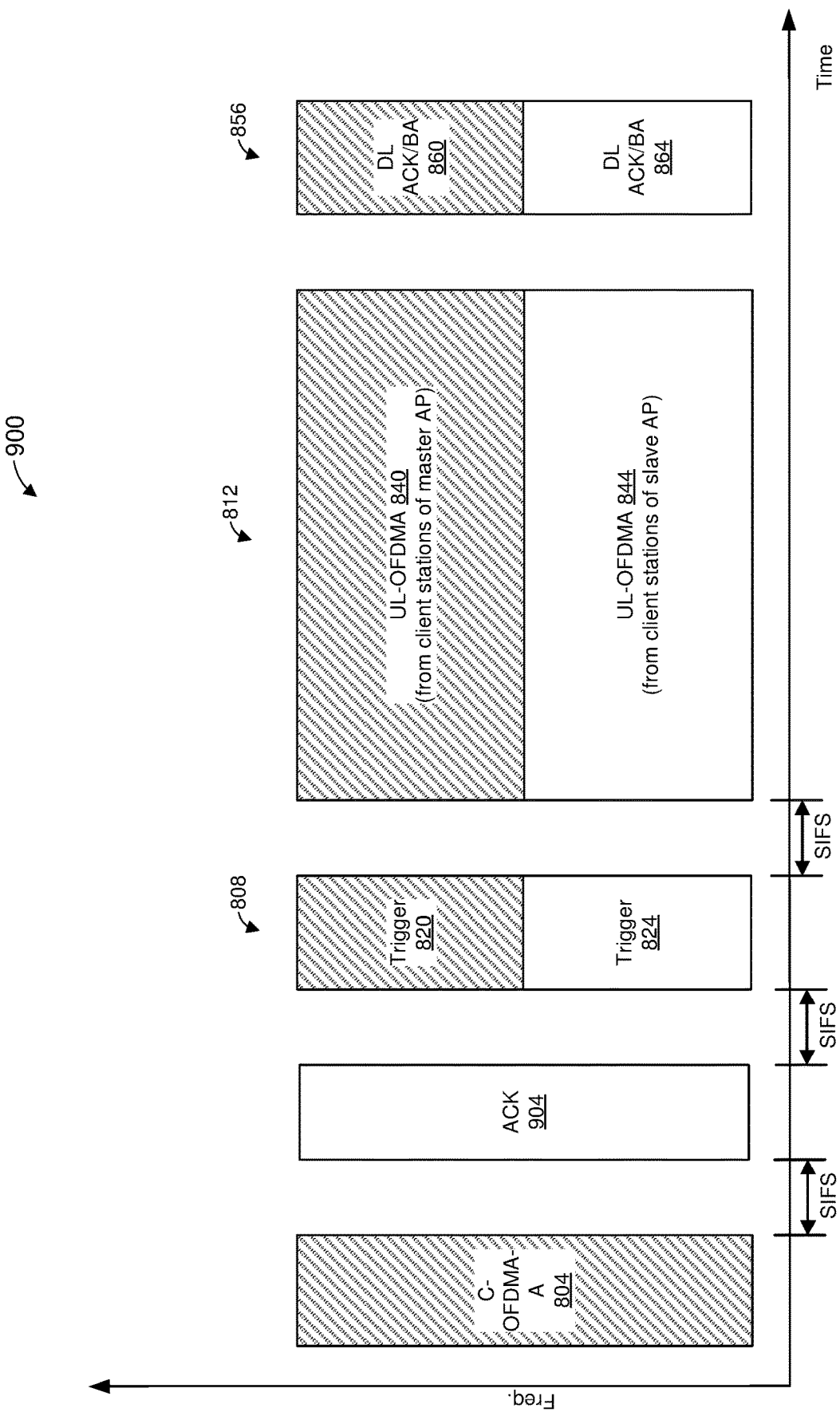
FIG. 9 is a diagram of another example coordinated MU UL transmission implemented by the communication system of FIG. 1A, according to another embodiment.

FIG. 9 is a diagram of another example C-OFDMA UL packet exchange 900 in a communication system such as the communication system 10 of FIG. 1A, or another suitable communication system, according to another embodiment. FIG. 9 is described with reference to FIGS. 1A-C for explanatory purposes. In some embodiments, however, the C-OFDMA DL packet exchange 900 is implemented in other suitable communication systems and/or with suitable communication devices different than the example communication devices of FIGS. 1B-C.

In the packet exchange 900, the slave AP 44 generates and transmits an ACK 904 that acknowledges the C-OFDMA-A frame 804 in response to receiving the C-OFDMA-A frame 804. In an embodiment, the slave AP 44 generates and transmits a packet that includes the ACK 904, the packet spanning a same frequency bandwidth that the C-OFDMA-A frame 804 spans. When the C-OFDMA-A frame 804 is addressed to multiple slave APs 44, the multiple slave APs 44 transmit respective ACKs 904 via different spatial streams using UL MU-MIMO, the respective transmissions spanning the same frequency bandwidth that the C-OFDMA-A frame 804 spans, according to an embodiment. For example, in an embodiment, the C-OFDMA-A frame 804 indicates respective spatial streams that the multiple slave APs 44 are to use to transmit the ACKs 904.

In another embodiment, when the C-OFDMA-A frame 804 is addressed to multiple slave APs 44, the multiple slave APs 44 transmit respective ACKs 904 at different times, the respective transmissions spanning the same frequency bandwidth that the C-OFDMA-A frame 804 spans. For example, in an embodiment, the C-OFDMA-A frame 804 indicates an order in which the multiple slave APs 44 are to transmit the ACKs 904.

In an embodiment, the slave AP 44 controls (e.g., the network interface 122 controls, the MAC processor 126 controls, the C-OFDMA controller 70 controls, etc.) timing of the transmission of the ACK 904 so that transmission of the ACK 904 (or a packet that includes the ACK 904) begins a defined time period after an end of reception of the C-OFDMA-A frame 804 (or after an end of reception of the packet that includes the C-OFDMA-A frame 804). In an embodiment, the defined time period is SIFS as defined by the IEEE 802.11 Standard. In other embodiments, the defined time period is a suitable time period different than SIFS.

In an embodiment, the slave AP 44 controls (e.g., the network interface 122 controls, the MAC processor 126 controls, the C-OFDMA controller 70 controls, etc.) timing of the transmission of the trigger frame 824 (or a packet that includes the trigger frame 824) so that transmission begins a defined time period after an end of transmission of the ACK 904 (or after an end of transmission of the packet that includes the ACK 904). In an embodiment, the defined time period is SIFS as defined by the IEEE 802.11 Standard. In other embodiments, the defined time period is a suitable time period different than SIFS. When multiple slave APs 44 transmit multiple ACKs 904 at different times, the slave AP 44 controls (e.g., the network interface 122 controls, the MAC processor 126 controls, the C-OFDMA controller 70 controls, etc.) timing of the transmission of the trigger frame 824 (or a packet that includes the trigger frame 824) so that transmission begins a defined time period after an end of transmission of the last occurring ACK 904 (or after an end of transmission of the packet that includes the last occurring ACK 904).

In an embodiment, the master AP 34 controls (e.g., the network interface 122 controls, the MAC processor 126 controls, the C-OFDMA controller 60 controls, etc.) timing of the transmission of the trigger frame 820 (or a packet that includes the trigger frame 820) so that transmission begins a defined time period after an end of transmission of the ACK 904 (or after an end of transmission of the packet that includes the ACK 904). When multiple slave APs 44 transmit multiple ACKs 904 at different times, the master AP 34 controls (e.g., the network interface 122 controls, the MAC processor 126 controls, the C-OFDMA controller 60 controls, etc.) timing of the transmission of the trigger frame 820 (or a packet that includes the trigger frame 820) so that transmission begins a defined time period after an end of transmission of the last occurring ACK 904 (or after an end of transmission of the packet that includes the last occurring ACK 904).

Figure 10:
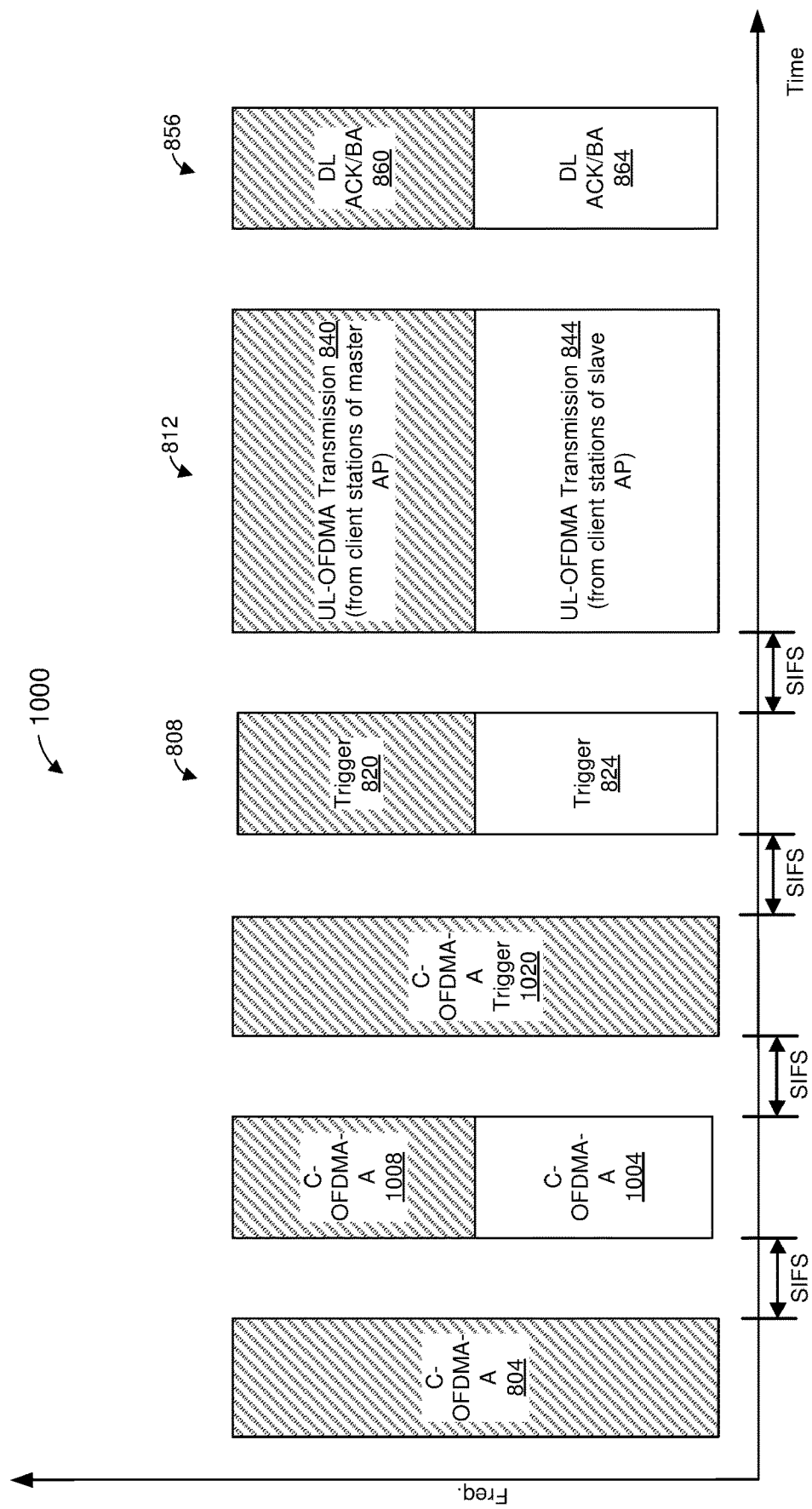
FIG. 10 is a diagram of another example coordinated MU UL transmission implemented by the communication system of FIG. 1A, according to another embodiment.

FIG. 10 is a diagram of yet another example C-OFDMA UL packet exchange 1000 in a communication system such as the communication system 10 of FIG. 1A, or another suitable communication system, according to yet another embodiment. In some embodiments, the C-OFDMA DL packet exchange 1000 is useful in situations involving a channel switch in one or more WLANs participating in the C-OFDMA transmission.

FIG. 10 is described with reference to FIGS. 1A-C for explanatory purposes. In some embodiments, however, the C-OFDMA DL packet exchange 1000 is implemented in other suitable communication systems and/or with suitable communication devices different than the example communication devices of FIGS. 1B-C.

In the packet exchange 1000, the slave AP 44 generates and transmits a C-OFDMA-A frame 1004 in response to receiving the C-OFDMA-A frame 804. In an embodiment, the C-OFDMA-A frame 1004 is a copy of the C-OFDMA-A frame 804. The slave AP 44 generates and transmits a packet that includes the C-OFDMA-A frame 1004, the packet spanning a frequency segment indicated in the C-OFDMA-A frame 804 (e.g., the frequency segment that the WLAN managed by the slave AP 44 is to use for the UL OFDMA transmission 844). When the C-OFDMA-A frame 804 is addressed to multiple slave APs 44, the multiple slave APs 44 transmit respective C-OFDMA-A frames 1004 in respective frequency segments, the respective C-OFDMA-A frames 1004 being copies of the C-OFDMA-A frame 804, according to an embodiment. For example, in an embodiment, the C-OFDMA-A frame 804 indicates respective frequency segments that the multiple slave APs 44 are to use for the C-OFDMA transmission 1004.

Additionally, the master AP 34 generates a C-OFDMA-A frame 1008, and transmits the C-OFDMA-A frame 1008 (e.g., within a packet) simultaneously with transmission of the C-OFDMA-A frame 1004. In an embodiment, the C-OFDMA-A frame 1008 is a copy of the C-OFDMA-A frame 804.

In an embodiment, generating a packet that includes the C-OFDMA-A frame 804 includes scrambling (e.g., by a scrambler circuit of the PHY processor 130) the C-OFDMA-A frame 804 according to a scrambling algorithm and using a first scrambling seed (e.g., an initial value to seed the scrambling algorithm implemented by the scrambler circuit); and generating a packet that includes the C-OFDMA-A frame 1004/1008 includes scrambling (e.g., by a scrambler circuit of the PHY processor 130) the C-OFDMA-A frame 1004/1008 according to the scrambling algorithm and using a second scrambling seed (e.g., an initial value to seed the scrambling algorithm implemented by the scrambler circuit). In an embodiment, the first scrambling seed is the same as the second scrambling seed. In another embodiment, the first scrambling seed is different than the second scrambling seed. In an embodiment, generating a packet that includes the C-OFDMA-A frame 1004/1008 includes using one of, or any suitable combination of two or more of: i) a same MCS used for the packet that included the C-OFDMA-A frame 804, ii) a same data rate used for the packet that included the C-OFDMA-A frame 804, iii) a same number of spatial streams used for the packet that included the C-OFDMA-A frame 804, iv) a same PPDU format used for the packet that included the C-OFDMA-A frame 804, etc.

In an embodiment, the slave AP 44 controls (e.g., the network interface 122 controls, the MAC processor 126 controls, the C-OFDMA controller 70 controls, etc.) timing of the transmission of the C-OFDMA-A frame 1004 so that transmission of the C-OFDMA-A frame 1004 (or a packet that includes the C-OFDMA-A frame 1004) begins a defined time period after an end of reception of the C-OFDMA-A frame 804 (or after an end of reception of the packet that includes the C-OFDMA-A frame 804). In an embodiment, the defined time period is SIFS as defined by the IEEE 802.11 Standard. In other embodiments, the defined time period is a suitable time period different than SIFS.

In an embodiment, the master AP 34 controls (e.g., the network interface 122 controls, the MAC processor 126 controls, the C-OFDMA controller 60 controls, etc.) timing of the transmission of the C-OFDMA-A frame 1008 so that transmission of the C-OFDMA-A frame 1008 (or a packet that includes the C-OFDMA-A frame 1008) begins a defined time period after an end of transmission of the C-OFDMA-A frame 804 (or after an end of transmission of the packet that includes the C-OFDMA-A frame 804). In an embodiment, the defined time period is SIFS as defined by the IEEE 802.11 Standard. In other embodiments, the defined time period is a suitable time period different than SIFS.

After transmission of the C-OFDMA-A frame 1004 and the C-OFDMA-A frame 1008, the master AP transmits a C-OFDMA trigger frame 1020 to prompt the slave AP(s) 44 to transmit as part of the C-OFDMA transmission 808. In an embodiment, the C-OFDMA trigger frame 1020 includes some or all of the same information included in the C-OFDMA-A frame 804, such as one of, or any suitable combination of two or more of: i) indicators of one or more WLANs that are to participate in the DL C-OFDMA transmission, ii) a respective frequency bandwidth to be used in a respective WLAN for the DL C-OFDMA transmission, iii) a respective frequency RU to be used in a respective WLAN for the DL C-OFDMA transmission, iv) a duration (in time) of the DL C-OFDMA transmission, v) a respective length (in bits, octets, words, etc.) of a respective OFDMA transmission (which is part of the DL C-OFDMA transmission) in a respective WLAN, etc., according to various embodiments.

The C-OFDMA trigger frame 1020 is configured to prompt one or more slave APs 44 to transmit respective DL OFDMA transmissions as part of the DL C-OFDMA transmission 808, according to some embodiments.

In an embodiment, the C-OFDMA trigger frame 1020 is a MAC layer data unit transmitted within a PHY data unit (e.g., a packet) not shown in FIG. 2. In an embodiment, the network interface device 122 generates (e.g., the MAC processor 126 generates, the C-OFDMA controller 60 generates, etc.) the C-OFDMA trigger frame 1020. In an embodiment, the network interface device 122 generates and transmits (e.g., the PHY processor 130 generates and transmits) a packet that includes the C-OFDMA trigger frame 1020. In an embodiment, the C-OFDMA controller 60 generates the C-OFDMA trigger frame 1020, provides the C-OFDMA trigger frame 1020 to the PHY processor 130, and controls the PHY processor 130 to transmit the C-OFDMA trigger frame 1020 within a packet.

A defined time period after an end of transmission of the C-OFDMA trigger frame 1020 (or after an end of transmission of the packet that includes the C-OFDMA trigger frame 1020), the master AP and one or more slave APs transmit as part of the DL C-OFDMA transmission 808. In an embodiment, the defined time period is SIFS as defined by the IEEE 802.11 Standard. In other embodiments, the defined time period is a suitable time period different than SIFS.

Figure 11:
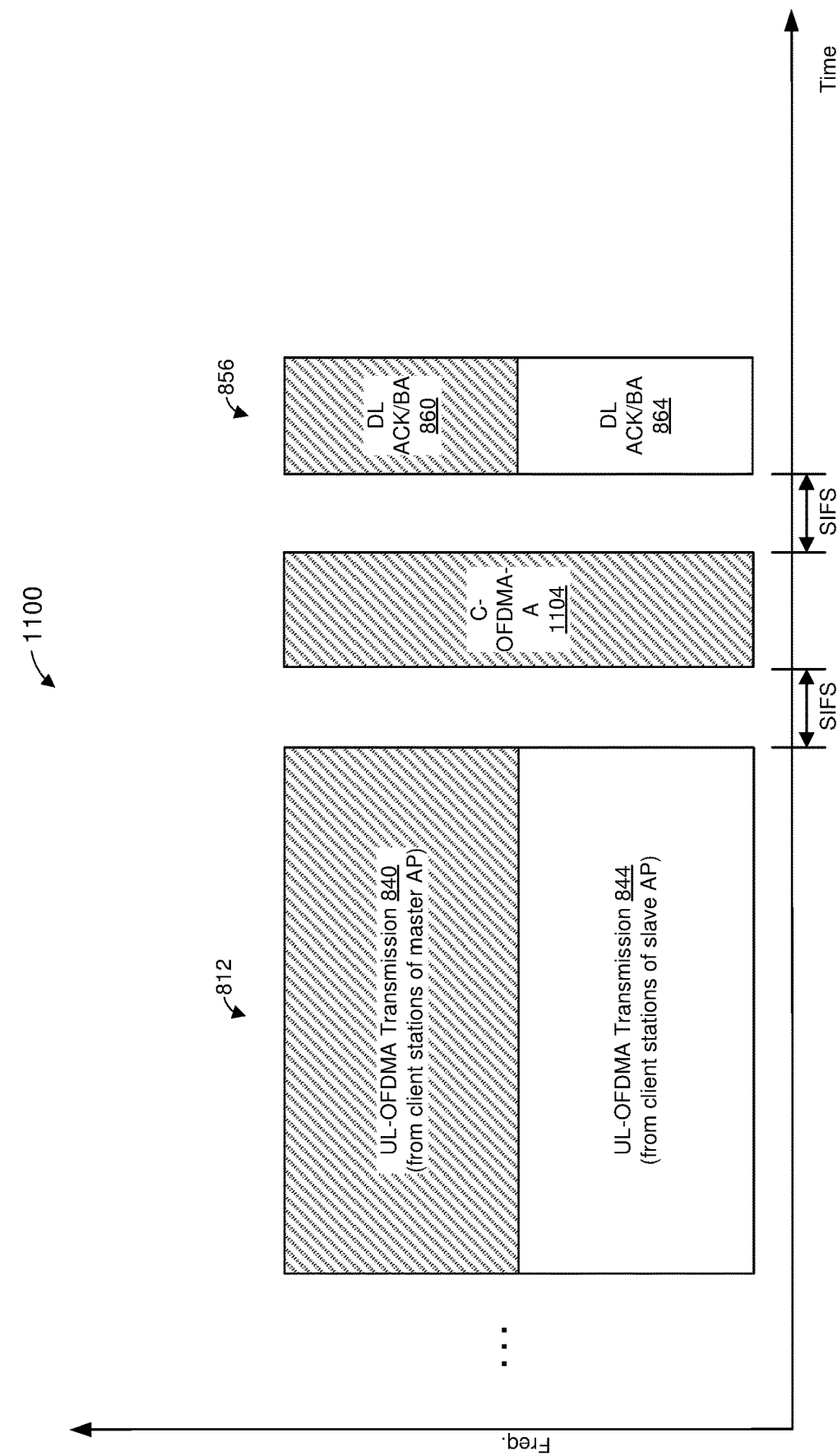
FIG. 11 is a diagram of an example acknowledgment procedure used in a coordinated MU UL transmission such as in FIGS. 8-10, according to an embodiment.

FIG. 11 is a diagram of an example acknowledgment packet exchange 1100 for an UL C-OFDMA transmission in a communication system such as the communication system 10 of FIG. 1A, or another suitable communication system, according to an embodiment. FIG. 11 is described with reference to FIGS. 1A-C for explanatory purposes. In some embodiments, however, the acknowledgment packet exchange 1100 is implemented in other suitable communication systems and/or with suitable communication devices different than the example communication devices of FIGS. 1B-C.

The acknowledgment packet exchange 1100 is used in connection any of the UL C-OFDMA transmissions of FIGS. 8-10, or with other suitable UL C-OFDMA transmissions, according to various embodiments.

A defined time period after an end of transmission of the UL C-OFDMA transmission 812, the master AP 34 begins transmitting a packet that includes the C-OFDMA-A frame 1104. In an embodiment, the defined time period is SIFS as defined by the IEEE 802.11 Standard. In other embodiments, the defined time period is a suitable time period different than SIFS.

The master AP 34 generates a C-OFDMA-A frame 1104 and, after an end of transmission of the UL C-OFDMA transmission 812, the master AP 34 transmits the C-OFDMA-A frame 1104 to one or more slave APs (e.g., the slave AP 44). The C-OFDMA-A frame 1104 advertises a start of the DL C-OFDMA transmission 856, according to an embodiment. The C-OFDMA-A frame 1104 includes information regarding the DL C-OFDMA transmission 856 such as one of, or any suitable combination of two or more of, i) indicators of one or more WLANs that are to participate in the DL C-OFDMA transmission, ii) a respective frequency bandwidth to be used in a respective WLAN for the DL C-OFDMA transmission, iii) a respective frequency RU to be used in a respective WLAN for the DL C-OFDMA transmission, iv) a duration (in time) of the DL C-OFDMA transmission, v) a respective length (in bits, octets, words, etc.) of a respective OFDMA transmission (which is part of the DL C-OFDMA transmission) in a respective WLAN, etc., according to various embodiments. In some embodiments, the RUs used for the DL C-OFDMA transmission 856 are the same as the RUs used for he UL C-OFDMA transmission 812.

The C-OFDMA-A frame 1104 is configured to prompt one or more slave APs 44 to transmit respective ACK or BA frames regarding the UL C-OFDMA transmission 812, according to some embodiments.

In an embodiment, the C-OFDMA-A frame 1104 is a MAC layer data unit transmitted within a PHY data unit (e.g., a packet) not shown in FIG. 11. In an embodiment, the network interface device 122 generates (e.g., the MAC processor 126 generates, the C-OFDMA controller 60 generates, etc.) the C-OFDMA-A frame 1104. In an embodiment, the network interface device 122 generates and transmits (e.g., the PHY processor 130 generates and transmits) a packet that includes the C-OFDMA-A frame 1104. In an embodiment, the C-OFDMA controller 60 generates the C-OFDMA-A frame 1104, provides the C-OFDMA-A frame 1104 to the PHY processor 130, and controls the PHY processor 130 to transmit the C-OFDMA-A frame 1104 within a packet.

In an embodiment, transmission of a packet that includes the C-OFDMA-A frame begins a defined time period after an end of the UL C-OFDMA transmission 812. In an embodiment, the defined time period is SIFS as defined by the IEEE 802.11 Standard. In other embodiments, the defined time period is a suitable time period different than SIFS.

Responsive to receiving the C-OFDMA-A frame 1104 and as part of the DL C-OFDMA transmission 856, one or more slave APs generate and transmit respective ACK or BA frames 860/864 in respective frequency RUs to respective one or more sets of client stations of the one or more slave APs. In an embodiment, the DL C-OFDMA transmission 856 begins a defined time period after an end of transmission of the C-OFDMA-A frame 1104 (or after an end of transmission of a packet that includes the C-OFDMA-A frame 1104). In an embodiment, the defined time period is SIFS as defined by the IEEE 802.11 Standard. In other embodiments, the defined time period is a suitable time period different than SIFS.

Figure 12:
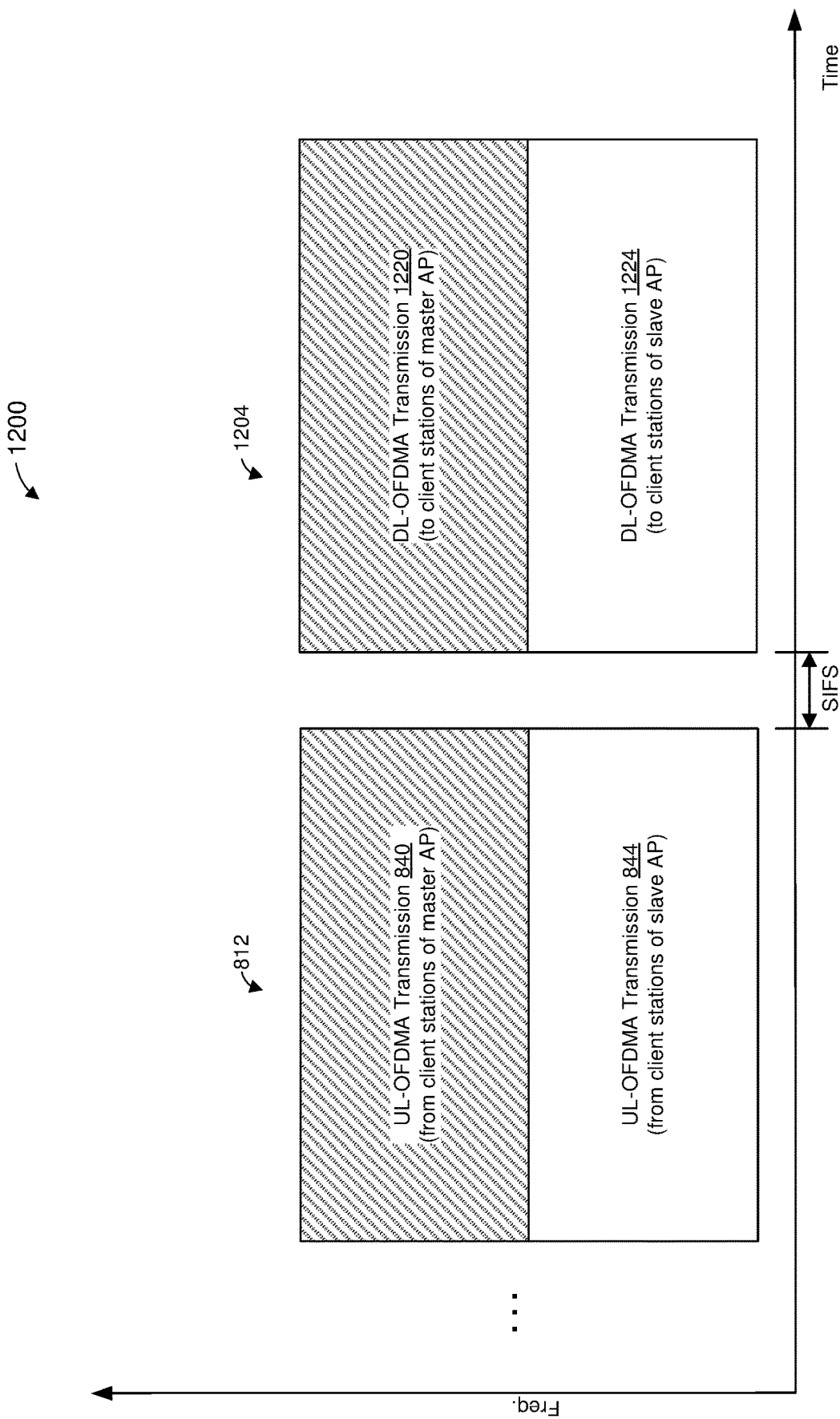
FIG. 12 is a diagram of an example coordinated MU UL transmission followed by a coordinated MU DL transmission, according to an embodiment.

FIG. 12 is a diagram of an example packet exchange 1200 involving an UL C-OFDMA transmission in a communication system such as the communication system 10 of FIG. 1A, or another suitable communication system, according to an embodiment. FIG. 12 is described with reference to FIGS. 1A-C for explanatory purposes. In some embodiments, however, the packet exchange 1200 is implemented in other suitable communication systems and/or with suitable communication devices different than the example communication devices of FIGS. 1B-C.

The packet exchange 1200 is used in conjunction with any of the UL C-OFDMA transmissions of FIGS. 8-10, or is used in conjunction with other suitable UL C-OFDMA transmissions, according to various embodiments.

As a variation from the UL C-OFDMA packet exchanges of FIGS. 8-10, a DL C-OFDMA transmission 1204 immediately follows the UL C-OFDMA transmission 812, where the DL C-OFDMA transmission 1204 does not merely contain ACK/BA information for the UL C-OFDMA transmission 812. A defined time period after an end of transmission of the UL C-OFDMA transmission 812, the master AP 34 begins a DL-OFDMA transmission 1220, and the slave AP 44 begins a DL-OFDMA transmission 1224. The DL-OFDMA transmission 1220 does not merely contain ACK/BA information for the UL C-OFDMA transmission 812, and the DL-OFDMA transmission 1224 also does not merely contain ACK/BA information for the UL C-OFDMA transmission 812. For example, the DL-OFDMA transmission 1220 includes user data for client stations 38, and the DL-OFDMA transmission 1224 includes user data for client stations 48, according to an embodiment.

In an embodiment, the defined time period is SIFS as defined by the IEEE 802.11 Standard. In other embodiments, the defined time period is a suitable time period different than SIFS.

In various embodiments, the DL C-OFDMA transmission 1204 is acknowledged (not shown in FIG. 12) by client stations 38/48 using acknowledgment techniques such as described with reference any of FIGS. 2-7, or using other suitable acknowledgment techniques.

Figure 13:
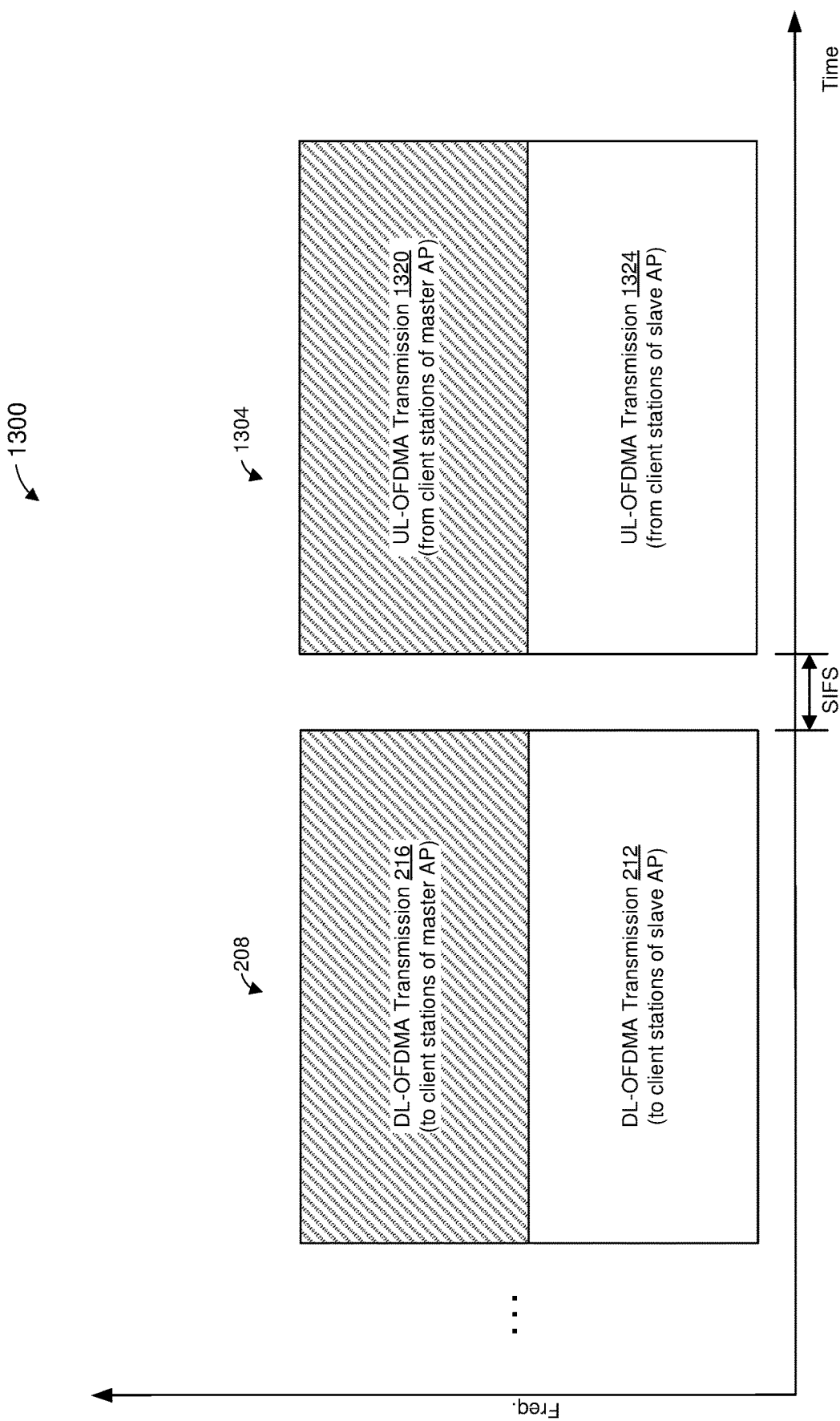
FIG. 13 is a diagram of an example coordinated MU DL transmission followed by a coordinated MU UL transmission, according to an embodiment.

FIG. 13 is a diagram of an example packet exchange 1300 involving a DL C-OFDMA transmission in a communication system such as the communication system 10 of FIG. 1A, or another suitable communication system, according to an embodiment. FIG. 13 is described with reference to FIGS. 1A-C for explanatory purposes. In some embodiments, however, the packet exchange 1300 is implemented in other suitable communication systems and/or with suitable communication devices different than the example communication devices of FIGS. 1B-C.

The packet exchange 1300 is used in conjunction with any of the DL C-OFDMA transmissions of FIGS. 2-7, or is used in conjunction with other suitable DL C-OFDMA transmissions, according to various embodiments.

As a variation from the DL C-OFDMA packet exchanges of FIGS. 2-7, an UL C-OFDMA transmission 1304 immediately follows the DL C-OFDMA transmission 208, where the UL C-OFDMA transmission 1304 does not merely contain ACK/BA information for the DL C-OFDMA transmission 208. A defined time period after an end of transmission of the DL C-OFDMA transmission 208, client stations 38 of the master AP 34 begin an UL-OFDMA transmission 1320, and client stations 44 of the slave AP 44 begins a DL-OFDMA transmission 1324. The UL-OFDMA transmission 1320 does not merely contain ACK/BA information for the DL C-OFDMA transmission 216, and the UL-OFDMA transmission 1324 also does not merely contain ACK/BA information for the DL C-OFDMA transmission 212. For example, the UL-OFDMA transmission 1320 includes user data from client stations 38, and the UL-OFDMA transmission 1324 includes user data from client stations 48, according to an embodiment.

In an embodiment, the defined time period is SIFS as defined by the IEEE 802.11 Standard. In other embodiments, the defined time period is a suitable time period different than SIFS.

In some embodiments, the DL C-OFDMA transmission 216 includes a trigger frame that prompts client stations 38 to transmit the UL C-OFDMA transmission 1320, and the DL C-OFDMA transmission 212 includes a trigger frame that prompts client stations 48 to transmit the UL C-OFDMA transmission 1324.

In various embodiments, the UL C-OFDMA transmission 1304 is acknowledged (not shown in FIG. 13) by the master AP 34 and the slave AP 44 using acknowledgment techniques such as described with reference any of FIGS. 8-11, or using other suitable acknowledgment techniques.

In some embodiments, the C-OFDMA-A frame discussed with reference to FIGS. 2-13 comprises a control frame. For example, the IEEE 802.11 Standard defines a frame header with a type subfield and a subtype field. In an embodiment, the type subfield of the C-OFDMA-A frame is set to a value to indicate a control-type frame, and the subtype subfield of the C-OFDMA-A frame is set to a value to indicate the control frame is a C-OFDMA-A frame.

In some embodiments, the C-OFDMA-A frame discussed with reference to FIGS. 2-13 comprises a trigger frame, which is a control frame subtype. For example, the type subfield of the C-OFDMA-A frame is set to a value to indicate a control-type frame, and the subtype subfield of the C-OFDMA-A frame is set to a value to indicate the control frame is a trigger frame. The current draft of the IEEE 802.11ax Standard defines a trigger frame format with a trigger type subfield, and the trigger type subfield can be set to one of a plurality of values to indicate one of a plurality of different types of trigger frames. In an embodiment, a C-OFDMA-A frame includes a trigger type subfield set to a value to indicate the trigger frame is a C-OFDMA-A frame.

As discussed above, the C-OFDMA-A frame includes information regarding an announced C-OFDMA transmission such as one of, or any suitable combination of two or more of: i) identifier(s) of WLAN(s) of slave AP(s) to participate in the C-OFDMA transmission, ii) a respective frequency bandwidth to be used in a respective WLAN, iii) a respective frequency RU to be used in a respective WLAN, iv) a duration (in time) of the coordinated OFDMA transmission, v) a respective length (in bits, octets, words, etc.) of a respective OFDMA transmission in a respective WLAN, etc., according to various embodiments. In some embodiments, the C-OFDMA-A frame additionally or alternatively includes one of, or any suitable combination of two or more of: an indication a type of long training field (LTF) to be included in PHY preambles of the C-OFDMA transmission (e.g., where a communication protocol provides for a plurality of different types of LTFs), an indication a number of LTFs to be included in PHY preambles of the C-OFDMA transmission (e.g., where the communication protocol provides for different numbers of LTFs), an indication a length of a signal field (e.g., where the signal field is a variable length signal field) to be included in PHY preambles of the C-OFDMA transmission, etc.

For DL C-OFDMA transmissions such as described above with reference to FIGS. 2-7, the C-OFDMA-A frame additionally or alternatively includes one or both of: i) a UL acknowledgement type (e.g., whether the DL C-OFDMA transmission is to be acknowledged by client stations 38/48 by an immediate acknowledgement (e.g., which is solicited by trigger frames in the DL C-OFDMA transmission), such as shown in FIGS. 2-4; whether the DL C-OFDMA transmission is to be acknowledged by client stations 38/48 by a BA solicited by an MU-BAR separate from the DL C-OFDMA transmission, such as shown in FIGS. 5-7, etc.); ii) a duration of the UL ACK/BA (e.g., if the DL C-OFDMA transmission is to be acknowledged by client stations 38/48 by an immediate acknowledgement); according to various embodiments. In some embodiments, indicator(s) of the duration(s) of the UL ACK/BA transmissions 232 and 236 are included elsewhere, such as in trigger frames included in the DL C-OFDMA transmissions (212/216), in MU-BAR frames 504/520, etc.

In some embodiments, frequency bandwidth and/or RUs are indicated in the C-OFDMA-A frame in units of 20 MHz. In some embodiments, frequency bandwidth and/or RUs are indicated in the C-OFDMA-A frame in units of 40 MHz. In some embodiments, when the frequency bandwidth allocated to a particular WLAN for the C-OFDMA transmission is less than or equal to 160 MHz, the frequency bandwidth and/or RU allocated to the WLAN are indicated in the C-OFDMA-A frame in units of 20 MHz, whereas when the frequency bandwidth allocated to a particular WLAN for the C-OFDMA transmission is greater than 160 MHz, the frequency bandwidth and/or RU allocated to the WLAN are indicated in the C-OFDMA-A frame in units of 40 MHz.

In an embodiment, the C-OFDMA-A frame includes one or more resource allocation fields corresponding to one or more respective WLANs to participate in the C-OFDMA transmission. As an illustrative example, each resource allocation field of the C-OFDMA-A frame includes i) an identifier of the BSS (e.g., a 48-bit MAC address of the slave AP, a color ID of the BSS, a 5-bit hash of the MAC address of the slave MAC address and a 6-bit color ID of the BSS, or another suitable identifier), ii) a frequency bandwidth of the frequency segment to be used for the C-OFDMA transmission, and iii) a starting 20 MHz subchannel of the frequency segment, according to an illustrative embodiment. In some embodiments in which a DL C-OFDMA transmission immediately follows an UL C-OFDMA transmission (such as illustrated in FIG. 12), the C-OFDMA-A frame includes i) an indication of a frequency bandwidth and starting subchannel for the UL C-OFDMA transmission, and ii) an indication of a frequency bandwidth and starting subchannel for the DL C-OFDMA transmission. In other embodiments in which a DL C-OFDMA transmission immediately follows an UL C-OFDMA transmission (such as illustrated in FIG. 12), the C-OFDMA-A frame includes only one indication of a frequency bandwidth and starting subchannel for both the UL C-OFDMA transmission and the DL C-OFDMA transmission, i.e., the UL C-OFDMA transmission and the DL C-OFDMA transmission use the same frequency segment.

For a DL C-OFDMA transmission, each resource allocation field of the C-OFDMA-A frame further includes one of, or any suitable combination of two or more of: an indicator of a type of LTF to be included in PHY preambles of the DL C-OFDMA transmission, an indicator of a number of LTFs to be included in PHY preambles of the DL C-OFDMA transmission, an indication a length or duration of a signal field to be included in PHY preambles of the DL C-OFDMA transmission, an indicator of a duration of the DL C-OFDMA transmission, etc., according to various embodiments. In some embodiments (such as illustrated in FIG. 4) in which the master AP 34 further transmits a C-OFDMA trigger frame (e.g., the C-OFDMA trigger frame 420) to prompt the DL C-OFDMA transmission, the C-OFDMA-A frame does not include the indicator of the type of LTF, the indicator of the number of LTFs, the length or duration of the signal field, and the length or duration of the DL C-OFDMA transmission. For example, such information is instead included in the C-OFDMA trigger frame. In other embodiments (such as illustrated in FIG. 4) in which the master AP 34 further transmits a C-OFDMA trigger frame (e.g., the C-OFDMA trigger frame 420) to prompt the DL C-OFDMA transmission, the C-OFDMA-A frame includes one of, or any suitable combination of two or more of: the indicator of the type of LTF, the indicator of the number of LTFs, the length or duration of the signal field, and the length or duration of the DL C-OFDMA transmission.

For an UL C-OFDMA transmission, each resource allocation field of the C-OFDMA-A frame further includes one of, or any suitable combination of two or more of: an indication a type of LTF to be included in PHY preambles of the UL C-OFDMA transmission, an indication a number of LTFs to be included in PHY preambles of the UL C-OFDMA transmission, an indication a duration of the UL C-OFDMA transmission, etc., according to various embodiments. In other embodiments in which a DL C-OFDMA transmission immediately follows the UL C-OFDMA transmission (such as illustrated in FIG. 12), the C-OFDMA-A frame further includes, for the DL C-OFDMA transmission one of, or any suitable combination of two or more of: an indication a type of LTF to be included in PHY preambles of the DL C-OFDMA transmission, an indication a number of LTFs to be included in PHY preambles of the DL C-OFDMA transmission, an indication a length or duration of a signal field to be included in PHY preambles of the DL C-OFDMA transmission, an indication a duration of the DL C-OFDMA transmission, etc., according to various embodiments.

In some embodiments (such as illustrated in FIG. 10) in which the master AP 34 further transmits a C-OFDMA trigger frame (e.g., the C-OFDMA trigger frame 1020) to prompt the slave APs to transmit trigger frames to trigger the UL C-OFDMA transmission, the C-OFDMA-A frame does not include the indicator of the type of LTF, the indicator of the number of LTFs, and an indicator of the length or duration of the UL C-OFDMA transmission. For example, such information is instead included in the C-OFDMA trigger frame. In other embodiments (such as illustrated in FIG. 10) in which the master AP 34 further transmits a C-OFDMA trigger frame (e.g., the C-OFDMA trigger frame 1020) to prompt the UL C-OFDMA transmission, the C-OFDMA-A frame includes one of, or any suitable combination of two or more of: the indicator of the type of LTF, the indicator of the number of LTFs, the indicator of the length or duration of the UL C-OFDMA transmission.

In some embodiments, the C-OFDMA-A frame is transmitted in a 20 MHz-wide legacy PPDU (sometimes referred to in the IEEE 802.11 Standard as a "non-HT PPDU"), and duplicates of the PPDU are transmitted in each 20 MHz subchannel (sometimes referred to in the IEEE 802.11 Standard as a "non-HT duplicate PPDU") to generate the full bandwidth C-OFDMA-A transmission. As an illustrative example, eight duplicates of the C-OFDMA-A frame are transmitted in eight non-HT duplicate PPDUs in eight 20 MHz subchannels to generate a 160 MHz transmission. In some embodiments in which the C-OFDMA-A frame is transmitted in a non-HT PPDU (i.e., a legacy PPDU), a data rate at which the C-OFDMA-A frame is transmitted is limited to a data rates from a set of mandatory data rates defined by a communication protocol (e.g., the IEEE 802.11 Standard). In some embodiments in which the C-OFDMA-A frame is transmitted in a non-HT PPDU (i.e., a legacy PPDU), a data rate at which the C-OFDMA-A frame is transmitted is limited to data rates from a set of common data rates supported by both the master AP 34 and the one or more slave APs 44 that are to participate in the C-OFDMA transmission.

In other embodiments, the C-OFDMA-A frame is transmitted in another suitable PPDU (e.g., a PPDU that conforms to the current draft of the IEEE 802.11ax Standard, a PPDU that conforms to the IEEE 802.11be Standard now under development, etc.) that is 20 MHz wide, and duplicates of the PPDU are transmitted in each 20 MHz subchannel to generate the full bandwidth C-OFDMA-A transmission. In some embodiments in which the C-OFDMA-A frame is transmitted in a PPDU that conforms to the current draft of the IEEE 802.11ax Standard or to the IEEE 802.11be Standard now under development, an MCS and a number of spatial streams used for transmitting the C-OFDMA-A frame is limited to MCS/number of spatial stream combinations that the IEEE 802.11ax Standard/IEEE 802.11be Standard define as mandatory. In other embodiments in which the C-OFDMA-A frame is transmitted in a PPDU that conforms to the current draft of the IEEE 802.11ax Standard or to the IEEE 802.11be Standard now under development, an MCS and a number of spatial streams used for transmitting the C-OFDMA-A frame is limited to MCS/number of spatial stream combinations from a set of common MCS/number of spatial stream combinations supported by both the master AP 34 and the one or more slave APs 44 that are to participate in the C-OFDMA transmission.

In other embodiments, the C-OFDMA-A frame is transmitted in a single PPDU that spans the full bandwidth of the C-OFDMA-A transmission.

Referring now to FIGS. 4 and 10, a C-OFDMA trigger frame, such as C-OFDMA trigger frame 420 and C-OFDMA trigger frame 1020, comprises a trigger frame, which is a control frame subtype. For example, the type subfield of the C-OFDMA trigger frame is set to a value to indicate a control-type frame, and the subtype subfield of the C-OFDMA trigger frame is set to a value to indicate the control frame is a trigger frame. The current draft of the IEEE 802.11ax Standard defines a trigger frame format with a trigger type subfield, and the trigger type subfield can be set to one of a plurality of values to indicate one of a plurality of different types of trigger frames. In an embodiment, a C-OFDMA trigger frame includes a trigger type subfield set to a value to indicate the trigger frame is a C-OFDMA trigger frame.

The C-OFDMA trigger frame includes information regarding a C-OFDMA transmission such as one of, or any suitable combination of two or more of: i) identifier(s) of WLAN(s) of slave AP(s) to participate in the C-OFDMA transmission, ii) an indicator of a respective frequency bandwidth to be used in a respective WLAN, iii) an indicator of a respective frequency RU to be used in a respective WLAN, iv) an indicator of a duration (in time) of the coordinated OFDMA transmission, v) an indicator of a respective length (in bits, octets, words, etc.) of a respective OFDMA transmission in a respective WLAN, etc., according to various embodiments. In some embodiments, the C-OFDMA trigger frame additionally or alternatively includes one of, or any suitable combination of two or more of: an indicator of a type of long training field (LTF) to be included in PHY preambles of the C-OFDMA transmission (e.g., where a communication protocol provides for a plurality of different types of LTFs), an indicator of a number of LTFs to be included in PHY preambles of the C-OFDMA transmission (e.g., where the communication protocol provides for different numbers of LTFs), an indicator of a length of a signal field (e.g., where the signal field is a variable length signal field) to be included in PHY preambles of the C-OFDMA transmission, etc.

In some embodiments, frequency bandwidth and/or RUs are indicated in the C-OFDMA trigger frame in units of 20 MHz. In some embodiments, frequency bandwidth and/or RUs are indicated in the C-OFDMA trigger frame in units of 40 MHz. In some embodiments, when the frequency bandwidth allocated to a particular WLAN for the C-OFDMA transmission is less than or equal to 160 MHz, the frequency bandwidth and/or RU allocated to the WLAN are indicated in the C-OFDMA trigger frame in units of 20 MHz, whereas when the frequency bandwidth allocated to a particular WLAN for the C-OFDMA transmission is greater than 160 MHz, the frequency bandwidth and/or RU allocated to the WLAN are indicated in the C-OFDMA trigger frame in units of 40 MHz.

In an embodiment, the C-OFDMA trigger frame includes one or more resource allocation fields corresponding to one or more respective WLANs to participate in the C-OFDMA transmission. As an illustrative example, each resource allocation field of the C-OFDMA trigger frame includes i) an identifier of the BSS (e.g., a 48-bit MAC address of the slave AP, a color ID of the BSS, a 5-bit hash of the MAC address of the slave MAC address and a 6-bit color ID of the BSS, or another suitable identifier), ii) a frequency bandwidth of the frequency segment to be used for the C-OFDMA transmission, and iii) a starting 20 MHz subchannel of the frequency segment, according to an illustrative embodiment. In some embodiments in which a DL C-OFDMA transmission immediately follows an UL C-OFDMA transmission (such as illustrated in FIG. 12), the C-OFDMA trigger frame includes i) an indication of a frequency bandwidth and starting subchannel for the UL C-OFDMA transmission, and ii) an indication of a frequency bandwidth and starting subchannel for the DL C-OFDMA transmission. In other embodiments in which a DL C-OFDMA transmission immediately follows an UL C-OFDMA transmission (such as illustrated in FIG. 12), the C-OFDMA trigger frame includes only one indication of a frequency bandwidth and starting subchannel for both the UL C-OFDMA transmission and the DL C-OFDMA transmission, i.e., the UL C-OFDMA transmission and the DL C-OFDMA transmission use the same frequency segment.

For a DL C-OFDMA transmission, each resource allocation field of the C-OFDMA trigger frame further includes one of, or any suitable combination of two or more of: an indicator of a type of LTF to be included in PHY preambles of the DL C-OFDMA transmission, an indicator of a number of LTFs to be included in PHY preambles of the DL C-OFDMA transmission, a length or duration of a signal field to be included in PHY preambles of the DL C-OFDMA transmission, an indicator of a duration of the DL C-OFDMA transmission, etc., according to various embodiments.

For an UL C-OFDMA transmission, each resource allocation field of the C-OFDMA trigger frame further includes one of, or any suitable combination of two or more of: an indication of a type of LTF to be included in PHY preambles of the UL C-OFDMA transmission, an indication a number of LTFs to be included in PHY preambles of the UL C-OFDMA transmission, an indication a duration of the UL C-OFDMA transmission, etc., according to various embodiments. In other embodiments in which a DL C-OFDMA transmission immediately follows the UL C-OFDMA transmission (such as illustrated in FIG. 12), the C-OFDMA trigger frame further includes, for the DL C-OFDMA transmission one of, or any suitable combination of two or more of: an indication a type of LTF to be included in PHY preambles of the DL C-OFDMA transmission, an indication a number of LTFs to be included in PHY preambles of the DL C-OFDMA transmission, an indication a length or duration of a signal field to be included in PHY preambles of the DL C-OFDMA transmission, an indication of a duration of the DL C-OFDMA transmission, etc., according to various embodiments.

In various embodiments, the C-OFDMA trigger frame does not include one of, or any two of, i) the identifier of the BSS, ii) the indicator of the frequency segment, iii) the indicator of the frequency bandwidth of the frequency segment to be used for the C-OFDMA transmission, iv) the starting 20 MHz subchannel of the frequency segment, v) the indicator of the type of LTF, vi) the indicator of the number of LTFs, vii) the indicator of the length or duration of the signal field, vii) the indicator of the length or duration of the DL C-OFDMA transmission, etc. For example, such information is instead included in the C-OFDMA-A frame.

In some embodiments, the C-OFDMA trigger frame is transmitted in a 20 MHz-wide legacy PPDU (sometimes referred to in the IEEE 802.11 Standard as a "non-HT PPDU"), and duplicates of the PPDU are transmitted in each 20 MHz subchannel (sometimes referred to in the IEEE 802.11 Standard as a "non-HT duplicate PPDU") to generate the full bandwidth C-OFDMA trigger transmission. As an illustrative example, eight duplicates of the C-OFDMA trigger frame are transmitted in eight non-HT duplicate PPDUs in eight 20 MHz subchannels to generate a 160 MHz transmission. In some embodiments in which the C-OFDMA trigger frame is transmitted in a non-HT PPDU (i.e., a legacy PPDU), a data rate at which the C-OFDMA trigger frame is transmitted is limited to a data rates from a set of mandatory data rates defined by a communication protocol (e.g., the IEEE 802.11 Standard). In some embodiments in which the C-OFDMA trigger frame is transmitted in a non-HT PPDU (i.e., a legacy PPDU), a data rate at which the C-OFDMA trigger frame is transmitted is limited to data rates from a set of common data rates supported by both the master AP 34 and the one or more slave APs 44 that are to participate in the C-OFDMA transmission.

In other embodiments, the C-OFDMA trigger frame is transmitted in another suitable PPDU (e.g., a PPDU that conforms to the current draft of the IEEE 802.11ax Standard, a PPDU that conforms to the IEEE 802.11be Standard now under development, etc.) that is 20 MHz wide, and duplicates of the PPDU are transmitted in each 20 MHz subchannel to generate the full bandwidth C-OFDMA trigger transmission. In some embodiments in which the C-OFDMA trigger frame is transmitted in a PPDU that conforms to the current draft of the IEEE 802.11ax Standard or to the IEEE 802.11be Standard now under development, an MCS and a number of spatial streams used for transmitting the C-OFDMA trigger frame is limited to MCS/number of spatial stream combinations that the IEEE 802.11ax Standard/IEEE 802.11be Standard define as mandatory. In other embodiments in which the C-OFDMA trigger frame is transmitted in a PPDU that conforms to the current draft of the IEEE 802.11ax Standard or to the IEEE 802.11be Standard now under development, an MCS and a number of spatial streams used for transmitting the C-OFDMA trigger frame is limited to MCS/number of spatial stream combinations from a set of common MCS/number of spatial stream combinations supported by both the master AP 34 and the one or more slave APs 44 that are to participate in the C-OFDMA transmission.

In other embodiments, the C-OFDMA trigger frame is transmitted in a single PPDU that spans the full bandwidth of the C-OFDMA trigger transmission.

Referring now to FIGS. 2-4, in some embodiments, the C-OFDMA-A frame 204 includes an indicator of a duration of the UL ACK/BA transmissions 232 and 236. Client stations 38/48 use the indicator of the duration of the UL ACK/BA transmissions 232 and 236 to generate the UL ACK/BA transmissions 232 and 236 according to the indicated duration, according to some embodiments, so that the UL ACK/BA transmissions 232 and 236 end at substantially the same time (e.g., within 5%). Referring now to FIG. 2, in some embodiments, the C-OFDMA trigger frame 420 includes an indicator of a duration of the UL ACK/BA transmissions 232 and 236. Client stations 38/48 use the indicator of the duration of the UL ACK/BA transmissions 232 and 236 to generate the UL ACK/BA transmissions 232 and 236 according to the indicated duration, according to some embodiments.

In other embodiments, the C-OFDMA-A frame 204 and the C-OFDMA trigger frame 420 do not includes an indicator of duration(s) of the UL ACK/BA transmissions 860 and/or 864. For example, the UL ACK/BA transmissions 232 and 236 are permitted to have different durations. In some embodiments, indicator(s) of the duration(s) of the UL ACK/BA transmissions 232 and 236 are included elsewhere, such as in trigger frames included in the DL C-OFDMA transmissions (212/216), in MU-BAR frames 504/520, etc.

Referring now to FIGS. 8-10, in some embodiments, the C-OFDMA-A frame 804 includes an indicator of a duration of the DL ACK/BA transmissions 860 and 864. The slave AP(s) 44 use the indicator of the duration of the DL ACK/BA transmissions 860 and 864 to generate the DL ACK/BA transmission 864 according to the indicated duration, according to some embodiments, so that the DL ACK/BA transmissions 860 and 864 end at substantially the same time (e.g., within 5%). Referring now to FIG. 10, in some embodiments, the C-OFDMA trigger frame 1020 includes an indicator of a duration of the DL ACK/BA transmissions 860 and 864. The slave AP(s) 44 use the indicator of the duration of the DL ACK/BA transmissions 860 and 864 to generate the DL ACK/BA transmission 864 according to the indicated duration, according to some embodiments, so that the DL ACK/BA transmissions 860 and 864 end at substantially the same time (e.g., within 5%).

In other embodiments, the C-OFDMA-A frame 804 and the C-OFDMA trigger frame 1020 do not includes an indicator of duration(s) of the DL ACK/BA transmissions 860 and/or 864. For example, the master AP 34 and the slave AP(s) 44 select suitable durations for the DL ACK/BA transmissions 860 and 864, e.g., the DL ACK/BA transmissions 860 and 864 are permitted to have different durations.

In some embodiments, an RU allocated to a slave AP 44 for a C-OFDMA transmission is required to include a primary channel of the slave AP 44. In an embodiment, if the RU allocated to the slave AP 44 for the C-OFDMA transmission spans a frequency bandwidth of 160 MHz or less, the RU is required include the 20 MHz primary channel of the slave AP 44, whereas if the RU allocated to the slave AP 44 for the C-OFDMA transmission spans a frequency bandwidth greater than 160 MHz, the RU is required include the 40 MHz primary channel of the slave AP 44. In other embodiments, a RU allocated to a slave AP 44 for a C-OFDMA transmission is not required to include a primary channel of the slave AP 44.

In some embodiments, the master AP 34 and the slave AP 44 have a same primary channel. When the master AP 34 and the slave AP 44 have the same primary channel, a target wake time (TWT) subchannel selective transmission (SST) is used where an AP announce channels for client stations to receive a trigger frame or a downlink multi-user signal field for C-OFDMA operation, according to an embodiment. In another embodiment, the master AP 34 announces schedule information for the master AP 34 and slave AP(s) 44.

In other embodiments, the master AP 34 and the slave AP 44 have different primary channels. When the master AP 34 and the slave AP 44 have different primary channels, client stations 38 of the master AP 34 listen to the primary channel of the master AP 34 for RU allocation information for the C-OFDMA transmission; and client stations 48 of the slave AP 44 listen to the primary channel of the slave AP 44 for RU allocation information for the C-OFDMA transmission, according to an embodiment.

In some embodiments, the aggregate communication channel used for the C-OFDMA transmission is required to be included within an operating channel of the master AP 34. In some embodiments, the aggregate communication channel used for the C-OFDMA transmission is required to be included within either the operating channel of the master AP 34 or the operating channel of the slave AP 44. In other embodiments, the aggregate communication channel used for the C-OFDMA transmission is required to include the operating channel of the master AP 34. In other embodiments, the aggregate communication channel used for the C-OFDMA transmission is required to include both the operating channel of the master AP 34 and the operating channel of the slave AP 44.

In some embodiments, the master AP 34 is permitted to transmit the C-OFDMA-A frame in 20 MHz subchannels that the master AP 34 determines are idle. In an embodiment, the master AP 34 determining (e.g., the network interface 122 determining, the MAC processor 126 determining, etc.) that a set of subchannels are idle includes i) determining that a network allocation vector (NAV) timer (e.g., implemented using a timer circuit, a counter circuit, etc., included in the network interface 122, the MAC processor 126, etc.) is zero, ii) determining that a PHY clear channel assessment (CCA) (e.g., implemented using an energy measurement circuit included in the network interface 122, the PHY processor 130, etc.) indicates a primary subchannel (e.g., a 20 MHz primary channel, a 40 MHz primary channel, etc.) of the master AP 34 is idle, and iii) determining that a PHY CCA is idle within a defined time period (e.g., a point coordination function (PCF) interframe space (PIFS) defined by the IEEE 802.11 Standard, or another suitable time period) for non-primary subchannels (e.g., 20 MHz channels, 40 MHz channels, etc.) before transmission of the C-OFDMA-A frame is to begin.

In some embodiments, the slave AP 44 is permitted to transmit (e.g., a trigger frame, a DL C-OFDMA transmission, etc.) in response to a C-OFDMA-A frame in any of the subchannels allocated to the slave AP 44 by the C-OFDMA-A frame determined by the slave AP 44 to be idle. In an embodiment, the slave AP 44 determining (e.g., the network interface 122 determining, the MAC processor 126 determining, etc.) that a set of subchannels are idle includes i) determining that a NAV timer is zero, ii) determining that a primary subchannel of the slave AP 44 is idle, comprising one of: a) determining that a PHY CCA indicates the primary subchannel is idle a predetermined time period (e.g., PIFS or another suitable time period) before transmission of the C-OFDMA-A frame began, or b) determining that the PHY CCA indicates the primary subchannel is idle a predetermined time period (e.g., SIFS or another suitable time period) before the slave AP 44 is to begin transmitting (e.g., a trigger frame, a DL C-OFDMA transmission, etc.), and iii) determining that one or more non-primary subchannels are idle comprising one of: a) determining that a PHY CCA indicates the non-primary subchannel is idle a predetermined time period (e.g., PIFS or another suitable time period) before transmission of the C-OFDMA-A frame began, or b) determining that the PHY CCA indicates the nonprimary subchannel is idle a predetermined time period (e.g., SIFS or another suitable time period) before the slave AP 44 is to begin transmitting (e.g., a trigger frame, a DL C-OFDMA transmission, etc.).

In other embodiments, the slave AP 44 transmits (e.g., a trigger frame, a DL C-OFDMA transmission, etc.) in response to a C-OFDMA-A frame in the subchannels allocated to the slave AP 44 by the C-OFDMA-A frame without the slave AP 44 first checking whether any of the subchannels are idle. In other embodiments, the C-OFDMA-A frame included information that indicates whether the slave AP 44 is to determine whether subchannels are idle prior to transmitting in the subchannels in response to a C-OFDMA-A frame.

In some embodiments, the master AP 34 sets a duration subfield in the C-OFDMA-A frame to indicate a duration that encompasses the C-OFDMA transmission. In other embodiments in which the C-OFDMA-A frame prompts a DL C-OFDMA transmission followed by an UL C-OFDMA transmission (e.g., such as the examples of FIGS. 2-4 and 13), the master AP 34 sets a duration subfield in the C-OFDMA-A frame to indicate a duration that ends prior to an end of the DL C-OFDMA transmission 208, such as when trigger frames in the DL C-OFDMA transmission 208 include information that indicates the client stations 38/48 are to check whether subchannels are idle prior to transmitting as part of the UL C-OFDMA transmission. In other embodiments in which the C-OFDMA-A frame prompts a DL C-OFDMA transmission followed by an UL C-OFDMA transmission (e.g., such as the examples of FIGS. 2-4 and 13), the master AP 34 sets a duration subfield in the C-OFDMA-A frame to indicate a duration that ends prior to the UL C-OFDMA transmission, such as when trigger frames in the DL C-OFDMA transmission 208 include information that indicates the client stations 38/48 are to check whether subchannels are idle prior to transmitting as part of the UL C-OFDMA transmission.

In other embodiments, a client station 38/48 is configured to ignore a NAV counter set by a C-OFDMA-A frame when transmitting a UL C-OFDMA transmission in response to DL C-OFDMA transmission, which in turn was transmitted in connection with the C-OFDMA-A frame. In other embodiments, a client station 48 is configured to ignore a NAV counter set by a C-OFDMA-A frame when the C-OFDMA-A addresses a slave AP 44 with which the client station 48 is associated.

In other embodiments in which the C-OFDMA-A frame prompts an UL C-OFDMA transmission (e.g., such as the examples of FIGS. 2-4 and 13), the master AP 34 sets a duration subfield in the C-OFDMA-A frame to indicate a duration that ends prior to an end of the DL C-OFDMA transmission 208, such as when trigger frames in the DL C-OFDMA transmission 208 include information that indicates the client stations 38/48 are to check whether subchannels are idle prior to transmitting as part of the UL C-OFDMA transmission. In other embodiments in which the C-OFDMA-A frame prompts a DL C-OFDMA transmission followed by an UL C-OFDMA transmission (e.g., such as the examples of FIGS. 8-12), the master AP 34 sets a duration subfield in the C-OFDMA-A frame to indicate a duration that ends prior to the UL C-OFDMA transmission. In an embodiment, the master AP 34 sets a duration subfield in the C-OFDMA-A frame to indicate a duration that ends prior to an end of a DL OFDMA transmission that includes trigger frames that prompt the UL C-OFDMA transmission.

In other embodiments, a client station 38/48 is configured to ignore a NAV counter set by a C-OFDMA-A frame when transmitting a UL C-OFDMA transmission in response to the C-OFDMA-A frame. In other embodiments, a client station 48 is configured to ignore a NAV counter set by a C-OFDMA-A frame when the C-OFDMA-A addresses a slave AP 44 with which the client station 48 is associated.

In some embodiments, a client station 38/48 maintains a first NAV counter (an intra-BSS NAV counter) for intra-BSS transmissions (e.g., for transmissions within the WLAN or BSS to which the client station 38/48 belongs), and a second NAV counter (an inter-BSS NAV counter) for inter-BSS transmissions (e.g., for transmissions from WLANs or BSSs to which the client station 38/48 does not belong). In an embodiment, when a client station 48 receives a C-OFDMA-A frame from the master AP 34 (and the client station is not associated with the master 34), the client station 48 determines (e.g., the network interface 162 determines, the MAC processor 166 determines, etc.) whether the C-OFDMA-A frame includes, among a set of network identifiers that indicate slave APs 44 that are to participate in a C-OFDMA transmission, a network identifier (e.g., a MAC address, a BSS ID, or another suitable identifier) of the slave AP 44 with which the client station 48 is associated; and when the C-OFDMA-A frame includes the network identifier of the slave AP 44 with which the client station 48 is associated, the client station 48 sets (e.g., the network interface 162 sets, the MAC processor 166 sets, etc.) the intra-BSS NAV counter using duration information in the C-OFDMA-A frame.

In some embodiments, prior to a C-OFDMA transmission, slave APs 44 transmit to the master AP 34 resource request information regarding the C-OFDMA transmission. In various embodiments, the resource request information includes one of, or any suitable combination of two or more of: an indication of a requested frequency bandwidth, an indication of a requested duration of a PPDU to be transmitted during the C-OFDMA transmission, an indication of a type of LTF(s) to be included in the PPDU, an indication of a number of LTFs to be included in the PPDU, an indication of a requested duration of a signal field to be included in the PPDU (when the PPDU is to be part of a DL C-OFDMA transmission, etc. In an embodiment, the slave AP 44 is configured to (e.g., the network interface 122 is configured to, the MAC processor 126 is configured to, the C-OFDMA controller is configured to, etc.) generate a frame that includes the resource request information, and the slave AP 44 is configured to (e.g., the network interface 122 is configured to, the PHY processor 130 is configured to, etc.) transmit the frame in a packet to the master AP 34.

In some embodiments, the slave AP 44 is configured to contend for a wireless communication medium and transmit the resource request information to the master AP 34 in response to obtaining the wireless communication medium.

In other embodiments, the master AP 34 is configured to poll slave APs 44 for resource request information. For example, the master AP 34 is generate and send a trigger frame (e.g., a resource request trigger) to slave APs 44, the trigger frame being configured to prompt slave APs 44 to transmit resource request information to the master AP 34. In an embodiment, the resource request trigger includes, for each of one or more slave APs 44, a network identifier of the slave AP 44. When a slave AP 44 receives the resource request trigger, the slave AP 44 determines whether the network ID of the slave AP 44 is included in the resource request trigger, and when the network ID of the slave AP 44 is included in the resource request trigger, the slave AP 44 transmits resource request information to the master AP 34, according to an embodiment.

In an embodiment, the network ID of the slave AP 44 comprises a MAC address of the slave AP 44. In another embodiment, the network ID of the slave AP 44 comprises a BSS ID corresponding to the slave AP 44. In another embodiment, the network ID of the slave AP 44 comprises a hash value generated by applying a known hash function of the MAC address of the slave AP 44. In various embodiments, the hash value has a length of 11 bits, or another suitable number of bits.

In another embodiment, the network ID of the slave AP 44 comprises i) a BSS color ID of the slave AP 44 (or a subset of bits of the BSS color ID (such as 6 bits of the BSS color ID)), and ii) bits (such as 5 bits, 6 bits, etc.) taken or generated (e.g., by applying a hash function to the MAC address) from the MAC address of the slave AP 44.

The master AP 34 analyzes the resource request information received from the slave AP(s) 44, and determines an allocation of frequency segments to the master AP 34 and the slave APs 44 based on the resource request information received from the slave AP(s) 44. In some embodiments, the master AP 34 analyzes the resource request information received from the slave AP(s) 44, and determines a duration of the C-OFDMA transmission (e.g. a DL C-OFDMA transmission, an UL C-OFDMA transmission) based on the resource request information received from the slave AP(s) 44.

In some embodiments, the master AP 34 analyzes the resource request information received from the slave AP(s) 44, and determines whether a cascading C-OFDMA operation (e.g., a DL C-OFDMA transmission followed by an UL C-OFDMA transmission as in FIG. 13, an UL C-OFDMA transmission followed by a DL C-OFDMA transmission as in FIG. 12, etc.) should be allocated based on the resource request information received from the slave AP(s) 44.

In some embodiments, an AP announces (e.g., in a management frame such as beacon frame or a probe response frame (or another suitable management frame), in frames addressed to neighboring APs, etc.) whether the AP supports C-OFDMA transmissions. In some embodiments, the AP also announces (e.g., in the same frame or a different frame) whether the AP supports a master role, and/or whether the AP supports a slave role.

In some embodiments, APs negotiate by exchanging frames (e.g., public Action frames or other suitable frames) which AP will be the master AP and which AP(s) will be the slave APs; and the APs retain the same roles until renegotiated.

In other embodiments, an AP that obtains access to a channel medium automatically becomes the master AP, and announces to other APs (e.g., via public Action frame(s), a management frame (e.g., a beacon frame, a probe response frame, etc.) or another suitable frame) that the other APs may participate in a C-OFDMA transmission as slave APs.

In embodiments in which the master AP 34 and the slave AP(s) 44 are part of an extended service set (ESS), the master AP 34 is configured to schedule one or more APs 44 (that are capable of C-OFDMA transmissions) for a C-OFDMA transmission. In other embodiments, a first AP notifies a second AP (e.g., via a management frame or another suitable frame) whether the second AP is permitted to schedule the first AP for C-OFDMA transmissions.

In an embodiment, APs are configured to form a static group of APs that are configured to participate in C-OFDMA transmissions. For example, APs in an ESS and that are configured to participate in C-OFDMA transmissions implicitly form the group, according to an embodiment. In other embodiments, APs negotiate to form the group by exchanging management frames, for example. Once the group is formed, any AP in the group may act as the master AP 34 by, for example, initiating a C-OFDMA transmission and allocating frequency RUs to other APs (acting as slave APs 44) for the C-OFDMA transmission, according to an embodiment.

Although examples described above involve an AP transmitting to multiple client stations or multiple client stations transmitting to an AP as part of a C-OFDMA transmission, in some embodiments the AP transmits to a single client station or a single client station transmits to the AP as part of the C-OFDMA transmission.

Although examples described above involve coordinated OFDMA transmissions, in other embodiments the packet exchanges, techniques, etc., described above utilize additionally or alternatively utilize coordinated MU-MIMO transmissions. For example, as part of a coordinated DL transmission the master AP 34 may transmit in a frequency segment using one or more first spatial streams while the slave AP 44 transmits in the same frequency segment using one or more second spatial streams. As another example, as part of a coordinated UL transmission the one or more client stations 38 of the master AP 34 may transmit in a frequency segment using one or more first spatial streams while one or more client stations 48 of the slave AP 44 transmit in the same frequency segment using one or more second spatial streams. Thus, the example C-OFDMA packet exchanges, techniques, etc., described above are merely illustrative embodiments of coordinated multi-user (MU) transmissions and associated techniques. In other embodiments, the coordinated MU transmissions comprise coordinated MU-MIMO transmissions. Similarly, the C-OFDMA-A frames described above are merely illustrative examples of announcement frames that announce a coordinated multi-user (MU) transmission, which may be used in conjunction with C-OFDMA transmissions and coordinated MU-MIMO transmissions, for example. Similarly, the C-OFDMA trigger frames described above are merely illustrative examples of trigger frames for use with coordinated MU transmissions, which may be used in conjunction with C-OFDMA transmissions and coordinated MU-MIMO transmissions, for example. Similarly, the C-OFDMA controllers 60/70/80 described above are merely illustrative examples of controllers for use with coordinated MU transmissions, which may be used in conjunction with C-OFDMA transmissions and coordinated MU-MIMO transmissions, for example.

Although examples described above involve synchronized transmissions by or to multiple APs that begin at substantially a same time, in other embodiments, the example packet exchanges, techniques, etc., are modified to permit transmissions by or to different APs to begin at different times. Similarly, although examples described above involve synchronized transmissions by or to multiple APs that end at substantially a same time, in other embodiments, the example packet exchanges, techniques, etc., are modified to permit transmissions by or to different APs to end at different times. For example, in an illustrative embodiment, transmissions by or to different APs overlap in time and occur during a same time window, but do not necessarily begin at a substantially same time and/or do not necessarily end at a substantially same time.

Figure 14:
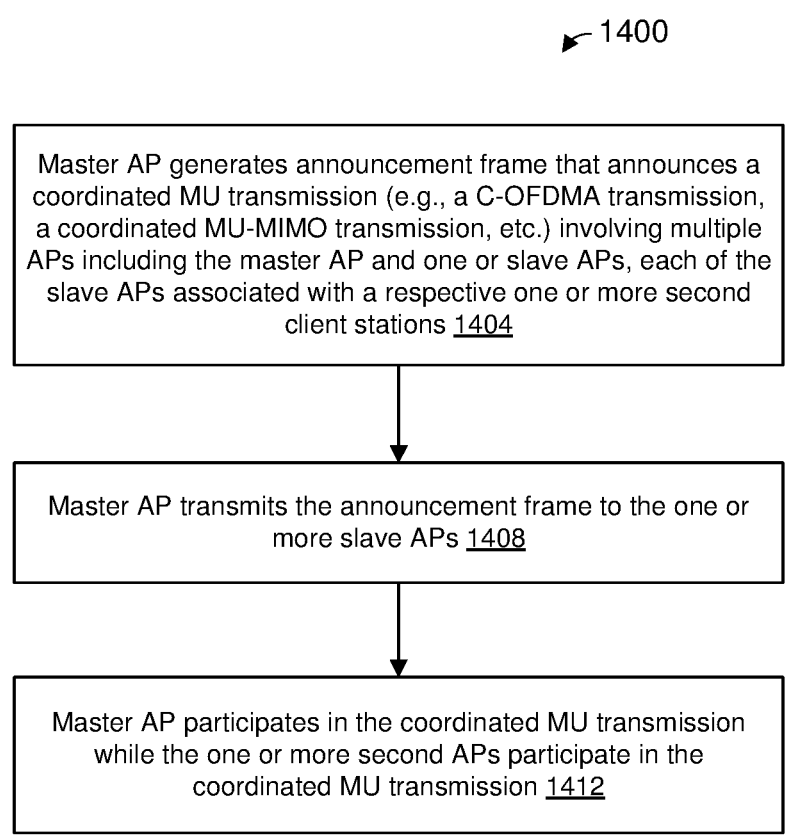
FIG. 14 is a flow diagram of an example method for coordinated wireless communications involving multiple APs, according to an embodiment.

FIG. 14 is a flow diagram of an example method 1400 for wireless communications involving multiple APs, according to an embodiment. The method 1400 is implemented by a master AP having a structure such as described with reference to FIG. 1B, and FIG. 14 is described with reference to FIG. 1B for ease of explanation. In other embodiments, however, the method 1400 is implemented by an AP having a suitable structure different than illustrated in FIG. 1B.

In various embodiments, the method 1400 is utilized in connection with any of the frame exchanges discussed in connection with any of FIGS. 2-13, and/or in connection with any of the techniques discussed above.

The method 1400 is implemented by a master AP associated with one or more first client stations.

At block 1404, the master AP generates (e.g., the network interface 122 generates, the MAC processor 126 generates, the controller 60 generates, etc.) an announcement frame that announces a coordinated MU transmission (e.g., a C-OFDMA transmission, a coordinated MU-MIMO transmission, etc.) involving multiple APs including the master AP and one or slave APs, each of the slave APs associated with a respective one or more second client stations. In an embodiment, the announcement frame is generated at block 1404 to indicate respective one or more frequency RUs allocated to the one or more slave APs for the coordinated MU transmission.

At block 1408, the master AP transmits (e.g., the network interface 122 transmits, the PHY processor 130 transmits, etc.) the announcement frame to the one or more slave APs to initiate the coordinated MU transmission.

At block 1412, the master AP participates in the coordinated MU transmission while the one or more second APs participate in the coordinated MU transmission.

In some embodiments, participating in the coordinated MU transmission at block 1412 comprises: the master AP transmitting (e.g., the network interface 122 transmits, the PHY processor 130 transmits, etc.) a first DL transmission to at least one first client station among the one or more first client stations, while one slave AP transmits a second DL transmission to at least one second client station among the one or more second client stations.

In some embodiments, generating the announcement frame comprises generating the announcement frame to indicate the one slave AP is allocated a first frequency RU; and transmitting the first DL transmission as part of participating in the coordinated MU transmission at block 1412 comprises transmitting the first DL transmission in a second frequency RU while the one slave AP transmits the second DL transmission in the first RU, wherein the second RU does not overlap the first frequency RU in frequency.

In some embodiments, generating the announcement frame at block 1404 comprises generating the announcement frame to indicate the one slave AP is allocated a first frequency RU and one or more first spatial streams; and transmitting the first DL transmission as part of participating in the coordinated MU transmission at block 1412 comprises transmitting the first DL transmission in the first frequency RU using one or more second spatial streams while the one slave AP transmits the second DL transmission in the first frequency RU using the one or more first spatial streams.

In some embodiments, generating the announcement frame at block 1404 comprises generating the announcement frame to include an indication of a duration of a signal field to be included in a PHY header of the second DL transmission; and the method 1400 further comprises the master AP generating the first DL transmission to include a signal field in a PHY header of the first DL transmission, the signal field in the PHY header of the first DL transmission having the duration of the signal field in the PHY header of the second DL transmission.

In some embodiments, participating in the coordinated MU transmission at block 1412 comprises: the master AP transmitting a first trigger frame to at least one first client station among the one or more first client stations, while one slave AP transmits a second trigger frame to at least one second client station among the one or more second client stations; and receiving a first UL transmission from the at least one first client station while the at least one second client station transmits a second UL transmission to the one slave AP in response to the second trigger frame.

In some embodiments, generating the announcement frame at block 1404 comprises generating the announcement frame to indicate the one second AP is allocated a first frequency RU; and participating in the coordinated MU transmission at block 1412 comprises receiving the first UL transmission in a second frequency RU while the at least one second client station transmits the second UL transmission in the first RU, wherein the second RU does not overlap the first frequency RU in frequency.

In some embodiments, generating the announcement frame at block 1404 comprises generating the announcement frame to indicate the one slave AP is allocated a first frequency RU and one or more first spatial streams; and participating in the coordinated MU transmission at block 1412 comprises receiving the first UL transmission in the first frequency RU via one or more second spatial streams while the at least one second client station transmits the second UL transmission in the first RU via the one or more first spatial streams.

In some embodiments, generating the announcement frame at block 1404 comprises generating the announcement frame to include an indication of a duration of the second trigger frame; and participating in the coordinated MU transmission at block 1412 comprises the master AP generating the first trigger frame to have the duration of the second trigger frame.

In some embodiments, the method 1400 further comprises: the master AP receiving resource request information from the one or more slave APs; and the master AP allocating the one or more frequency RUs to the one or more slave APs for the coordinated MU transmission based on the resource request information from the one or more second APs.

Figure 15:
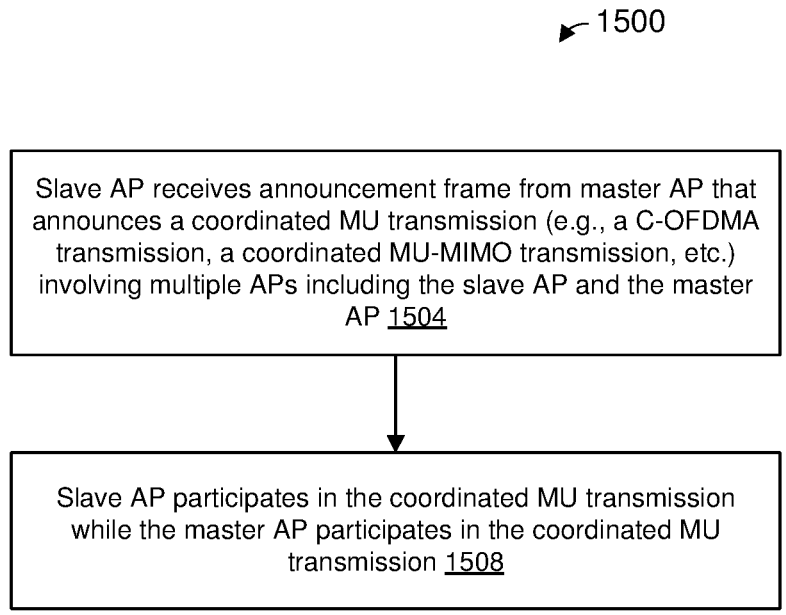
FIG. 15 is a flow diagram of another example method for coordinated wireless communications involving multiple APs, according to another embodiment.

FIG. 15 is a flow diagram of another example method 1500 for wireless communications involving multiple APs, according to another embodiment. The method 1500 is implemented by a slave AP having a structure such as described with reference to FIG. 1B, and FIG. 15 is described with reference to FIG. 1B for ease of explanation. In other embodiments, however, the method 1500 is implemented by an AP having a suitable structure different than illustrated in FIG. 1B.

In various embodiments, the method 1500 is utilized in connection with any of the frame exchanges discussed in connection with any of FIGS. 2-13, and/or in connection with any of the techniques discussed above.

The method 1500 is implemented by a slave AP associated with one or more first client stations.

At block 1504, the slave AP receives (e.g., the network interface 122 receives, the MAC processor 126 receives, the controller 70 receives, etc.) an announcement frame from a master AP associated with one or more second client stations. In an embodiment, the announcement frame announces a coordinated MU transmission (e.g., a C-OFDMA transmission, a coordinated MU-MIMO transmission, etc.) involving at least the slave AP and the master AP. In an embodiment, the announcement frame includes an indicator of a frequency RU allocated to the slave AP for the coordinated MU transmission.

At block 1508, the slave AP participates in the coordinated MU transmission using the frequency RU indicated by the announcement frame while the slave AP participates in the coordinated MU transmission.

In an embodiment, participating in the coordinated MU transmission at block 1508 comprises: the slave AP transmitting (e.g., the network interface device 122 transmitting, the PHY processor 130 transmitting, etc.) a first DL transmission to at least one first client station among the one or more first client stations, while the master AP transmits a second DL transmission to at least one second client station among the one or more second client stations.

In some embodiments, the method 1500 further comprises: the slave AP determining (e.g., the network interface device 122 determining, the MAC processor 126 determining, the controller 70 determining, etc.) a first frequency RU based on the indicator, in the announcement frame, of the RU allocated to the slave AP; and participating in the coordinated MU transmission at block 1508 comprises transmitting the first DL transmission in the first frequency RU while the second AP transmits the second DL transmission in a second frequency RU, wherein the second frequency RU does not overlap the first frequency RU in frequency.

In some embodiments, the method 1500 further comprises: the slave AP determining (e.g., the network interface device 122 determining, the MAC processor 126 determining, the controller 70 determining, etc.) a first frequency RU based on the indicator, in the announcement frame, of the RU allocated to the slave AP; and the slave AP determining (e.g., the network interface device 122 determining, the MAC processor 126 determining, the controller 70 determining, etc.) one or more first spatial streams based on an indicator, in the announcement frame, of one or more spatial streams allocated to the first AP for the coordinated MU transmission; and participating in the coordinated MU transmission at block 1508 comprises transmitting the first DL transmission in the first frequency RU using one or more first spatial streams while the second AP transmits the second DL transmission in the first frequency RU using the one or more second spatial streams.

In some embodiments, the method 1500 further comprises: the slave AP determining (e.g., the network interface device 122 determining, the MAC processor 126 determining, the controller 70 determining, etc.) a duration of a signal field based on an indicator, in the announcement frame, of a signal field duration for the coordinated MU transmission, the signal field to be included in a physical layer (PHY) header in the first DL transmission; and participating in the coordinated MU transmission at block 1508 comprises the slave AP generating (e.g., the network interface device 122 generating, the PHY processor 130 generating, etc.) the first DL transmission to include, in the PHY header of the first DL transmission, the signal field having the duration.

In some embodiments, participating in the coordinated MU transmission at block 1508 comprises: the slave AP transmitting (e.g., the network interface device 122 transmitting, the PHY processor 130 transmitting, etc.) a first trigger frame to at least one first client station among the one or more first client stations, while the master AP transmits a second trigger frame to at least one second client station among the one or more second client stations; and the slave AP receiving (e.g., the network interface device 122 receiving, the PHY processor 130 receiving, etc.) a first UL transmission from the at least one first client station while the at least one second client station transmits a second UL transmission to the master AP in response to the second trigger frame.

In some embodiments, the method 1500 further comprises the slave AP determining (e.g., the network interface device 122 determining, the MAC processor 126 determining, the controller 70 determining, etc.) a first frequency RU based on the indicator, in the announcement frame, of the RU allocated to the first AP; and participating in the coordinated MU transmission at block 1508 comprises: transmitting the first trigger frame in the first frequency RU while the master AP transmits the second trigger frame in a second frequency RU, wherein the second frequency RU does not overlap the first frequency RU in frequency; and receiving the first UL transmission in the first frequency RU while the at least one second client station transmits the second UL transmission in the second RU.

In some embodiments, the method 1500 further comprises: the slave AP determining (e.g., the network interface device 122 determining, the MAC processor 126 determining, the controller 70 determining, etc.) a first frequency RU based on the indicator, in the announcement frame, of the RU allocated to the first AP; and the slave AP determining (e.g., the network interface device 122 determining, the MAC processor 126 determining, the controller 70 determining, etc.) one or more first spatial streams based on an indicator, in the announcement frame, of one or more spatial streams allocated to the first AP for the coordinated MU transmission; and the slave AP generating (e.g., the network interface device 122 generating, the MAC processor 126 generating, etc.) the first trigger frame to instruct the one or more first client stations to transmit, during the first UL transmission, in the first frequency RU via the one or more first spatial streams. In some embodiments, participating in the coordinated MU transmission at block 1508 comprises: the slave AP receiving the first UL transmission in the first frequency RU via one or more first spatial streams while the at least one second client station transmits the second UL transmission in the first RU via one or more second spatial streams.

In some embodiments, the method 1500 further comprises: the slave AP determining (e.g., the network interface device 122 determining, the MAC processor 126 determining, the controller 70 determining, etc.) a duration of the first trigger frame based on an indicator, in the announcement frame, of the duration of the first trigger frame; and the slave AP generating (e.g., the network interface device 122 generating, the MAC processor 126 generating, etc.) the first trigger frame to have the determined duration.

In some embodiments, the method 1500 further comprises, prior to receiving the announcement frame: the slave AP generating (e.g., the network interface device 122 generating, the MAC processor 126 generating, etc.) resource request information to request an RU for the coordinated MU transmission; and the slave AP transmitting (e.g., the network interface device 122 transmitting, the PHY processor 130 transmitting, etc.) the resource request information to the second AP.

Figure 16:
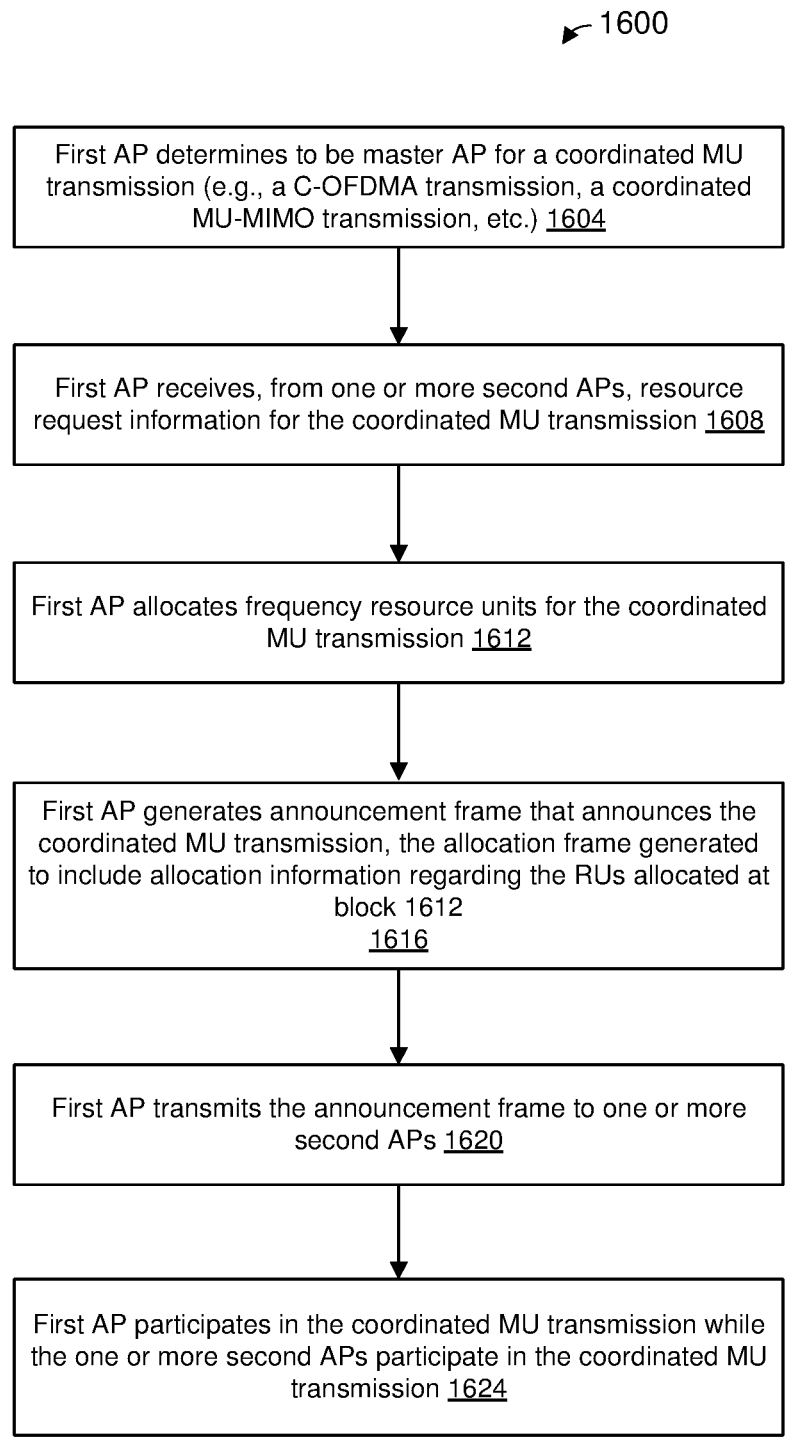
FIG. 16 is a flow diagram of another example method for coordinated wireless communications involving multiple APs, according to another embodiment.

FIG. 16 is a flow diagram of another example method 1600 for wireless communications involving multiple APs, according to another embodiment. The method 1600 is implemented by a master AP having a structure such as described with reference to FIG. 1B, and FIG. 16 is described with reference to FIG. 1B for ease of explanation. In other embodiments, however, the method 1600 is implemented by an AP having a suitable structure different than illustrated in FIG. 1B.

In various embodiments, the method 1600 is utilized in connection with any of the frame exchanges discussed in connection with any of FIGS. 2-13, and/or in connection with any of the techniques discussed above.

At block 1604, a first AP determines (e.g., the network interface 122 determines, the MAC processor 126 determines, the controller 60 determines, etc.) that the first AP is to be a master AP for a coordinated MU transmission (e.g., a C-OFDMA transmission, a coordinated MU-MIMO transmission, etc.) involving multiple APs including the first AP and one or more second APs acting as slave APs.

At block 1608, the first AP receives (e.g., the network interface 122 receives, the MAC processor 126 receives, the controller 60 receives, etc.), from the one or more second APs, resource request information regarding access to a wireless communication medium by the one or more second APs for the coordinated MU transmission.

At block 1612, the first AP allocates (e.g., the network interface 122 allocates, the MAC processor 126 allocates, the controller 60 allocates, etc.) frequency RUs to the first AP and the one or more second APs for the coordinated MU transmission based on the resource request information received at block 1608.

At block 1616, the first AP generates (e.g., the network interface 122 generates, the MAC processor 126 generates, the controller 60 generates, etc.) an announcement frame regarding the coordinated MU transmission. In an embodiment, the announcement frame includes allocation information regarding the RUs allocated to the one or more second APs for the coordinated MU transmission.

At block 1620, the first AP transmits (e.g., the network interface 122 transmits, the PHY processor 130 transmits, etc.) the announcement frame to provide the one or more second APs with the allocation information regarding the RUs allocated to the one or more second APs.

At block 1624, the first AP participates in the coordinated MU transmission while the one or more second APs participate in the coordinated MU transmission.

In some embodiments, receiving resource request information from one of the second APs at block 1608 comprises: the first AP receiving a packet from the one second AP, the packet sent in response to the second AP contending for the wireless communication medium in order to transit the packet and obtaining the wireless communication medium. In an embodiment, the packet includes resource request information from the one second AP.

In some embodiments, the method 1600 further includes: the first AP generating (e.g., the network interface 122 generating, the MAC processor 126 generating, the controller 60 generating, etc.) a trigger frame configured to prompt at least one second AP among the one or more second APs to transmit resource request information; and the first AP transmitting (e.g., the network interface 122 transmitting, the PHY processor 130 transmitting, etc.) the trigger frame to prompt the at least one second AP to transmit resource request information. In an embodiment, receiving the resource request information at block 1608 comprises receiving resource request information from the at least one second AP responsive to transmitting the trigger frame.

In some embodiments, generating the trigger frame comprises: including, in the trigger frame, an identifier of one second AP; wherein receiving the resource request information at block 1608 comprises receiving resource request information from the one second AP.

In some embodiments, the identifier of the one second AP in the trigger frame comprises: a MAC address of the one second AP. In other embodiments, the identifier of the one second AP in the trigger frame comprises: a first set of bits from a BSS color identifier of the one second AP; and a second set of bits generated from a MAC address of the one second AP. In an embodiment, the second set of bits generated from the MAC address of the one second AP comprises: a set of bits generated by applying a hash function to the MAC address of the one second AP.

In some embodiments, receiving the resource request information at block 1608 comprises receiving, from one second AP: an indicator of a frequency bandwidth requested by the one second AP for the coordinated MU transmission.

In some embodiments, receiving the resource request information at block 1608 comprises receiving, from one second AP: an indicator of a duration of a packet to be transmitted during the coordinated MU transmission.

In some embodiments, receiving the resource request information at block 1608 comprises receiving, from one second AP: an indicator of a duration of a signal field in a PHY header of a packet to be transmitted during the coordinated MU transmission.

Figure 17:
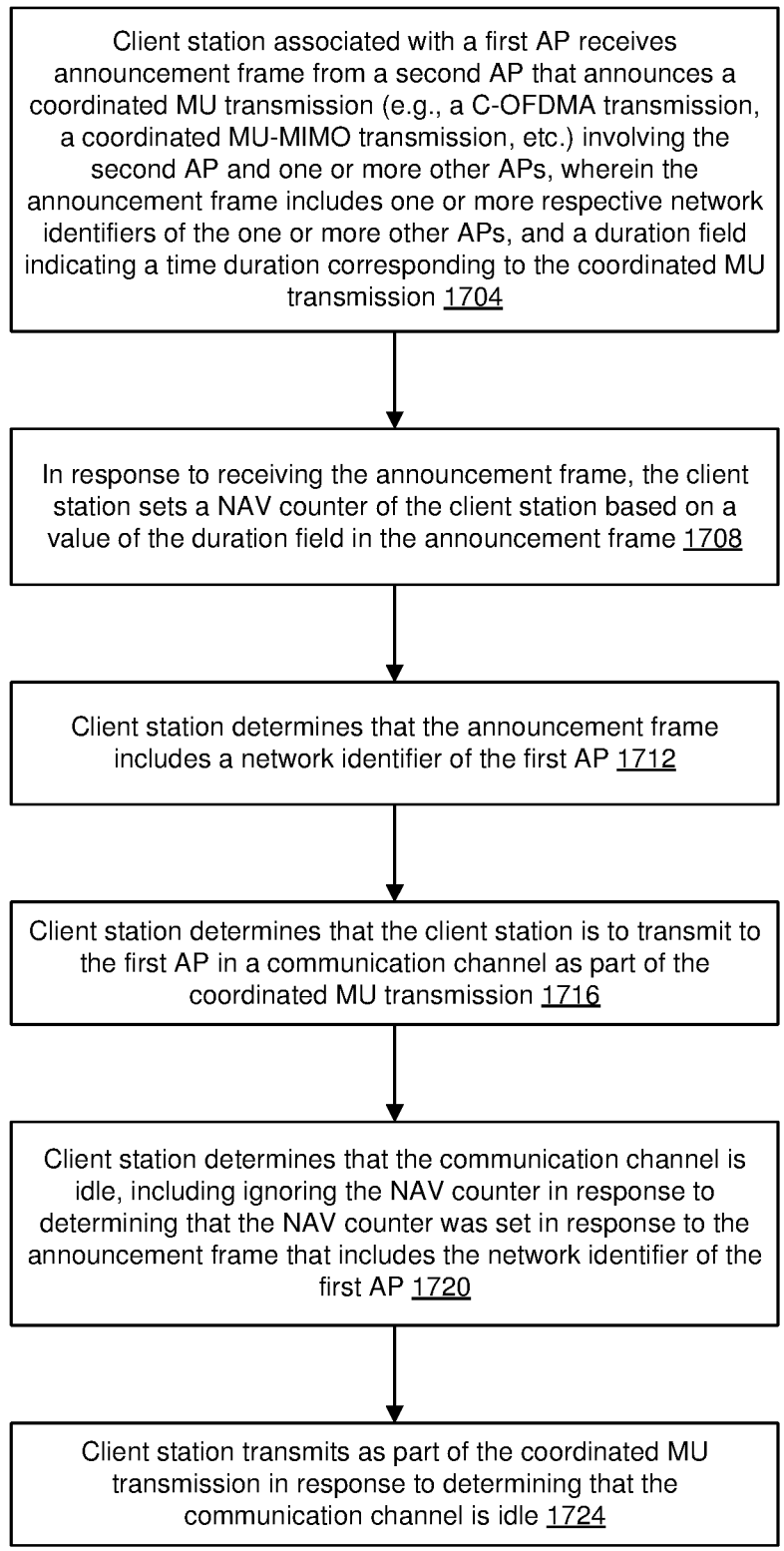
FIG. 17 is a flow diagram of another example method for coordinated wireless communications involving multiple APs, according to another embodiment.

FIG. 17 is a flow diagram of another example method 1700 for wireless communications involving multiple APs, according to another embodiment. The method 1700 is implemented by a client station having a structure such as described with reference to FIG. 1C, and FIG. 17 is described with reference to FIG. 1C for ease of explanation. In other embodiments, however, the method 1700 is implemented by a client station having a suitable structure different than illustrated in FIG. 1C.

In various embodiments, the method 1700 is utilized in connection with any of the frame exchanges discussed in connection with any of FIGS. 2-13, and/or in connection with any of the techniques discussed above.

The method 1700 is implemented by a client station associated with a first AP.

At block 1704, the client station receives (e.g., the network interface 162 receives, the MAC processor 166 receives, the controller 80 receives, etc.) an announcement frame transmitted by a second AP with which the client station is not associated. The announcement frame announces a coordinated MU transmission involving the second AP and one or more other APs. The announcement frame includes one or more respective network identifiers of the one or more other APs, and the announcement frame further includes a duration field indicating a time duration corresponding to the coordinated MU transmission.

At block 1708, in response to receiving the announcement frame, the client station sets (e.g., the network interface 162 sets, the MAC processor 166 sets, the controller 80 sets, etc.) a NAV counter of the client station based on a value of the duration field in the announcement frame.

At block 1712, the client station determines (e.g., the network interface 162 determines, the MAC processor 166 determines, the controller 80 determines, etc.) that the announcement frame includes a network identifier of the first AP.

At block 1716, the client station determines (e.g., the network interface 162 determines, the MAC processor 166 determines, the controller 80 determines, etc.) that the client station is to transmit to the first AP in a communication channel as part of the coordinated MU transmission.

At block 1720, the client station determines (e.g., the network interface 162 determines, the MAC processor 166 determines, the controller 80 determines, etc.) that the communication channel is idle, including ignoring the NAV counter in response to determining that the NAV counter was set in response to the announcement frame that includes the network identifier of the first AP; and At block 1724, the client station transmits (e.g., the network interface 162 transmits, the PHY processor 170 transmits, etc.) as part of the coordinated MU transmission in response to determining that the communication channel is idle.

In some embodiments, the coordinated MU transmission includes respective downlink transmissions by the first AP and the second AP; and transmitting, at block 1724, as part of the coordinated MU transmission comprises transmitting to the first AP after the respective downlink transmissions by the first AP and the second AP.

In some embodiments, the method 1700 further comprises: the client station maintaining (e.g., the network interface 162 maintaining, the MAC processor 166 maintaining, etc.) a first NAV counter for transmissions in a basic service set (BSS) managed by the first AP; and the client station maintaining (e.g., the network interface 162 maintaining, the MAC processor 166 maintaining, etc.) a second NAV counter for transmissions not within the BSS managed by the first AP; wherein setting the NAV counter of the client station based on the value of the duration field in the announcement frame comprises the client station setting (e.g., the network interface 162 setting, the MAC processor 166 setting, etc.) the first NAV counter in response to determining that the announcement frame transmitted by the second AP includes the network identifier of the first AP.

Embodiment 1: A method for wireless communication by a first access point (AP) associated with one or more first client stations, the method comprising: generating, at the first AP, an announcement frame that announces a coordinated multi-user (MU) transmission involving multiple APs including the first AP and one or more second APs, each of the second APs associated with a respective one or more second client stations, wherein the announcement frame is generated to indicate respective one or more frequency resource units (RUs) allocated to the one or more second APs for the coordinated MU transmission; transmitting, by the first AP, the announcement frame to the one or more second APs to initiate the coordinated MU transmission; and participating, by the first AP, in the coordinated MU transmission while the one or more second APs also participate in the coordinated MU transmission.

Embodiment 2: The method of embodiment 1, wherein participating in the coordinated MU transmission comprises: transmitting, by the first AP, a first downlink (DL) transmission to at least one first client station among the one or more first client stations, while one second AP transmits a second DL transmission to at least one second client station among the one or more second client stations.

Embodiment 3: The method of embodiment 2, wherein: generating the announcement frame comprises generating the announcement frame to indicate the one second AP is allocated a first frequency RU; and transmitting the first DL transmission comprises transmitting the first DL transmission in a second frequency RU while the one second AP transmits the second DL transmission in the first RU, wherein the second RU does not overlap the first frequency RU in frequency.

Embodiment 4: The method of embodiment 2, wherein: generating the announcement frame comprises generating the announcement frame to indicate the one second AP is allocated a first frequency RU and one or more first spatial streams; and transmitting the first DL transmission comprises transmitting the first DL transmission in the first frequency RU using one or more second spatial streams while the one second AP transmits the second DL transmission in the first frequency RU using the one or more first spatial streams.

Embodiment 5: The method of any of embodiments 2-4, wherein generating the announcement frame comprises: generating the announcement frame to include an indication of a duration of a signal field to be included in a physical layer (PHY) header of the second DL transmission; and generating, at the first AP, the first DL transmission to include a signal field in a PHY header of the first DL transmission, the signal field in the PHY header of the first DL transmission having the duration of the signal field in the PHY header of the second DL transmission.

Embodiment 6: The method of embodiment 1, wherein participating in the coordinated MU transmission comprises: transmitting, by the first AP, a first trigger frame to at least one first client station among the one or more first client stations, while one second AP transmits a second trigger frame to at least one second client station among the one or more second client stations; and receiving, at the first AP, a first uplink (UL) transmission from the at least one first client station while the at least one second client station transmits a second UL transmission to the one second AP in response to the second trigger frame.

Embodiment 7: The method of embodiment 6, wherein: generating the announcement frame comprises generating the announcement frame to indicate the one second AP is allocated a first frequency RU; and receiving the first UL transmission comprises receiving the first UL transmission in a second frequency RU while the at least one second client station transmits the second UL transmission in the first RU, wherein the second RU does not overlap the first frequency RU in frequency.

Embodiment 8: The method of embodiment 6, wherein: generating the announcement frame comprises generating the announcement frame to indicate the one second AP is allocated a first frequency RU and one or more first spatial streams; and receiving the first UL transmission comprises receiving the first UL transmission in the first frequency RU via one or more second spatial streams while the at least one second client station transmits the second UL transmission in the first RU via the one or more first spatial streams.

Embodiment 9: The method of any of embodiments 6-8, wherein: generating the announcement frame comprises generating the announcement frame to include an indication of a duration of the second trigger frame; and participating in the coordinated MU transmission comprises generating, at the first AP, the first trigger frame to have the duration of the second trigger frame.

Embodiment 10: The method of any of embodiments 1-9, further comprising: receiving, at the first AP, resource request information from the one or more second APs; allocating, at the first AP, the one or more frequency RUs to the one or more second APs for the coordinated MU transmission based on the resource request information from the one or more second APs.

Embodiment 11: The method of any of embodiments 1-10, further comprising: after transmitting the announcement frame, receiving, at the first AP, one or more respective copies of the announcement frame from the one or more second APs; and simultaneously with receiving the one or more respective copies of the announcement frame, transmitting, by the first AP, a further copy of the announcement frame.

Embodiment 12: The method of embodiment 11, further comprising: after receiving the one or more respective copies of the announcement frame, transmitting, by the first AP, a trigger frame to the one or more second APs to further initiate the coordinated MU transmission.

Embodiment 13: A first access point (AP) associated with one or more first client stations, the first AP comprising: a wireless network interface device comprising one or more integrated circuit (IC) devices. The one or more IC devices are configured to: generate an announcement frame that announces a coordinated multi-user (MU) transmission involving multiple APs including the first AP and one or more second APs, each of the second APs associated with a respective one or more second client stations, wherein the announcement frame is generated to indicate respective one or more frequency resource units (RUs) allocated to the one or more second APs for the coordinated MU transmission; control the wireless network interface device to transmit the announcement frame to the one or more second APs to initiate the coordinated MU transmission; and control the wireless network interface device to participate in the coordinated MU transmission while the one or more second APs also participate in the coordinated MU transmission.

Embodiment 14: The first AP of embodiment 13, wherein the one or more IC devices are configured to control the wireless network interface device to participate in the coordinated MU transmission at least by: controlling the wireless network interface device to transmit a first downlink (DL) transmission to at least one first client station among the one or more first client stations, while one second AP transmits a second DL transmission to at least one second client station among the one or more second client stations.

Embodiment 15: The first AP of embodiment 14, wherein the one or more IC devices are configured to: generate the announcement frame to indicate the one second AP is allocated a first frequency RU; and control the wireless network interface device to transmit the first DL transmission in a second frequency RU while the one second AP transmits the second DL transmission in the first RU, wherein the second RU does not overlap the first frequency RU in frequency.

Embodiment 16: The first AP of embodiment 14, wherein the one or more IC devices are configured to: generate the announcement frame to indicate the one second AP is allocated a first frequency RU and one or more first spatial streams; and control the wireless network interface device to transmit the first DL transmission in the first frequency RU using one or more second spatial streams while the one second AP transmits the second DL transmission in the first frequency RU using the one or more first spatial streams.

Embodiment 17: The first AP of any of embodiments 14-16, wherein the one or more IC devices are configured to: generate the announcement frame to include an indication of a duration of a signal field to be included in a physical layer (PHY) header of the second DL transmission; and generate the first DL transmission to include a signal field in a PHY header of the first DL transmission, the signal field in the PHY header of the first DL transmission having the duration of the signal field in the PHY header of the second DL transmission.

Embodiment 18: The first AP of embodiment 13, wherein the one or more IC devices are configured to control the wireless network interface device to participate in the coordinated MU transmission at least by: controlling the wireless network interface device to transmit a first trigger frame to at least one first client station among the one or more first client stations, while one second AP transmits a second trigger frame to at least one second client station among the one or more second client stations; and receiving a first uplink (UL) transmission from the at least one first client station while the at least one second client station transmits a second UL transmission to the one second AP in response to the second trigger frame.

Embodiment 19: The first AP of embodiment 18, wherein the one or more IC devices are configured to: generate the announcement frame to indicate the one second AP is allocated a first frequency RU; and receive the first UL transmission in a second frequency RU while the at least one second client station transmits the second UL transmission in the first RU, wherein the second RU does not overlap the first frequency RU in frequency.

Embodiment 20: The first AP of embodiment 18, wherein the one or more IC devices are configured to: generate the announcement frame to indicate the one second AP is allocated a first frequency RU and one or more first spatial streams; and receive the first UL transmission in the first frequency RU via one or more second spatial streams while the at least one second client station transmits the second UL transmission in the first RU via the one or more first spatial streams.

Embodiment 21: The first AP of any of embodiments 18-20, wherein the one or more IC devices are configured to: generate the announcement frame to include an indication of a duration of the second trigger frame; and generate the first trigger frame to have the duration of the second trigger frame.

Embodiment 22: The first AP of any of embodiments 13-21, wherein the one or more IC devices are further configured to: receive resource request information from the one or more second APs; allocate the one or more frequency RUs to the one or more second APs for the coordinated MU transmission based on the resource request information from the one or more second APs.

Embodiment 23: The first AP of any of embodiments 13-22, wherein the one or more IC devices are further configured to: after transmitting the announcement frame, receive one or more respective copies of the announcement frame from the one or more second APs; and control the wireless network interface device to transmit a further copy of the announcement frame simultaneously with receiving one or more respective copies of the announcement frame from the one or more second APs.

Embodiment 24: The first AP of embodiment 23, wherein the one or more IC devices are further configured to: control the wireless network interface device to transmit a trigger frame to the one or more second APs to further initiate the coordinated MU transmission after receiving the one or more respective copies of the announcement frame.

Embodiment 25: A method for wireless communication by a first access point (AP) associated with one or more first client stations, the method comprising: receiving, at the first AP, an announcement frame from a second AP associated with one or more second client stations, the announcement frame announcing a coordinated multi-user (MU) transmission involving at least the first AP and the second AP, wherein the announcement frame includes an indicator of a frequency resource unit (RU) allocated to the first AP for the coordinated MU transmission; and participating, by the first AP, in the coordinated MU transmission using the frequency RU indicated by the announcement frame while the second AP also participates in the coordinated MU transmission.

Embodiment 26: The method of embodiment 25, wherein participating in the coordinated MU transmission comprises: transmitting, by the first AP, a first downlink (DL) transmission to at least one first client station among the one or more first client stations, while the second AP transmits a second DL transmission to at least one second client station among the one or more second client stations.

Embodiment 27: The method of embodiment 26, further comprising: determining, at the first AP, a first frequency RU based on the indicator, in the announcement frame, of the RU allocated to the first AP; wherein transmitting the first DL transmission comprises transmitting the first DL transmission in the first frequency RU while the second AP transmits the second DL transmission in a second frequency RU, wherein the second frequency RU does not overlap the first frequency RU in frequency.

Embodiment 28: The method of embodiment 26, further comprising: determining, at the first AP, a first frequency RU based on the indicator, in the announcement frame, of the RU allocated to the first AP; determining, at the first AP, one or more first spatial streams based on an indicator, in the announcement frame, of one or more spatial streams allocated to the first AP for the coordinated MU transmission; and transmitting the first DL transmission comprises transmitting the first DL transmission in the first frequency RU using one or more first spatial streams while the second AP transmits the second DL transmission in the first frequency RU using the one or more second spatial streams.

Embodiment 29: The method of any of embodiments 26-28, further comprising: determining, at the first AP, a duration of a signal field based on an indicator, in the announcement frame, of a signal field duration for the coordinated MU transmission, the signal field to be included in a physical layer (PHY) header in the first DL transmission; and generating, at the first AP, the first DL transmission to include, in the PHY header of the first DL transmission, the signal field having the duration.

Embodiment 30: The method of embodiment 25, wherein participating in the coordinated MU transmission comprises: transmitting, by the first AP, a first trigger frame to at least one first client station among the one or more first client stations, while the second AP transmits a second trigger frame to at least one second client station among the one or more second client stations; and receiving, at the first AP, a first uplink (UL) transmission from the at least one first client station while the at least one second client station transmits a second UL transmission to the second AP in response to the second trigger frame.

Embodiment 31: The method of embodiment 30, further comprising: determining, at the first AP, a first frequency RU based on the indicator, in the announcement frame, of the RU allocated to the first AP; wherein transmitting the first trigger frame comprises transmitting the first trigger frame in the first frequency RU while the second AP transmits the second trigger frame in a second frequency RU, wherein the second frequency RU does not overlap the first frequency RU in frequency; and wherein receiving the first UL transmission comprises receiving the first UL transmission in the first frequency RU while the at least one second client station transmits the second UL transmission in the second RU.

Embodiment 32: The method of embodiment 30, further comprising: determining, at the first AP, a first frequency RU based on the indicator, in the announcement frame, of the RU allocated to the first AP; determining, at the first AP, one or more first spatial streams based on an indicator, in the announcement frame, of one or more spatial streams allocated to the first AP for the coordinated MU transmission; and generating, at the first AP, the first trigger frame to instruct the one or more first client stations to transmit, during the first UL transmission, in the first frequency RU via the one or more first spatial streams; wherein receiving the first UL transmission comprises receiving the first UL transmission in the first frequency RU via one or more first spatial streams while the at least one second client station transmits the second UL transmission in the first RU via one or more second spatial streams.

Embodiment 33: The method of any of embodiments 30-32, further comprising: determining, at the first AP, a duration of the first trigger frame based on an indicator, in the announcement frame, of the duration of the first trigger frame; and generating, at the first AP, the first trigger frame to have the determined duration.

Embodiment 34: The method of any of embodiments 25-33, further comprising, prior to receiving the announcement frame: generating, at the first AP, resource request information to request an RU for the coordinated MU transmission; and transmitting, by the first AP, the resource request information to the second AP.

Embodiment 35: The method of any of embodiments 25-34, further comprising: after receiving the announcement frame, transmitting, by the first AP, a copy of the announcement frame.

Embodiment 36: The method of embodiment 35, further comprising: after transmitting the copy of the announcement frame, receiving, at the first AP, a trigger frame from the master AP in connection with the coordinated MU transmission; wherein participating in the coordinated MU transmission is responsive to the trigger frame.

Embodiment 37: A first access point (AP) associated with one or more first client stations, the first AP comprising: a wireless network interface device comprising one or more integrated circuit (IC) devices. The one or more IC devices are configured to: receive an announcement frame from a second AP associated with one or more second client stations, the announcement frame announcing a coordinated multi-user (MU) transmission involving at least the first AP and the second AP, wherein the announcement frame includes an indicator of a frequency resource unit (RU) allocated to the first AP for the coordinated MU transmission; and control the wireless network interface device to participate in the coordinated MU transmission using the frequency RU indicated by the announcement frame while the second AP also participates in the coordinated MU transmission.

Embodiment 38: The first AP of embodiment 37, wherein the one or more IC devices are further configured to control the wireless network interface device to participate in the coordinated MU transmission at least by: controlling the wireless network interface device to transmit a first downlink (DL) transmission to at least one first client station among the one or more first client stations, while the second AP transmits a second DL transmission to at least one second client station among the one or more second client stations.

Embodiment 39: The first AP of embodiment 38, wherein the one or more IC devices are further configured to: determine a first frequency RU based on the indicator, in the announcement frame, of the RU allocated to the first AP; control the wireless network interface device to transmit the first DL transmission in the first frequency RU while the second AP transmits the second DL transmission in a second frequency RU, wherein the second frequency RU does not overlap the first frequency RU in frequency.

Embodiment 40: The first AP of embodiment 38, wherein the one or more IC devices are further configured to: determine a first frequency RU based on the indicator, in the announcement frame, of the RU allocated to the first AP; determine one or more first spatial streams based on an indicator, in the announcement frame, of one or more spatial streams allocated to the first AP for the coordinated MU transmission; and control the wireless network interface device to transmit the first DL transmission in the first frequency RU using one or more first spatial streams while the second AP transmits the second DL transmission in the first frequency RU using the one or more second spatial streams.

Embodiment 41: The first AP of any of embodiments 38-40, wherein the one or more IC devices are further configured to: determine a duration of a signal field based on an indicator, in the announcement frame, of a signal field duration for the coordinated MU transmission, the signal field to be included in a physical layer (PHY) header in the first DL transmission; and generate the first DL transmission to include, in the PHY header of the first DL transmission, the signal field having the duration.

Embodiment 42: The first AP of embodiment 37, wherein the one or more IC devices are further configured to control the wireless network interface device to participate in the coordinated MU transmission at least by: controlling the wireless network interface device to transmit a first trigger frame to at least one first client station among the one or more first client stations, while the second AP transmits a second trigger frame to at least one second client station among the one or more second client stations; and receiving a first uplink (UL) transmission from the at least one first client station while the at least one second client station transmits a second UL transmission to the second AP in response to the second trigger frame.

Embodiment 43: The first AP of embodiment 42, wherein the one or more IC devices are further configured to: determine a first frequency RU based on the indicator, in the announcement frame, of the RU allocated to the first AP; control the wireless network interface device to transmit the first trigger frame in the first frequency RU while the second AP transmits the second trigger frame in a second frequency RU, wherein the second frequency RU does not overlap the first frequency RU in frequency; and receive the first UL transmission in the first frequency RU while the at least one second client station transmits the second UL transmission in the second RU.

Embodiment 44: The first AP of embodiment 42, wherein the one or more IC devices are further configured to: determine a first frequency RU based on the indicator, in the announcement frame, of the RU allocated to the first AP; determine one or more first spatial streams based on an indicator, in the announcement frame, of one or more spatial streams allocated to the first AP for the coordinated MU transmission; generate the first trigger frame to instruct the one or more first client stations to transmit, during the first UL transmission, in the first frequency RU via the one or more first spatial streams; and receive the first UL transmission in the first frequency RU via one or more first spatial streams while the at least one second client station transmits the second UL transmission in the first RU via one or more second spatial streams.

Embodiment 45: The first AP of any of embodiments 42-44, wherein the one or more IC devices are further configured to: determine a duration of the first trigger frame based on an indicator, in the announcement frame, of the duration of the first trigger frame; and generate the first trigger frame to have the determined duration.

Embodiment 46: The first AP of any of embodiments 37-45, wherein the one or more IC devices are further configured to, prior to receiving the announcement frame: generate resource request information to request an RU for the coordinated MU transmission; and control the wireless network interface device to transmit the resource request information to the second AP.

Embodiment 47: The first AP of any of embodiments 37-46, wherein the one or more IC devices are further configured to: control the wireless network interface device to transmit a copy of the announcement frame after receiving the announcement frame.

Embodiment 48: The first AP of embodiment 47, wherein the one or more IC devices are further configured to: after transmitting the copy of the announcement frame, receive a trigger frame from the master AP in connection with the coordinated MU transmission; and control the wireless network interface device to participate in the coordinated MU transmission responsive to receiving the trigger frame.

Embodiment 49: A method for coordinating transmissions in multiple wireless communication networks, the method comprising: determining, at a first access point (AP), that the first AP is to be a master AP for a coordinated multi-user (MU) transmission involving multiple APs including the first AP and one or more second APs; receiving, from the one or more second APs, resource request information regarding access to a wireless communication medium by the one or more second APs for the coordinated MU transmission; allocating, at the first AP, frequency resource units (RUs) to the first AP and the one or more second APs for the coordinated MU transmission based on the resource request information received from the one or more second APs; generating, at the first AP, an announcement frame regarding the coordinated MU transmission, the announcement frame including allocation information regarding the RUs allocated to the one or more second APs for the coordinated MU transmission; transmitting, by the first AP, the announcement frame to provide the one or more second APs with the allocation information regarding the RUs allocated to the one or more second APs; and participating, by the first AP, in the coordinated MU transmission while the one or more second APs participate in the coordinated MU transmission.

Embodiment 50: The method of embodiment 49, wherein receiving resource request information from one of the second APs comprises: receiving, by the first AP, a packet from the one second AP, the packet sent in response to the second AP contending for the wireless communication medium in order to transit the packet and obtaining the wireless communication medium, wherein the packet includes resource request information from the one second AP.

Embodiment 51: The method of embodiment 49, further comprising: generating, at the first AP, a trigger frame configured to prompt at least one second AP among the one or more second APs to transmit resource request information; and transmitting, by the first AP, the trigger frame to prompt the at least one second AP to transmit resource request information; and wherein receiving the resource request information comprises receiving resource request information from the at least one second AP responsive to transmitting the trigger frame.

Embodiment 52: The method of embodiment 51, wherein generating the trigger frame comprises: including, in the trigger frame, an identifier of one second AP; wherein receiving the resource request information comprises receiving resource request information from the one second AP.

Embodiment 53: The method of embodiment 52, wherein the identifier of the one second AP in the trigger frame comprises: a media access control (MAC) address of the one second AP.

Embodiment 54: The method of claim 52, wherein the identifier of the one second AP in the trigger frame comprises: a first set of bits from a basic service set (BSS) color identifier of the one second AP; and a second set of bits generated from a media access control (MAC) address of the one second AP.

Embodiment 55: The method of embodiment 54, wherein second set of bits generated from the MAC address of the one second AP comprises: a set of bits generated by applying a hash function to the MAC address of the one second AP.

Embodiment 56: The method of any of embodiments 49-55, wherein receiving the resource request information comprises receiving, from one second AP: an indicator of a frequency bandwidth requested by the one second AP for the coordinated MU transmission.

Embodiment 57: The method of any of embodiments 49-56, wherein receiving the resource request information comprises receiving, from one second AP: an indicator of a duration of a packet to be transmitted during the coordinated MU transmission.

Embodiment 58: The method of any of embodiments 49-57, wherein receiving the resource request information comprises receiving, from one second AP: an indicator of a duration of a signal field in a physical layer (PHY) header of a packet to be transmitted during the coordinated MU transmission.

Embodiment 59: A communication device, comprising: a wireless network interface device implemented on one or more ICs, the one or more ICs configured to implement any of the methods of embodiments 49-58.

Embodiment 60: A method for wireless communication by a client station associated with a first access point (AP), the method comprising: receiving, at the client station, an announcement frame transmitted by a second AP with which the client station is not associated, the announcement frame announcing a coordinated multi-user (MU) transmission involving the second AP and one or more other APs, wherein the announcement frame includes one or more respective network identifiers of the one or more other APs, and wherein the announcement frame further includes a duration field indicating a time duration corresponding to the coordinated MU transmission; in response to receiving the announcement frame, setting a network allocation vector (NAV) counter of the client station based on a value of the duration field in the announcement frame; determining, at the client station, that the announcement frame includes a network identifier of the first AP; determining, at the client station, the client station is to transmit to the first AP in a communication channel as part of the coordinated MU transmission; determining, at the client station, that the communication channel is idle, including ignoring the NAV counter in response to determining that the NAV counter was set in response to the announcement frame that includes the network identifier of the first AP; and transmitting, by the client station, as part of the coordinated MU transmission in response to determining that the communication channel is idle.

Embodiment 61: The method of embodiment 60, wherein: the coordinated MU transmission includes respective downlink transmissions by the first AP and the second AP; and transmitting, by the client station, as part of the coordinated MU transmission comprises transmitting to the first AP after the respective downlink transmissions by the first AP and the second AP.

Embodiment 62: The method of either of embodiments 60 or 61, further comprising: maintaining, at the client station, a first NAV counter for transmissions in a basic service set (BSS) managed by the first AP; and maintaining, at the client station, a second NAV counter for transmissions not within the BSS managed by the first AP; wherein setting the NAV counter of the client station based on the value of the duration field in the announcement frame comprises setting the first NAV counter in response to determining that the announcement frame transmitted by the second AP includes the network identifier of the first AP.

Embodiment 63: A communication device, comprising: a wireless network interface device implemented on one or more ICs, the one or more ICs configured to implement any of the methods of embodiments 60-62.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication by a first access point (AP) associated with one or more first client stations, the method comprising:
   receiving, at the first AP, an announcement frame from a second AP associated with one or more second client stations, the announcement frame announcing a coordinated multi-user (MU) transmission involving at least the first AP and the second AP, wherein the announcement frame includes an indicator of a frequency resource unit (RU) allocated to the first AP for the coordinated MU transmission; and
   participating, by the first AP, in the coordinated MU transmission using the frequency RU indicated by the announcement frame while the second AP also participates in the coordinated MU transmission.

2. The method of claim 1, wherein participating in the coordinated MU transmission comprises:
   transmitting, by the first AP, a first downlink (DL) transmission to at least one first client station among the one or more first client stations, while the second AP transmits a second DL transmission to at least one second client station among the one or more second client stations.

3. The method of claim 2, further comprising:
   determining, at the first AP, a first frequency RU based on the indicator, in the announcement frame, of the RU allocated to the first AP;
   wherein transmitting the first DL transmission comprises transmitting the first DL transmission in the first frequency RU while the second AP transmits the second DL transmission in a second frequency RU, wherein the second frequency RU does not overlap the first frequency RU in frequency.

4. The method of claim 2, further comprising:
   determining, at the first AP, a first frequency RU based on the indicator, in the announcement frame, of the RU allocated to the first AP;
   determining, at the first AP, one or more first spatial streams based on an indicator, in the announcement frame, of one or more spatial streams allocated to the first AP for the coordinated MU transmission; and
   transmitting the first DL transmission comprises transmitting the first DL transmission in the first frequency RU using one or more first spatial streams while the second AP transmits the second DL transmission in the first frequency RU using the one or more second spatial streams.

5. The method of claim 2, further comprising:
   determining, at the first AP, a duration of a signal field based on an indicator, in the announcement frame, of a signal field duration for the coordinated MU transmission, the signal field to be included in a physical layer (PHY) header in the first DL transmission; and
   generating, at the first AP, the first DL transmission to include, in the PHY header of the first DL transmission, the signal field having the duration.

6. The method of claim 1, wherein participating in the coordinated MU transmission comprises:
   transmitting, by the first AP, a first trigger frame to at least one first client station among the one or more first client stations, while the second AP transmits a second trigger frame to at least one second client station among the one or more second client stations; and
   receiving, at the first AP, a first uplink (UL) transmission from the at least one first client station while the at least one second client station transmits a second UL transmission to the second AP in response to the second trigger frame.

7. The method of claim 6, further comprising:
   determining, at the first AP, a first frequency RU based on the indicator, in the announcement frame, of the RU allocated to the first AP;
   wherein transmitting the first trigger frame comprises transmitting the first trigger frame in the first frequency RU while the second AP transmits the second trigger frame in a second frequency RU, wherein the second frequency RU does not overlap the first frequency RU in frequency; and
   wherein receiving the first UL transmission comprises receiving the first UL transmission in the first frequency RU while the at least one second client station transmits the second UL transmission in the second RU.

8. The method of claim 6, further comprising:
   determining, at the first AP, a first frequency RU based on the indicator, in the announcement frame, of the RU allocated to the first AP;
   determining, at the first AP, one or more first spatial streams based on an indicator, in the announcement frame, of one or more spatial streams allocated to the first AP for the coordinated MU transmission; and generating, at the first AP, the first trigger frame to instruct the one or more first client stations to transmit, during the first UL transmission, in the first frequency RU via the one or more first spatial streams;

wherein receiving the first UL transmission comprises receiving the first UL transmission in the first frequency RU via one or more first spatial streams while the at least one second client station transmits the second UL transmission in the first RU via one or more second spatial streams.

9. The method of claim 6, further comprising:
determining, at the first AP, a duration of the first trigger frame based on an indicator, in the announcement frame, of the duration of the first trigger frame; and
generating, at the first AP, the first trigger frame to have the determined duration.

10. The method of claim 1, further comprising, prior to receiving the announcement frame:
generating, at the first AP, resource request information to request an RU for the coordinated MU transmission; and
transmitting, by the first AP, the resource request information to the second AP.

11. The method of claim 1, further comprising:
after receiving the announcement frame, transmitting, by the first AP, a copy of the announcement frame.

12. The method of claim 11, further comprising:
after transmitting the copy of the announcement frame, receiving, at the first AP, a trigger frame from the second AP in connection with the coordinated MU transmission;
wherein participating in the coordinated MU transmission is responsive to the trigger frame.

13. A first access point (AP) associated with one or more first client stations, the first AP comprising:
a wireless network interface device comprising one or more integrated circuit (IC) devices configured to:
receive an announcement frame from a second AP associated with one or more second client stations, the announcement frame announcing a coordinated multi-user (MU) transmission involving at least the first AP and the second AP, wherein the announcement frame includes an indicator of a frequency resource unit (RU) allocated to the first AP for the coordinated MU transmission, and
control the wireless network interface device to participate in the coordinated MU transmission using the frequency RU indicated by the announcement frame while the second AP also participates in the coordinated MU transmission.

14. The first AP of claim 13, wherein the one or more IC devices are further configured to control the wireless network interface device to participate in the coordinated MU transmission at least by:
controlling the wireless network interface device to transmit a first downlink (DL) transmission to at least one first client station among the one or more first client stations, while the second AP transmits a second DL transmission to at least one second client station among the one or more second client stations.

15. The first AP of claim 14, wherein the one or more IC devices are further configured to:
determine a first frequency RU based on the indicator, in the announcement frame, of the RU allocated to the first AP;
control the wireless network interface device to transmit the first DL transmission in the first frequency RU while the second AP transmits the second DL transmission in a second frequency RU, wherein the second frequency RU does not overlap the first frequency RU in frequency.

16. The first AP of claim 14, wherein the one or more IC devices are further configured to:
determine a first frequency RU based on the indicator, in the announcement frame, of the RU allocated to the first AP;
determine one or more first spatial streams based on an indicator, in the announcement frame, of one or more spatial streams allocated to the first AP for the coordinated MU transmission; and
control the wireless network interface device to transmit the first DL transmission in the first frequency RU using one or more first spatial streams while the second AP transmits the second DL transmission in the first frequency RU using the one or more second spatial streams.

17. The first AP of claim 14, wherein the one or more IC devices are further configured to:
determine a duration of a signal field based on an indicator, in the announcement frame, of a signal field duration for the coordinated MU transmission, the signal field to be included in a physical layer (PHY) header in the first DL transmission; and
generate the first DL transmission to include, in the PHY header of the first DL transmission, the signal field having the duration.

18. The first AP of claim 13, wherein the one or more IC devices are further configured to control the wireless network interface device to participate in the coordinated MU transmission at least by:
controlling the wireless network interface device to transmit a first trigger frame to at least one first client station among the one or more first client stations, while the second AP transmits a second trigger frame to at least one second client station among the one or more second client stations; and
receiving a first uplink (UL) transmission from the at least one first client station while the at least one second client station transmits a second UL transmission to the second AP in response to the second trigger frame.

19. The first AP of claim 18, wherein the one or more IC devices are further configured to:
determine a first frequency RU based on the indicator, in the announcement frame, of the RU allocated to the first AP;
control the wireless network interface device to transmit the first trigger frame in the first frequency RU while the second AP transmits the second trigger frame in a second frequency RU, wherein the second frequency RU does not overlap the first frequency RU in frequency; and
receive the first UL transmission in the first frequency RU while the at least one second client station transmits the second UL transmission in the second RU.

20. The first AP of claim 18, wherein the one or more IC devices are further configured to:
determine a first frequency RU based on the indicator, in the announcement frame, of the RU allocated to the first AP;
determine one or more first spatial streams based on an indicator, in the announcement frame, of one or more spatial streams allocated to the first AP for the coordinated MU transmission;

generate the first trigger frame to instruct the one or more first client stations to transmit, during the first UL transmission, in the first frequency RU via the one or more first spatial streams; and receive the first UL transmission in the first frequency RU via one or more first spatial streams while the at least one second client station transmits the second UL transmission in the first RU via one or more second spatial streams.

21. The first AP of claim 18, wherein the one or more IC devices are further configured to:

determine a duration of the first trigger frame based on an indicator, in the announcement frame, of the duration of the first trigger frame; and generate the first trigger frame to have the determined duration.

22. The first AP of claim 13, wherein the one or more IC devices are further configured to, prior to receiving the announcement frame:

generate resource request information to request an RU for the coordinated MU transmission; and control the wireless network interface device to transmit the resource request information to the second AP.

23. The first AP of claim 13, wherein the one or more IC devices are further configured to:

control the wireless network interface device to transmit a copy of the announcement frame after receiving the announcement frame.

24. The first AP of claim 23, wherein the one or more IC devices are further configured to:

after the wireless interface device transmits the copy of the announcement frame, receive a trigger frame from the second AP in connection with the coordinated MU transmission; and control the wireless network interface device to participate in the coordinated MU transmission responsive to receiving the trigger frame.

* * * * *